(12) United States Patent
Nakashima

(10) Patent No.: US 8,055,885 B2
(45) Date of Patent: Nov. 8, 2011

(54) DATA PROCESSING DEVICE FOR IMPLEMENTING INSTRUCTION REUSE, AND DIGITAL DATA STORAGE MEDIUM FOR STORING A DATA PROCESSING PROGRAM FOR IMPLEMENTING INSTRUCTION REUSE

(75) Inventor: Yasuhiko Nakashima, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 531 days.

(21) Appl. No.: 10/593,695

(22) PCT Filed: Mar. 25, 2005

(86) PCT No.: PCT/JP2005/005591
§ 371 (c)(1),
(2), (4) Date: Sep. 20, 2006

(87) PCT Pub. No.: WO2005/093562
PCT Pub. Date: Oct. 6, 2005

(65) Prior Publication Data
US 2008/0250232 A1    Oct. 9, 2008

(30) Foreign Application Priority Data

| | | |
|---|---|---|
| Mar. 29, 2004 | (JP) | 2004-097197 |
| Sep. 13, 2004 | (JP) | 2004-266056 |
| Nov. 8, 2004 | (JP) | 2004-324348 |
| Nov. 30, 2004 | (JP) | 2004-347124 |

(51) Int. Cl.
*G06F 9/00* (2006.01)
(52) U.S. Cl. .................... 712/225; 712/216
(58) Field of Classification Search ............ 712/209, 712/210, 225, 216
See application file for complete search history.

(56) References Cited

U.S. PATENT DOCUMENTS 4,943,909 A * 7/1990 Huang ............................ 712/15
(Continued)

FOREIGN PATENT DOCUMENTS

JP    11-212788    8/1999
(Continued)

OTHER PUBLICATIONS

Yasuhiko Nakashima, et al., "Multilevel Reuse and Parallel Precomputation Based on Dynamic Instruction Analysis", Article of Journal of Information Processing Society, Computing System, Information Processing Society, Jul. 2003, vol. 44, No. SIG_10 (ACS_2) (20030715), pp. 1-16 (together with its partial English translation).

(Continued)

*Primary Examiner* — Idriss N Alrobaye
(74) *Attorney, Agent, or Firm* — Nixon & Vanderhye P.C.

(57) ABSTRACT

A method and apparatus is provided for significantly speeding-up program execution in a data processing device. The data processing device is provided with a specialized instruction region storage section comprising content addressable memory (CAM) and random access memory (RAM) that operatively functions as an instruction sequence reuse table which is capable of registering/storing sequences of program instructions and corresponding instruction sequence output data as input/output (I/O) groups for potential future use in place of re-executing identical portions of program code. The data processing device includes at least one instruction stream processor which includes a computing unit for executing instructions and a dependency relationship analysis unit or "reuse window" unit (RW) that analyzes instruction sequence patterns from regions of instructions stored in a main memory to determine if the patterns can be divided up into smaller partitions that have no interdependencies and hence are potential candidates for reuse.

15 Claims, 51 Drawing Sheets

U.S. PATENT DOCUMENTS

| | | | | |
|---|---|---|---|---|
| 5,285,527 A * | 2/1994 | Crick et al. | | 711/118 |
| 5,845,103 A * | 12/1998 | Sodani et al. | | 712/216 |
| 5,854,913 A * | 12/1998 | Goetz et al. | | 712/210 |
| 6,006,326 A | 12/1999 | Panwar et al. | | |
| 6,078,987 A * | 6/2000 | Kongetira | | 711/108 |
| 6,401,196 B1 | 6/2002 | Lee et al. | | |
| 6,415,380 B1 | 7/2002 | Sato | | |
| 6,640,145 B2 * | 10/2003 | Hoffberg et al. | | 700/83 |
| 6,810,474 B1 * | 10/2004 | Miki | | 712/216 |
| 2002/0151992 A1 * | 10/2002 | Hoffberg et al. | | 700/83 |
| 2002/0152368 A1 | 10/2002 | Nakamura | | |
| 2006/0050779 A1 | 3/2006 | Otake | | |
| 2008/0250232 A1 | 10/2008 | Nakashima | | |

FOREIGN PATENT DOCUMENTS

| | | |
|---|---|---|
| JP | 2001-5678 A | 12/2001 |
| JP | 2002-312162 | 10/2002 |
| JP | 2002-318688 A | 10/2002 |
| JP | 2004-258905 A | 9/2004 |
| JP | 2005-284683 | 10/2005 |
| KR | 10-2005-0108343 A | 11/2005 |
| TW | 442753 | 6/2001 |
| WO | WO 99/45463 A1 | 9/1999 |

OTHER PUBLICATIONS

Notice of Allowance for Japanese Patent Appln. No. 2004-097197 mailed Jan. 20, 2009 with English translation.

International Search Report—Apr. 14, 2005, PCT/JP2005/005591.

"A Speedup Technique with Function level Value Reuse and Parallel Precomputation".

Yasuhiko Nakajima et al., Information Processing Society of Japan Journal: High Performance Computing System, Sep. 15, 2002; vol. 43, No. SIG6 (HPS 5), pp. 1 to 12.

Taiwanese Notice of Allowance w/partial English translation dated Oct. 26, 2009 (6 pages).

Japanese Office Action w/ partial English translation dated Jul. 13, 2010 (5 pages total).

Yasuhiko Nakashima et al., "A Speedup Technique with Function Level Value Reuse and Parallel Precomputation", Paper in Symposium on Parallel Processing, 2002, Information Processing Society of Japan, May 29, 2002, vol. 2002, No. 8, pp. 269-276 (w/ partial English translation) (13 pages total).

Katsuya Ogata et al., "A Speedup Technique with Function Level Value Reuse and Parallel Precomputation", Research Paper for Information Processing Society of Japan, vol. 2002, No. 22, IPSJ SIG Notes, Information Processing Society of Japan, Mar. 8, 2002, vol. 2002, No. 22, pp. 163-168 (w/ partial English translation) (14 pages total).

Tomoaki Tsumura et al., "Fast Reuse Test of the Memory Values on Parallel Early Computation", Article in Journal of Information Processing Society of Japan, Computing System, vol. 45, No. SIG1 (ACS 4), Information Processing Society of Japan, Jan. 2004, pp. 31-42 (w/ partial English translation) (15 pages total).

Youfeng Wu et al., "Better Exploration of Region-Level Value Locality with Integrated Computation Reuse and Value Prediction", Microprocessor Research Labs (MRL), Intel Corporation, Santa Clara, CA, pp. 98-108; http://www.intel.com/research/mrl, Jun. 30-Jul. 4, 2001.

* cited by examiner

FIG. 11

```
PC:load   [R1+100](----FF--)   -> reg.
   store  reg.                 -> B1(----FF--)
   load   [R1+200](--01----)   -> reg.
   store  reg.                 -> B2(--01----)
   load   A3(5678----)         -> reg.
   store  reg.                 -> B3(5678----)
```

FIG. 14
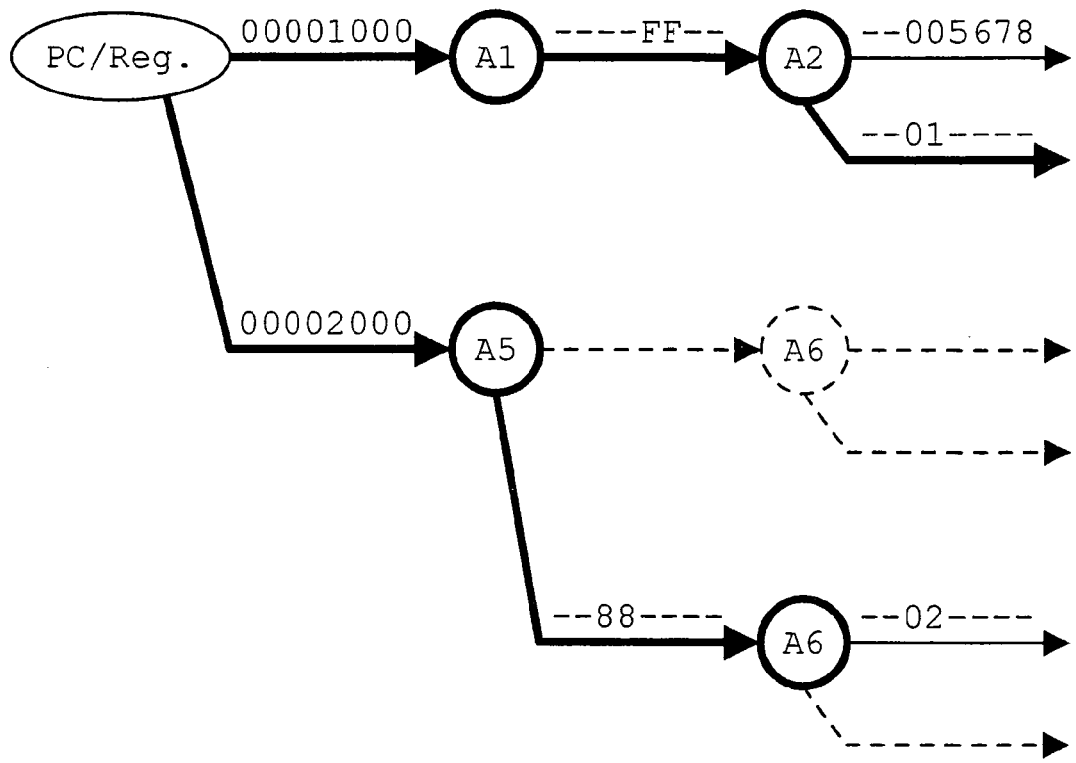
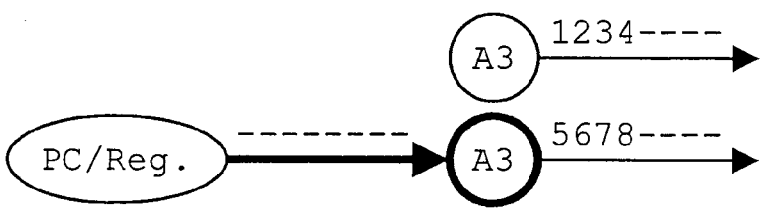
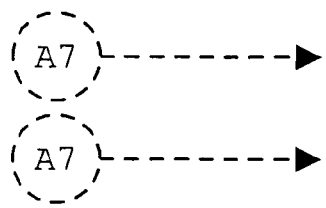
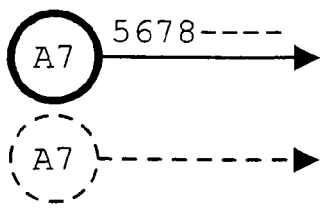

FIG. 15

PC : 1000
  ld(A1)->R1
  ld(A2)->R2
  ld(A2+R2)->R2
  ld(A3)->R3
  ld(A4=R1+R2)->R4 ld(A1)->R1
ld(A2)->R2
ld(A2+R2)->R2
ld(A3)->R3
subcc R3
bz xxxx
ld()->R4

FIG. 32

| Address | A2 | A3 | R5 | | |
|---|---|---|---|---|---|
| P-Mask | FF000000 | 00FF0000 | FFFFFFFF | | |
| Value | 02------ | --33---- | 00000101 | | |

Time=1

↓ diff=01  ↓ diff=00  ↓ diff=01

| Address | A2 | A3 | R5 | | |
|---|---|---|---|---|---|
| P-Mask | FF000000 | 00FF0000 | FFFFFFFF | | |
| Value | 03------ | --33---- | 00000102 | | |

Time=2

↓ diff=01  ↓ diff=00  ↓ diff=01

| Address | A2 | A3 | R5 | | |
|---|---|---|---|---|---|
| P-Mask | FF000000 | 00FF0000 | FFFFFFFF | | |
| Value | 04------ | --33---- | 00000103 | | |

Time=3

↓ diff=01  ↓ diff=22  ↓ diff=01

| Address | A2 | A3 | R5 | | |
|---|---|---|---|---|---|
| P-Mask | FF000000 | 00FF0000 | FFFFFFFF | | |
| Value | 05------ | --55---- | 00000104 | | |

Time=4

Assumption of distance ↓ diff=01  ↓ diff=00  ↓ diff=01

FIG. 33

| Address | A2 | R5 | A2+4 | A3 | |
|---|---|---|---|---|---|
| Mask | FF000000 | FFFFFFFF | 0000FF00 | 00FF0000 | |
| Value | 06------ | 00000105 | -----26-- | --55---- | |

Predicted distance=1

| Address | A2 | R5 | A2+4 | A3 | |
|---|---|---|---|---|---|
| Mask | FF000000 | FFFFFFFF | 000000FF | 00FF0000 | |
| Value | 07------ | 00000106 | ------27 | --55---- | |

Predicted distance=2

| Address | A2 | R5 | A2+8 | A3 | |
|---|---|---|---|---|---|
| Mask | FF000000 | FFFFFFFF | FF000000 | 00FF0000 | |
| Value | 08------ | 00000107 | 28------ | --66---- | |

Predicted distance=3

| Address | A2 | R5 | A2+8 | A3 | |
|---|---|---|---|---|---|
| Mask | FF000000 | FFFFFFFF | 00FF0000 | 00FF0000 | |
| Value | 09------ | 00000108 | --29---- | --66---- | |

Predicted distance=4

FIG. 36(a)

```
loop:(PC=1000)
 1: set  A1       ->R1
 2: ld   (A1=R1)  ->Rx    ...(00010004)
 3: set  A2       ->R2
 4: ld   (A2=R2)  ->Ry    ...(80000000)
 5: ld   (A3=Rx-4)->Rz    ...(0000aaaa)
 6: add  Rx+4     ->Rx    ...00010008
 7: st   Rx       ->(A1=R1)...00010008
 8: shift Ry      ->Ry    ...40000000
 9: st   Ry       ->(A2=R2)...40000000
10: add  Ry+Rz    ->Rz    ...4000aaaa
11: st   Rz       ->(A4=Rx)...4000aaaa
12: br   loop
```

FIG. 36(b)

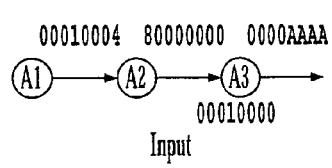

FIG. 36(c)

```
loop:(PC=1000)
    set  A1       ->R1
    ld   (A1=R1)  ->Rx    ...(00010008)
    set  A2       ->R2
    ld   (A2=R2)  ->Ry    ...(40000000)
    ld   (A4=Rx-4)->Rz    ...(4000aaaa)
    add  Rx+4     ->Rx    ...0001000c
    st   Rx       ->(A1=R1)...0001000c
    shift Ry      ->Ry    ...20000000
    st   Ry       ->(A2=R2)...20000000
    add  Ry+Rz    ->Rz    ...6000aaaa
    st   Rz       ->(A5=Rx)...6000aaaa
    br   loop
```

FIG. 36(d)

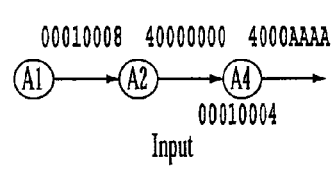

FIG. 36(e)

```
loop:(PC=1000)
    set  A1       ->R1
    ld   (A1=R1)  ->Rx    ...(0001000c)
    set  A2       ->R2
    ld   (A2=R2)  ->Ry    ...(20000000)
    ld   (A5=Rx-4)->Rz    ...(6000aaaa)
    add  Rx+4     ->Rx    ...00010010
    st   Rx       ->(A1=R1)...00010010
    shift Ry      ->Ry    ...10000000
    st   Ry       ->(A2=R2)...10000000
    add  Ry+Rz    ->Rz    ...7000aaaa
    st   Rz       ->(A6=Rx)...7000aaaa
    br   loop
```

FIG. 36(f)

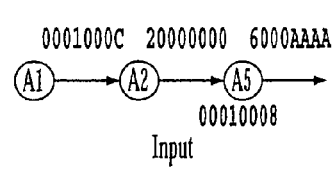

FIG. 37

Const-FLAG

| | |
|---|---|
| R1 | 1 |
| R2 | 1 |
| Rx | 0 |
| Ry | 0 |
| Rz | 0 |

Register/Memory Read

| | #1 | #2 | #3 |
|---|---|---|---|
| C-FLAG | change | change | |
| P-Mask | FFFFFFFF | FFFFFFFF | 00000000 |
| Address | A1 | A2 | A3 |
| Mask | FFFFFFFF | FFFFFFFF | FFFFFFFF |
| Value | 00010004 | 80000000 | 0000AAAA |

Register/Memory Write

| | #1 | #2 | #3 | #4 | #5 | #6 |
|---|---|---|---|---|---|---|
| C-FLAG | | | | | | |
| P-Mask | | | | | | |
| Address | Rx | Ry | Rz | A1 | A2 | A4 |
| Mask | FFFFFFFF | FFFFFFFF | FFFFFFFF | FFFFFFFF | FFFFFFFF | FFFFFFFF |
| Value | 00010008 | 40000000 | 4000AAAA | 00010008 | 40000000 | 4000AAAA |

FIG. 38(a)

| Address | A1 | A2 | |
|---|---|---|---|
| P-Mask | FFFFFFFF | FFFFFFFF | |
| Value | 00010004 | 80000000 | |

First loop

↓ diff=04  ↓ diff=-4

| Address | A1 | A2 | |
|---|---|---|---|
| P-Mask | FFFFFFFF | FFFFFFFF | |
| Value | 00010008 | 40000000 | |

Second loop

↓ diff=04  ↓ diff=-2

| Address | A1 | A2 | |
|---|---|---|---|
| P-Mask | FFFFFFFF | FFFFFFFF | |
| Value | 0001000C | 20000000 | |

Third loop

↓ diff=04  ↓ diff=-1

| Address | A1 | A2 | |
|---|---|---|---|
| P-Mask | FFFFFFFF | FFFFFFFF | |
| Value | 00010010 | 10000000 | |

Fourth loop

Assumption of distance ↓ diff=04  ↓ diff=??

FIG. 38(b)

Predicted value storing region    Waiting-required address storage region

| Address | A1 | A2 | A7 |
|---|---|---|---|
| Mask | FFFFFFFF | FFFFFFFF | FFFFFFFF |
| Value | 00010014 | 10000000 | ???????? |

Fifth loop
Predicted distance is 1 = allocation to MSP

| Address | A1 | A2 | A8 |
|---|---|---|---|
| Mask | FFFFFFFF | FFFFFFFF | FFFFFFFF |
| Value | 00010018 | 10000000 | ???????? |

Sixth loop
Predicted distance is 2 = allocation to SSP#1

| Address | A1 | A2 | A9 |
|---|---|---|---|
| Mask | FFFFFFFF | FFFFFFFF | FFFFFFFF |
| Value | 0001001C | 10000000 | ???????? |

Seventh loop
Predicted distance is 3 = allocation to SSP#2

| Address | A1 | A2 | A10 |
|---|---|---|---|
| Mask | FFFFFFFF | FFFFFFFF | FFFFFFFF |
| Value | 00010020 | 10000000 | ???????? |

Eighth loop
Predicted distance is 4 = allocation to SSP#3

FIG. 40 (a)

| | Register/Memory Read | | | Register/Memory Write | | | | | |
|---|---|---|---|---|---|---|---|---|---|
| | #1 | #2 | #3 | #1 | #2 | #3 | #4 | #5 | #6 |
| C-FLAG | change | change | | | | | | | |
| P-Mask | FFFFFFFF | FFFFFFFF | 00000000 | | | | | | |
| Address | A1 | A2 | A3 | Rx | Ry | Rz | A1 | A2 | A4 |
| Mask | FFFFFFFF | FFFFFFFF | FFFFFFFF | FFFFFFFF | FFFFFFFF | FFFFFFFF | FFFFFFFF | FFFFFFFF | FFFFFFFF |
| S-Count | | 0001 | | | | | 0001 | 0001 | 0001 |
| Value | 00010004 | 80000000 | 0000AAAA | 00010008 | 40000000 | 4000AAAA | 00010008 | 40000000 | 4000AAAA |

FIG. 40 (b)

First loop

| | | | |
|---|---|---|---|
| Address | A1 | A2 | A3 | A4 |
| P-Mask | FFFFFFFF | FFFFFFFF | 00000000 | FFFFFFFF |
| S-Count | 0001 | 0001 | | 0001 |
| Value | 00010004 | 80000000 | | |

Second loop

| Address | A1 | A2 | A4 | A5 |
|---|---|---|---|---|
| P-Mask | FFFFFFFF | FFFFFFFF | 00000000 | FFFFFFFF |
| S-Count | 0001 | 0001 | 0001 | 0001 |
| Value | 00010008 | 40000000 | | |

Third loop

| Address | A1 | A2 | A5 | A6 |
|---|---|---|---|---|
| P-Mask | FFFFFFFF | FFFFFFFF | 00000000 | FFFFFFFF |
| S-Count | 0001 | 0001 | | 0001 |
| Value | 0001000C | 20000000 | | |

Fourth loop

| Address | A1 | A2 | A6 | A7 |
|---|---|---|---|---|
| P-Mask | FFFFFFFF | FFFFFFFF | 00000000 | FFFFFFFF |
| S-Count | 0001 | 0001 | | 0001 |
| Value | 00010010 | 10000000 | | |

FIG. 41(a)

| Address | A1 | A2 | A3 |
|---|---|---|---|
| P-Mask | FFFFFFFF | FFFFFFFF | 00000000 |
| S-Count | 0001 | 0001 | 0001 |
| Value | 00010004 | 80000000 | |

First loop

↓ diff=04  ↓ diff=-4

| Address | A1 | A2 | A4 |
|---|---|---|---|
| P-Mask | FFFFFFFF | FFFFFFFF | 00000000 |
| S-Count | 0001 | 0001 | 0001 |
| Value | 00010008 | 40000000 | |

Second loop

↓ diff=04  ↓ diff=-2

| Address | A1 | A2 | A5 |
|---|---|---|---|
| P-Mask | FFFFFFFF | FFFFFFFF | 00000000 |
| S-Count | 0001 | 0001 | 0001 |
| Value | 0001000C | 20000000 | |

Third loop

↓ diff=04  ↓ diff=-1

| Address | A1 | A2 | A6 |
|---|---|---|---|
| P-Mask | FFFFFFFF | FFFFFFFF | 00000000 |
| S-Count | 0001 | 0001 | 0001 |
| Value | 00010010 | 10000000 | |

Fourth loop

Assumption of distance ↓ diff=04  ↓ diff=??

FIG. 41(b)

| | Predicted value storing region | | Waiting-required address storage region |
|---|---|---|---|
| Address | A1 | A2 | A7 |
| Mask | FFFFFFFF | FFFFFFFF | FFFFFFFF |
| S-Count | | 0000 | 0001 |
| Value | 00010014 | WAIT | WAIT |

Fifth loop
Predicted distance is 1 = allocation to MSP

| Address | A1 | A2 | A8 |
|---|---|---|---|
| Mask | FFFFFFFF | FFFFFFFF | FFFFFFFF |
| S-Count | | 0001 | 0001 |
| Value | 00010018 | WAIT | WAIT |

Sixth loop
Predicted distance is 2 = allocation to SSP#1

| Address | A1 | A2 | A9 |
|---|---|---|---|
| Mask | FFFFFFFF | FFFFFFFF | FFFFFFFF |
| S-Count | | 0002 | 0001 |
| Value | 0001001C | WAIT | WAIT |

Seventh loop
Predicted distance is 3 = allocation to SSP#2

| Address | A1 | A2 | A10 |
|---|---|---|---|
| Mask | FFFFFFFF | FFFFFFFF | FFFFFFFF |
| S-Count | | 0003 | 0001 |
| Value | 00010020 | WAIT | WAIT |

Eighth loop
Predicted distance is 4 = allocation to SSP#3

FIG. 42

Fifth loop (MSP)

```
loop:(PC=1000)
  set  A1      -> R1      ...(00010014)
  ld   (A1=R1) -> Rx      ...(08000000)
  set  A2      -> R2      ...(7800aaaa)
  ld   (A2=R2) -> Ry      ...00010018
  ld   (A7=Rx-4) -> Rx    ...00010018
  add  Rx+4    -> Rx
  st   Rx      -> (A1=R1) ...00010018
  shift Ry     -> Ry      ...04000000
  st   Ry      -> (A2=R2) ...04000000
  add  Ry+Rz   -> Rz      ...7c00aaaa
  st   Rz      -> (A8=Rx) ...7c00aaaa
  br   loop
```

Sixth loop (SSP#1)

| Address | A1 | A2 | A8 |
|---|---|---|---|
| Mask | FFFFFFFF | FFFFFFFF | FFFFFFFF |
| S-Count | 0001 | 0001 | 0001 |
| Value | 00010018 | WAIT | WAIT |

```
loop:(PC=1000)
  set  A1      -> R1
  ld   (A1=R1) -> Rx      ...(00010018)
  set  A2      -> R2
```

| Address | A1 | A2 | A8 |
|---|---|---|---|
| Mask | FFFFFFFF | FFFFFFFF | FFFFFFFF |
| S-Count | 0000 | 0000 | 0000 |
| Value | 00010018 | 04000000 | 7C00AAAA |

```
  ld   (A2=R2)   -> Ry    ...(04000000)
  ld   (A8=Rx-4) -> Rz    ...7c00aaaa
  add  Rx+4      -> Rx    ...0001001c
  st   Rx        -> (A1=R1) ...0001001c
  shift Ry       -> Ry    ...02000000
  st   Ry        -> (A2=R2) ...02000000
  add  Ry+Rz     -> Rz    ...7e00aaaa
  st   Rz        -> (A9=Rx) ...7e00aaaa
  br   loop
```

```
         00010018 04000000 7C00AAAA
                    ↑
        (A1)→(A2)→(A4)
              Input   00010014
```

| Rx | 0001001C |
|---|---|
| Ry | 02000000 |
| Rz | 7E00AAAA |
| A1 | 0001001C |
| A2 | 02000000 |
| A9 | 7E00AAAA |

Output

Seventh loop (SSP#2)

| Address | A1 | A2 | A9 |
|---|---|---|---|
| Mask | FFFFFFFF | FFFFFFFF | FFFFFFFF |
| S-Count | 0001 | 0002 | 0001 |
| Value | 0001001C | WAIT | WAIT |

```
loop:(PC=1000)
  set  A1      -> R1
  ld   (A1=R1) -> Rx      ...(0001001c)
  set  A2      -> R2
```

| Address | A1 | A2 | A9 |
|---|---|---|---|
| Mask | FFFFFFFF | FFFFFFFF | FFFFFFFF |
| S-Count | 0000 | 0000 | 0000 |
| Value | 0001001C | 02000000 | 7E00AAAA |

```
  ld   (A2=R2)    -> Ry    ...(02000000)
  ld   (A9=Rx-4)  -> Rz    ...(7e00aaaa)
  add  Rx+4       -> Rx    ...00010020
  st   Rx         -> (A1=R1) ...00010020
  shift Ry        -> Ry    ...01000000
  st   Ry         -> (A2=R2) ...01000000
  add  Ry+Rz      -> Rz    ...7f00aaaa
  st   Rz         -> (A10=Rx) ...7f00aaaa
  br   loop
```

```
         0001001C 02000000 7E00AAAA
                      ↑
          (A1)→(A2)→(A5)
                Input   00010018
```

| Rx | 00010020 |
|---|---|
| Ry | 01000000 |
| Rz | 7F00AAAA |
| A1 | 00010020 |
| A2 | 01000000 |
| A10 | 7F00AAAA |

Output

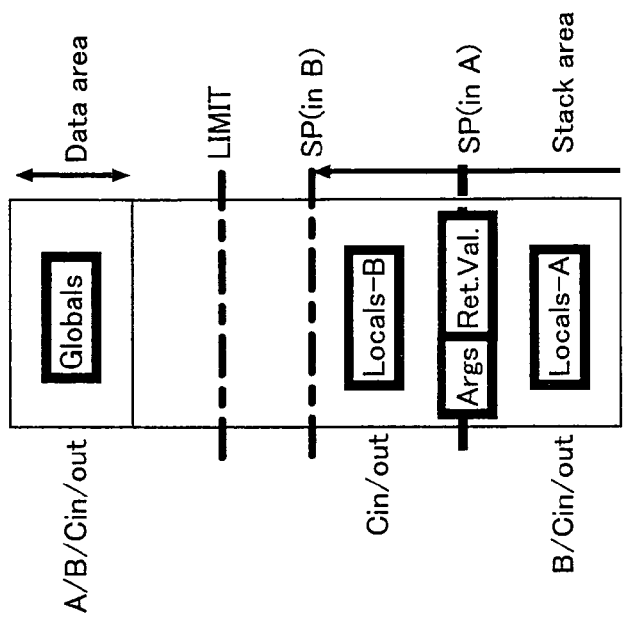
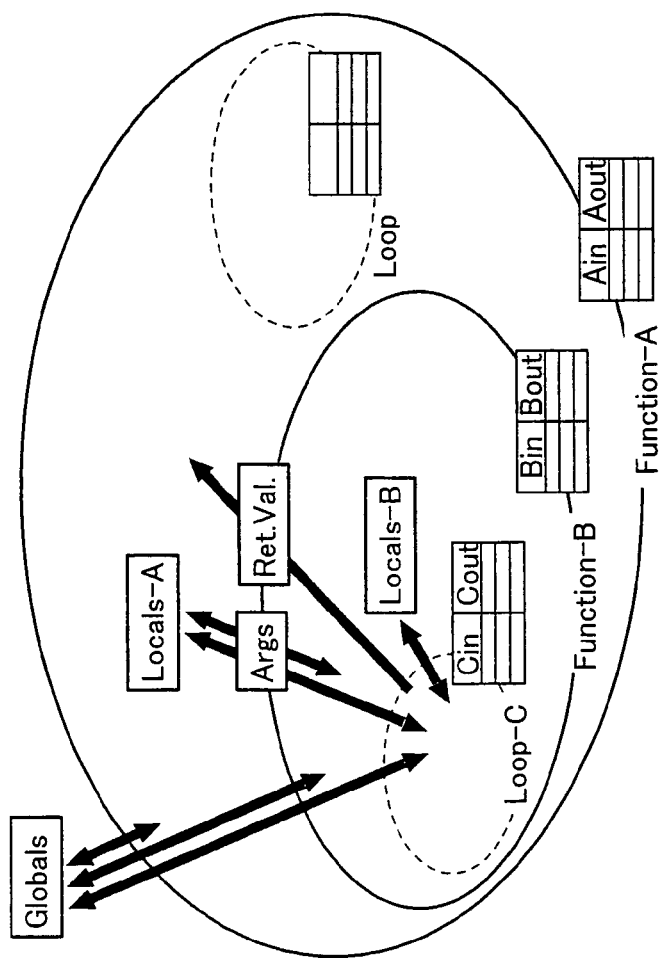
FIG. 46 (b)
FIG. 46 (a)

FIG. 49

```
PC:1000
  set A1->R0
  ld  (R0)->R1
  set A2->R0
  ldb (R0)->R2
  ldb (A2+R2)->R2
  set A3->R0
  ldb (R0)->R3
  ldb (A4=R1+R2)->R4
  add R5+1->R5
```

FIG. 51

Register/Memory Read

| | #1 | #2 | #3 | #4 | #5 END |
|---|---|---|---|---|---|
| Address | A1 | A2 | A3 | A4 | R5 |
| Mask | FFFFFFFF | FF00FF00 | 00FF0000 | 00FF0000 | FFFFFFFF |
| Value | 00110000 | 02--22-- | ---33--- | ---44--- | 00000100 |

Register/Memory Write

| | #1 | #2 | #3 | #4 | #5 END |
|---|---|---|---|---|---|
| Address | R1 | R2 | R3 | R4 | R5 |
| Mask | FFFFFFFF | FFFFFFFF | FFFFFFFF | FFFFFFFF | FFFFFFFF |
| Value | 00110000 | 00000022 | 00000033 | 00000044 | 00000101 |

FIG. 52

| Address | A1 | A2 | A3 | A4 | R5 | |
|---|---|---|---|---|---|---|
| Mask | FFFFFFFF | FF00FF00 | 00FF0000 | 00FF0000 | FFFFFFFF | Time=1 |
| Value | 00110000 | 02--22-- | --33---- | --44---- | 00000101 | | diff=00 | diff=?? | diff=00 | diff=00 | diff=01

| Address | A1 | A2 | A3 | A4 | R5 | |
|---|---|---|---|---|---|---|
| Mask | FFFFFFFF | FF0000FF | 00FF0000 | 00FF0000 | FFFFFFFF | Time=2 |
| Value | 00110000 | 03----23 | --33---- | --44---- | 00000102 | | diff=00 | diff=?? | diff=?? | diff=11 | diff=??

| Address | A1 | A2 | A2+4 | A3 | A4 | |
|---|---|---|---|---|---|---|
| Mask | FFFFFFFF | FF000000 | FF000000 | 00FF0000 | 00FF0000 | Time=3 |
| Value | 00110000 | 04------ | 24------ | --33---- | --44---- | | diff=00 | diff=01 | diff=?? | diff=22 | diff=00

| Address | A1 | A2 | A2+4 | A3 | A4 | |
|---|---|---|---|---|---|---|
| Mask | FFFFFFFF | FF000000 | 00FF0000 | 00FF0000 | 00FF0000 | Time=4 |
| Value | 00110000 | 05------ | --25---- | --55---- | --44---- | |

Assumption of distance | diff=00 | diff=01 | diff=00 | diff=22 | diff=00

FIG. 53

| Address | A1 | A2 | A2+4 | A3 | A4 | |
|---|---|---|---|---|---|---|
| Mask | FFFFFFFF | FF000000 | 00FF0000 | 00FF0000 | 00FF0000 | Predicted distance=1 |
| Value | 00110000 | 06------ | --25---- | --77---- | --44---- | |

| Address | A1 | A2 | A2+4 | A3 | A4 | |
|---|---|---|---|---|---|---|
| Mask | FFFFFFFF | FF000000 | 00FF0000 | 00FF0000 | 00FF0000 | Predicted distance=2 |
| Value | 00110000 | 07------ | --25---- | --99---- | --44---- | |

| Address | A1 | A2 | A2+4 | A3 | A4 | |
|---|---|---|---|---|---|---|
| Mask | FFFFFFFF | FF000000 | 00FF0000 | 00FF0000 | 00FF0000 | Predicted distance=3 |
| Value | 00110000 | 08------ | --25---- | --BB---- | --44---- | |

| Address | A1 | A2 | A2+4 | A3 | A4 | |
|---|---|---|---|---|---|---|
| Mask | FFFFFFFF | FF000000 | 00FF0000 | 00FF0000 | 00FF0000 | Predicted distance=4 |
| Value | 00110000 | 09------ | --25---- | --DD---- | --44---- | | ized
DATA PROCESSING DEVICE FOR IMPLEMENTING INSTRUCTION REUSE, AND DIGITAL DATA STORAGE MEDIUM FOR STORING A DATA PROCESSING PROGRAM FOR IMPLEMENTING INSTRUCTION REUSE This application is the US national phase of international application PCT/JP2005/005591 filed 25 Mar. 2005, which designated the U.S. and claims priority of JP 2004-097197, JP 2004-266056, JP 2004-324348 and JP 2004-347124 filed 29 Mar. 2004, 13 Sep. 2004, 8 Nov. 2004 and 30 Nov. 2004 respectively, the entire contents of each of which are hereby incorporated by reference.

TECHNICAL FIELD

The present invention relates to a data processing device that reads out, from main storage means, a sequence of instructions and/or values, and writes a result of an arithmetic process into the main storage means.

BACKGROUND ART

In the field of microprocessors such as a CPU (Central Processing Unit), there have recently been eager researches on speeding up computation. Examples of techniques for the steeping up include pipelining, superscalar, out-of-order execution, and register renaming.

Pipelining is a technique in which execution of instructions is divided into one or more stages and the instructions are concurrently executed like an assembly-line system. Superscalar is a technique in which two or more circuits concurrently execute instructions in parallel. Out-of-order execution is a technique in which executable instructions among sequences of instructions are picked out and executed irrespective of the prescribed order of instructions. Register renaming is a technique in which, in a CISC (Complex Instruction Set Computer) processor, for instance, the probability of parallelism is increased by increasing the number of general registers, while the compatibility of instructions with conventional processors is maintained.

As described above, parallel execution of instructions is important for speeding up computation in microprocessors. Nonetheless programs typically include such a dependency relation that an instruction is executed in response to the result of another instruction, i.e. typically include branches. If such a branch is included, a result of an instruction precedently executed in parallelism may be nullified as a result of the branch. This deteriorates the effect of the speeding up.

To solve this problem, there have been various researches on techniques to predict a result of branch so as to reduce the probability of nullifying the result of precedent instruction execution and increase the performance of the speeding up. Such techniques are termed branch prediction.

In a case where speculative instruction execution is carried out based on the branch prediction, however, the following problem typically occurs: firstly, since it is necessary to verify the validity of a prediction at all time, execution times for a precedent sequence of instructions are not shortened; secondly, since it is necessary to nullify all results of preceding computations based on an erroneous prediction, sizable hardware costs are required for increasing the number of instructions to be subjected at once to speculative processing; and thirdly, increase in the number of dependency relations among instructions requires multiple speculative processing, causing the verification of the validity of a prediction and the nullification of computation based on an erroneous prediction to be enormously complicated.

Aside from the branch prediction, there has been proposed a speeding up technique termed value reuse. This value reuse is arranged such that, an input value and an output value regarding a part of a program are registered in a reuse table, and when the same part is executed again, the registered output value is output if the input value is identical with the input value registered in the reuse table. The value reuse is advantageous in the following points: (1) if the input value is identical with the input value registered in the reuse table, it is unnecessary to verify the execution result; (2) since hardware costs are determined only in accordance with the total number of input and output values, the lengths of omissible sequences of instructions are not limited; (3) the number of dependency relations among instructions is unrelated to the complexity of the reuse mechanism; and (4) redundant load/store instructions are eliminated, and power consumption is reduced accordingly.

Non-Patent Document ("Speedup Technique with Function Level Value Reuse and Parallel Precomputation", Yasuhiko Nakashima, Katsuya Ogata, Shingo Masanishi, Masahiro Goshima, Shin-ichiro Mori, Toshiaki Kitamura and Shinji Tomita, Information Processing Society of Japan journal: High-Performance Computing System, HPS5, pp. 1-12, September (2002), published on Sep. 15, 2002) discloses a technique in which the value reuse is applied to functions in a program. This conventional art takes advantage of the fact that a load module is typically generated based on ABI (Application Binary Interface), especially based on SPARC (Scalable Processor ARChitecture) ABI. The value reuse is achieved by specifying inputs and outputs of functions, based on the ABI. That is, it is unnecessary for the value reuse to carry out embedding of an exclusive instruction by using compiler, and hence this conventional art can be applied to conventional load modules.

Also, since a multiple structure of functions is dynamically grasped, a local variable on an in-function local register or a stack is excluded from input/output values to be reused. This improves efficiency. As to a function, in particular, up to six register inputs and four register outputs are available, and reuse and precomputation by registering minimum main storage values exclusive of a local variable are feasible, no matter how the function is complicated. The following describes this conventional art in detail.

First, a mechanism for clarifying, as to one function, what is input and what is output and for performing one-level reuse is discussed. In a program, functions typically have a multiple structure. FIG. 46(a) shows how a Function-A calls a Function-B.

Globals may be used as input/output (Ain/Aout) of the Function-A and/or input/output (Bin/Bout) of the Function-B. A local variable (Locals-A) cannot serve as input/output of the Function-A, but can serve as input/output of the Function-B on account of a pointer. An argument (args) from the Function-A to the Function-B may serve as an input to the Function-B. A return value (Ret.Val.) from the Function-B to the Function-A may serve as an output from the Function-B. It is noted that a local variable (Locals-B) of the Function-B is not included in the input/output of the Function-A and Function-B.

To reuse the Function-B without depending on the context, it is necessary to register, as input/output, only Bin/Bout of the Function-B, at the time of executing the Function-B. In relation to this, FIG. 46(b) shows a memory map of the main memory at the time of executing the program structure shown in FIG. 46(a). In this memory map, Locals-B is the only area where the Bin/Bout is not included. Therefore, to identify the Bin/Bout, it is necessary to specify (i) the border between Globals and Locals-B and (ii) the border between Locals-B and Locals-A. As to the former border, since an OS (operating System) typically determines the upper limits of a data size and stack size during execution, the border between Globals and Locals-B is determined based on the limit (LIMIT) determined by the OS. As to the latter border, it is possible to determine the border between Locals-A and Locals-B by using a value (SP in A) of a stack pointer immediately before the call of the function B.

Now, the following describes a method for identifying (i) whether a given main memory address is a global variable or a local variable, and (ii) if the address is a local variable, to which function the local variable belongs. The load module is assumed to satisfy the following conditions (1)-(3) defined by SPARC ABI. It is noted that % fp indicates a frame pointer, while % sp indicates a stack pointer.

(1) In an area not less than % sp, an area where % sp+0 to 63 is a register save area, and an area where % sp+68 to 91 is an argument save area. Neither one of these areas is input/output of a function.

(2) An implicit argument (Implicit Arg.) in a case where a structure is output is stored in % sp+64 to 67.

(3) An explicit argument (Explicit Arg.) is placed on % sp+92 or higher.

To distinguish global variables from local variables, the following conditions are set, for the reason that an OS typically determines the upper limits of a data size and stack size during execution.

(1) A global variable is placed in an area of less than LIMIT.

(2) Since % sp is not lower than LIMIT, an area of LIMIT to % sp is invalid.

FIG. 47 outlines arguments and frames in a memory map, in a case where the Function-A calls the Function-B while the conditions above are satisfied. Referring to this figure, the following describes a method of identifying local variables of the Function-A and local variables of the Function-B.

In the figure, indicated by (a) is a state during the execution of the Function-A. An area less than LIMIT, which is circumscribed by thick lines, stores Instructions and Global Vars, and an area of not less than % sp stores valid values. % sp+64 stores the leading address of the structure, as an implicit argument in a case where the Function-B outputs the structure. The leading six words of an explicit argument for the Function-B are stored in an area of register % o0 to 5, while the seventh word and the following words are stored in an area of not less than % sp+92. If an operand % sp+92 with the base register % sp appears, the area is the seventh words of the argument, i.e. a local variable of the Function-B. Meanwhile, if the operand % sp+92 does not appear, the area is a local variable of the Function-A. In this manner, during the state (a), the local variable of the Function-A is distinguished from the local variable of the Function-B, by checking the operand.

On this other hand, (b) indicates a state where the Function-B is executed. An argument may be an input, a return value may be an output, and a global variable and a local variable of the Function-A may be input/output. However, since the Function-B may accept a variable argument, basically it is not possible to determine whether an area of not less than % fp+92 is an area for a local variable of the Function-A or an area for a local variable of the Function-B.

To distinguish local variables, first, in the state (a), a function call in which the seventh word and the following words of the argument are detected is not the target of reuse, and as to a function call in which the seventh word and the following words are not detected, a value % sp92 is recorded immediately before the call. Note that, since the function call related to the seventh word and the following words is assumed not to frequently appear, it is possible to consider that the performance deterioration due to the exclusion of the function related to the seventh word and the following words is almost negligible.

Because of the above, it is possible to understand that the main storage reference address in the state (b) is either: a local variable of the Function-A if the address is not lower than the % sp+92 which has been stored in advance; or a local variable of the Function-B if the address is lower than the % sp+92. In a case where the Function-B is executed, a local variable of the Function A and a global variable are registered to the reuse table, while a local variable of the Function-B is excluded therefrom.

Since a local variable of the Function-B is excluded from the input/output at the time of the reuse, the address of a local variable of the Function-B is not required to correspond to the table. On this account, being independent of the context, it is possible to carry out the reuse if inputs corresponds to the table. Note that, however, as to a global variable to which the Function-B refers and a local variable of the Function-A, both the address and data must completely match with the content of the reuse table. That is, how main memory addresses to be compared are grasped before the execution of the Function-B is important.

Addresses of a global variable to which the Function-B refers and of a local variable of the Function-A are based on (i) an address constant generated by the Function-B and (ii) a pointer having its roots in a global variable/argument. Therefore, after an entry in the reuse table, which entry has a completely matched argument, is selected, all of the related main memory addresses are referred to and equal comparison is performed. As a result, main memory addresses to which the Function-B refers are found. Only in a case where all of the inputs match with the table, registered outputs (return value, global variable, and local variable of the Function-A) are reusable.

To achieve the function reuse, a function management table (RF) and an input/output recording table (RF) are provided as the reuse table. FIG. 48 shows a hardware configuration required for the reuse of one function. To reuse a plurality of functions, the same number of the configurations are required.

In the table, V stored in the RF and RB is a flag that indicates whether or not an entry is valid. LRU (Least Recently Used) is a hint for the replacement of an entry. Apart from V and LRU, the RF stores a leading address (Start) of the function and a main memory address (Read/Write) to be referred to. Apart from V and LRU, the RB stores % sp (SP) immediately before a function call, an argument (Args.) (V: valid entry, Val: value), a main memory value (Mask: valid bytes of Read/Write address, Value: value), and a return value (Return Values) (V: valid entry, Val: value).

Assume that the return value is stored in % i 0 to 1 (% o 0 to 1 in terms of leaf function) or in % f 0 to 1, and a return value (double-extended precision floating-point number) using % f 2 to 3 does not exist in the target program. Read addresses are collectively managed by the RF, and Mask and Value are managed by the RB. With this, the Read addresses and a plurality of entries in the RB are compared to the table at once, by a CAM (Content-Addressable Memory).

To reuse one function, first, at the time of executing the function, input/output information regarding arguments, return values, global variables, and local variables of upper functions are registered to the reuse table, while local variables are excluded from the registration. A value of an argument register where readout is precedently performed is registered as input/output of the function, while a value written into a return value register is registered as an output of the function. Values of other registers are not necessarily registered. In a similar manner, as to a reference to the main memory, a value in an address where readout is precedently performed is registered as an input, while writing is registered as an output.

Entries registered in the input/output table are enabled at the time of executing the return instruction, if a disturbance does not occur. Examples of the disturbance include (i) the next function is called before returning from the present function. (ii) inputs/outputs to be registered exceed the capacity of the reuse table, (iii) the seventh word of an argument is detected, and (iv) system call or interruption occurs in the midst.

Referring to FIG. 48, the following describes how omission of the execution of a function is carried out: before the call of the function, (1) a leading address of the function is looked for; (2) an entry which has a completely matched argument is selected; (3) all of related main memory addresses, i.e. Read addresses each having at least one enabled Mask, are referred to; and (4) equal comparison is performed. If all of the inputs match with the entry, (5) registered outputs (return value, global variable, and local variable of the Function-A) are written in.

An example of an instruction region is discussed. In the example, an instruction region shown in FIG. 49 is executed with the RF and RB arranged as shown in FIG. 48. In FIG. 49, PC indicates a PC value at the start of the instruction region. That is, the address of the start of the instruction region is 1000. FIG. 50 briefly shows an input address, input data, output address, and output data, which are registered in the RB, in a case where the instruction region shown in FIG. 49 is executed. FIG. 51 shows how the registration to the RB is actually carried out.

A first-row instruction (hereinafter first instruction; other instructions are also abbreviated in the same manner) causes a register R0 to be set at an address constant A1. A second instruction causes a register R1 to store 4-byte data (00110000) whose address is the content of the register R0 and which is loaded from the main memory. In this case, the address A1, mask (FFFFFFFF) (in the mask, F indicates a valid byte while 0 indicates invalid byte), and data (00110000) are registered, as inputs, in the first column on the Input-side of the RB. Meanwhile, the register number R1, mask (FFFFFFFF), and data (00000002) are registered, as outputs, in the Output-side first column of the RB.

A third instruction causes an address constant A2 to be set at the register R0. A fourth instruction causes a register R2 to store one-byte data (02) whose address is the content of the register R0 and which is loaded from the main memory. In this case, the address A2, mask (FF000000), and data (02) are, as inputs, registered in the Input-side second column of the RB. On this occasion, the remaining 3 bytes of the address A2 are "-" which indicates "Don't Care". The register number R2, mask (FFFFFFFF), and data (00000002) are, as outputs, registered in the Output-side second column of the RB.

A fifth instruction causes the register R2 to store one-byte data (22) loaded from an address (A2+R2). Since the address R2 has a value (02), the address (A2+02) and data (22) are additionally registered. as inputs, in the Input-side second column of the RB. On this occasion, the registration is carried out in a part corresponding to the address (A2+02), while parts corresponding to the addresses (A2+01) and (A2+03), respectively, are kept at "-" which indicates "Don't Care". Therefore, the mask corresponding to the address A2 is (FF00FF00). The register number R2, mask (FFFFFFFF), and data (00000022) are, as outputs, overwritten into the Output-side second column of the RB.

A sixth instruction causes an address constant A3 to be set at the register R0. A seventh instruction causes a register R3 to store one-byte data (33) whose address is the content of the register R0 and which is loaded from the main memory. In this case, the address A3, mask (00FF0000), and data (33) are, as inputs, registered in the Input-side third column of the RB. The register number R3, mask (FFFFFFFF), and data (00000033) are, as outputs, registered in the Output-side third column of the RB.

An eighth instruction causes a register R4 to store one-byte data (44) loaded from an address (R1+R2). In this case, since the addresses R1 and R2 are those of the registers which are overwritten in the instruction region, these addresses R1 and R2 are not the inputs of the instruction region. In the meanwhile, an address A4 generated by the address (R1+R2) is the input of the instruction region. Therefore, the address A4, mask (00FF0000), and data (44) are registered, as inputs, in the Input-side fourth column of the RB. The register number R4, mask (FFFFFFFF), and data (00000044) are, as outputs, registered in the Output-side fourth column of the RB.

By a ninth instruction, a value is read out from a register R5, and a result of adding one to the value is stored in the register R5. In this case, the register R5, mask, (FFFFFFFF), and data (00000100) are, as inputs, registered in the Input-side fifth column of the RB. Meanwhile, the register number R5, mask (FFFFFFFF), and data (00000101) are, as outputs, registered in the Output-side fifth column of the RB.

As described above, the following processes are carried out to perform the readout from the memory/register at the time of executing the instruction.

(1) The Output side of the RB is searched. If the address/register number thus read out has already been registered, the process terminates while the address/register number is not registered on the Input side.

(2) If the address/register number thus read out is not found in the Output side of the RB, the Input side of the RB is searched. If the address/register number thus read out has already been registered, the process terminates while the address/register number is not registered.

(3) If the registered address/register number thus registered is not found in the Input side of the RB, a new entry is added to the RB, and the address/register number and the value of the entry are registered.

For the writing into the memory/register at the time of executing the instruction, the following processes are carried out.

(1) The Output side of the RB is searched. If the address/register number thus read out has already been registered, the process terminates while the value is updated.

(2) If the registered address/register number thus read out is not found on the Output side of the RB, a new entry is added, and the address/register number and the value, which have been read out, are registered.

Patent Document (Japanese Laid-Open Patent Application No. 2004-258905 (Published on Sep. 16, 2004)) discloses a technique to perform parallel precomputation by using a plurality of processors, in the aforesaid arrangement for reuse. The document also discloses, as a technique to predict inputs in the parallel precomputation, such an arrangement that a stride prediction is carried out based on a difference between (i) the last-appeared argument and (ii) a pair of recently-appeared arguments.

Performing the above-described prediction makes it possible to effectively carry out the reuse based on a result predicted in advance, in a case where input parameters monotonously change in a continuous fashion as above.

According to the conventional art, however, in the RB, entries must be registered as different entries, if the content of at least one item of each entry is different. For this reason, the memory is not efficiently used in the RB.

Also, the reuse cannot be performed if at least one input pattern of the function to be executed is different from an input pattern in each entry of the RB.

FIG. 52 shows an example of histories registered on the input side of the RB, in a case where the instruction region shown in FIG. 49 is repeatedly executed. In this example, the instruction region is executed each time Time shifts to the next, from 1 to 4. Each time the instruction region is executed, the address A2 changes to (02), (03), (04), and (05). In accordance with these changes, values of other input items also change.

Indicated by "diff" between the neighboring histories is a variation of a corresponding input item. The aforesaid conventional input prediction is carried out based on the diff. FIG. 53 shows a result of a prediction based on the conventional input prediction.

For example, a content of a monotonously-changing address (address A2 in the aforesaid example), e.g. a loop control variable, is correctly predicted. However, if the instruction region includes an array element, generally a value of the array does not always monotonously change even if a subscript of the array monotonously changes. In the example shown in FIG. 52, a value loaded from the address A2 is the subscript of the array. When a reference to the main memory uses the subscript as an address, this address changes and hence the number of the input items registered as history also changes. In this case the changes in one column are not orderly, so that the precision of the prediction significantly deteriorates, as the column corresponding to the address A3 in FIG. 53 shows.

In an input prediction, a prediction of a value regarding an address whose content does not change is waste of hardware resource. In a case where a change of a value has no regularity, a prediction has to be carried out with the assumption that the difference is 0. Such a strained prediction, however, may further decrease the precision of the prediction. In the example shown in FIG. 53, the position of a mask must be predicted, regarding the address corresponding to A2+4. However, it is difficult to predict the change in a position of the mask. In such a case, direct reference to a main memory value is preferable to the prediction.

The problems above occur because all of registered addresses are uniformly dealt.

The present invention was done to solve the problems above, and the objective of the present invention is to provide a data processing device which can register, in instruction region storage means, an input/output group that is appropriate for reuse.

Also, the present invention was done to solve the problems above, and the objective of the present invention is to provide a data processing device which has a relatively simple structure but can register, in instruction region storage means, an input/output group suitable for reuse.

DISCLOSURE OF INVENTION

The present invention was done to solve the problems above, and the first objective of the present invention is to provide a data processing device which allows an input/output group suitable for reuse in instruction region storage means.

The second objective of the present invention is to provide a data processing device which is arranged in such a manner that a sequence of instructions and/or values are read out from main storage means and a result of an arithmetic process is written into the main storage means, and effective precomputation of an instruction region is realized by improving the accuracy of prediction.

To solve the problems above, the data processing device of the present invention, which reads out an instruction region from main memory means and writes a result of a computation into the main memory means, includes: first computing means for performing a computation based on the instruction region read out from the main memory means; a register by which the first computing means reads out or writes data to/from the main memory means; input/output generating means for generating an input/output group which is made up of an input pattern and an output pattern at the time of execution of the instruction region by the first computing means; and instruction region storage means for storing the input/output group generated by the input/output generating means, at the time of execution of the instruction region, if the input pattern of the instruction region is matched with an input pattern stored in the instruction region storage means, the first computing means performing reuse so that the output pattern, which is stored in the instruction region storage means in association with the input pattern, is outputted to the register and/or the main memory means, and the input/output generating means including: a dependency relations storage section which indicates from which input element in the input pattern each output element in the output pattern derives; and input/output group setting means for setting, based on information stored in the dependency relations storage section, an input/output group which is made up of an output pattern including at least one said output element and an input pattern including at least one said input element.

According to this arrangement, in a case where the first computing means executes an instruction region, if an input pattern of the instruction region is matched with an input pattern stored in the instruction region storage means, a reuse process is executed so that an output pattern which is stored in the instruction region storage means in association with the input pattern is outputted to the register and/or the main storage means. The input pattern and output pattern stored in the instruction region storage means are generated by the input/output generating means.

Based on the information regarding from which input element in the input pattern each output element in the output pattern derives, the input/output generating means sets an input/output group made up of an output pattern including one or more output element and an input pattern including one or more input element, and generates one or more input/output group thus set. Therefore, being different from a case where an input pattern and output pattern at the time of execution of an instruction region are simply registered in the instruction region storage means, an input/output group suitable for reuse can be registered in the instruction region storage means. It is therefore possible to improve the efficiency of search for reuse.

The aforesaid data processing device of the present invention may be arranged such that, in a case where a first group of input elements from which a first output element derives is all included in a second group of input elements from which a second output element different from the first output element derives, the input/output group setting means sets (i) the second group as the input pattern and (ii) the first group and the second group as the output pattern.

According to this arrangement, in a case where a group of input elements from which a first output element derives is all included in a group of input elements from which a second output element different from the first output element, these groups are regarded as one input/output group. This makes it possible to eliminate redundant input/output groups, and hence it is possible to prevent redundant registration of input/output groups in the instruction region storage means.

The aforesaid data processing device of the present invention may be arranged such that, in a case where there is no shared input element between a first group of input elements from which a first output element derives and a second group of input elements from which a second output element different from the first output element derives, the input/output pattern group setting means sets (i) a first input/output group in which the first group of the input elements is the input pattern and the first output element is the output pattern and (ii) a second input/output group in which the second group of the input elements is the input pattern and the second output element is the output pattern.

According to this arrangement, in a case where two input/output groups do not share any input element, these input/output groups are set as different input/output groups. When there is no shared input element, the input/output groups do not depend on one another. That is, reuse is feasible even when only a part of an input pattern and an output pattern of a previously-executed instruction region is matched. It is therefore possible to increase the feasibility of reuse.

The aforesaid data processing device of the present invention may be arranged such that, the dependency relations storage section is made up of a 2D-arranged memory in which the output elements are row elements and the input elements are column elements, and each of memory elements of the 2D-arranged memory has information regarding whether or not an output element corresponding to a row element of the memory element is derived from an input element corresponding to a column element of the memory element.

According to the arrangement above, the 2D-arranged memory indicates information regarding from which input element in the input pattern each output element in the output pattern derives. Therefore, the information can be stored in each memory element of the 2D-arranged memory, by simply storing 1 or 0 therein. Also, the aforesaid arrangement makes it possible to easily grasp the relationship between row elements or the like by performing a logical operation with respect to each memory element, for example.

The aforesaid data processing device of the present invention may be arranged such that, in a case where readout from the register and/or the main memory means is carried out when the first computing means performs the calculation of the instruction region, the input/output generating means performs: (1) when an address of the register and/or the main memory means from which the readout is carried out has been registered, as an output element, in the dependency relations storage section, a process to temporarily store a provisional matrix which is made up of a row element, of the dependency relations storage section, which element corresponds to the output element; (2) when an address of the register and/or the main memory means from which the readout is carried out is registered, as an input element rather than an output element, in the dependency relations storage section, a process to temporarily store a provisional matrix in which a memory element corresponding to a column, of the dependency relations storage section, which column corresponds to the input element is set at 1, and remaining memory elements are set at 0; and (3) when an address of the register or the main memory means from which the readout is carried out is registered, in the dependency relations storage section, as neither an output element nor an input element, a process to (i) register, as input elements, the address and its value in the dependency relations storage section, (ii) temporarily store a provisional matrix in which a memory element corresponding to a column, of the dependency relations storage section, which corresponds to the input element is set at 1, and remaining memory elements are set at 0, in a case where writing is carried out to the register and/or the main memory means, the input/output generating means performs: (4) when an address of the register and/or the main memory means to which the writing is carried out is registered as an output element, a process to (iii) update an output value corresponding to the registered output element to the written value, (iv) replace a row element, of the dependency relations storage section, which element corresponds to the registered output element, with a logical OR of all provisional matrices temporarily stored at the time, and (v) then initialize the temporarily-stored provisional matrices; and (5) when an address of the register and/or the main memory means to which the writing is carried out is not registered as an output element, a process to (vi) register the address and its value, as output elements, in the dependency relations storage section, (vii) replace a row element, of the dependency relations storage section, which corresponds to the output element, with a logical OR of all provisional matrices temporarily stored at the time, and (viii) then initialize the temporarily-stored provisional matrices.

According to the arrangement above, it is possible to precisely store, in the 2D-arranged memory in the dependency relations storage section, input/output relations at the time of execution of an instruction region, i.e. information regarding from which input element of the input pattern each output element in the output pattern derives.

The aforesaid data processing device of the present invention may be arranged such that, the input/output group setting means includes a rows AND comparison section which performs a logic operation AND of the row elements in the 2D-arranged memory, and in the dependency relations storage section, the input/output group setting means (i) extracts a group of row elements in which a logical AND of an inversion of a first row element and a second row element is all 0, and (ii) among the extracted group of the row elements, excludes, from a candidate as the input/output group, row elements other than a row element which includes the largest number of the input elements.

According to the arrangement above, a logical AND of the row elements is carried out so that row elements other than the row element which includes the largest number of input elements are excluded from the target of the input/output group. With this arrangement, in a case where a group of input elements from which a first output element derives is all included in a group of input elements from which a second output element different from the first output element, it is possible to regard these groups as one input/output group. This makes it possible to eliminate redundant input/output groups, and hence it is possible to prevent redundant registration of input/output groups in the instruction region storage means.

The aforesaid data processing device of the present invention may be arranged such that, the input/output group setting means includes a rows AND comparison section which performs a logic operation AND of the row elements in the 2D-arranged memory, and in the dependency relations storage section, the input/output group setting means sets, as the input/output group, a row element whose logical AND with any other row elements is all 0.

According to the arrangement above, a logical AND of the row elements is carried out so that a row element independent of other row elements is set as an input/output group. This arrangement makes it possible to extract input/output groups having no shared input element, i.e. those do not depend on one another. Therefore, reuse is feasible even when only a part of an input pattern and an output pattern of a previously-executed instruction region is matched. It is therefore possible to increase the feasibility of reuse.

The aforesaid data processing device of the present invention may be arranged such that, in regard of the instruction region processed by the first computing means, the second computing means subjecting the instruction region to a computation based on a predicted input value which is assumed to be inputted hereafter, and registering a result of the computation in the instruction region storage means. In this case, the second computing means performs a calculation based on a predicted input value, as to the instruction region being processed by the first computing means at the time, and the result of the computation is stored in the instruction region storage means. Therefore, if the same instruction region appears and an input identical with the predicted input value is done, it is possible to reuse a value stored in the instruction region storage means. For example, a predicted input value is likely to be correct in a case where an instruction region in which input values monotonously change. The aforesaid arrangement is therefore effective in such a case.

The aforesaid data processing device of the present invention may be arranged such that, the input/output group setting means includes: an output side group storage section which stores information of an input/output group to which each of the output elements belongs; an input side group storage section which stores information of an input/output group to which each of the input elements belongs; a temporal storage section which stores a changed dependency relation between an output element and an input element, when there is a change in the dependency relations storage section while the input/output group is generated; and a group temporal storage section which stores information of a changed input/output group when there is a change in the dependency relations storage section while the input/output group is generated.

According to the arrangement above, at the time of execution of an instruction region by the first computing means, if an input pattern of the instruction is matched with an input pattern stored in the instruction region storage means, a reuse process is carried out so that an output pattern, which is stored in the instruction region storage means in association with the input pattern, is outputted to the register and/or the main storage means. The input pattern and output pattern stored in the instruction region storage means are generated by the input/output generating means.

Based on information regarding from which input element in the input pattern each output element in the output pattern derives, the input/output generating means sets an input/output group including an output pattern including one or more output element and an input pattern including one or more input element, and sets one or more input/output group. Therefore, as compared to a case where an input pattern and an output pattern at the time of execution of an instruction are simply registered in the instruction region storage means, it is possible to register, in the instruction region storage means, an input/output group appropriate to reuse. The efficiency of search for reuse is therefore improved.

The input/output setting means includes an output side group storage section, an input side group storage section, a temporal storage section, and a group temporal storage section. That is, the temporal storage section makes it possible to recognize the history of an input/output group during the generation of the input/output group. Also, by setting the output side group storage section and the input side group storage section based on the aforesaid information, it is possible to easily set the input/output group. Therefore, the arrangement makes it possible to set an input/output group by using relatively small computing means, without performing a complicated arithmetic process.

The aforesaid data processing device of the present invention may be arranged such that, the input/output group setting means further includes a group management section that stores information of the input/output group which has already been allocated to the output element and/or the input element, while the input/output group is generated.

According to the arrangement above, the group management section makes it possible to recognize the input/output group having already used, during the generation of the input/output group. It is therefore possible to easily set the input/output group.

The aforesaid data processing device of the present invention may be arranged such that, the dependency relations storage section is made up of a 2D-arranged memory in which the output elements are row elements and the input elements are column elements, and each of memory elements of the 2D-arranged memory has information regarding whether or not an output element corresponding to a row element of the memory element is derived from an input element corresponding to a column element of the memory element.

According to the arrangement above, the 2D-arranged memory shows information regarding from which input element in the input pattern each output element in the output pattern derives. Therefore, the information can be stored in each memory element of the 2D-arranged memory, by simply storing 1 or 0 therein. Also, the aforesaid arrangement makes it possible to easily grasp the relationship between row elements or the like by performing a logical operation with respect to each memory element, for example.

The aforesaid data processing device of the present invention may be arranged such that, the temporal storage section stores a logical OR of memory elements of a plurality of rows in the dependency relations storage section, and the group temporal storage section stores (i) a logical OR of memory elements of a plurality of rows in the output side group storage section and/or (ii) a logical OR of memory elements corresponding to a plurality of input elements in the input side group storage section.

According to the arrangement above, the temporal storage section stores a logical OR of memory elements of rows in the dependency relations storage section. Therefore, with a relatively simple arrangement it is possible to construct the temporal storage section which stores changed dependency relations between an input eminent and an output element, in a case where there is a change in the dependency relations storage section during the generation of the input/output group. On the other hand, the group temporal storage section stores a logical OR of memory elements in the output side group storage section and/or the input side number storage section. Therefore, with a relatively simple arrangement it is possible to construct the group temporal storage section which stores changed information of the input/output group, in a case where there is a change in the dependency relations storage section during the generation of the input/output group.

The aforesaid data processing device of the present invention may be arranged such that, the input/output group setting means further includes a conditional branch storage section which stores, when a conditional branch instruction is detected while the input/output group is generated, information regarding an input element on which the conditional branch instruction depends.

According to the arrangement above, it is possible to store, in the conditional branch storage section, information regarding an input element related to the conditional branch. Therefore, even in a case where a conditional branch occurs during the execution of an instruction region, it is possible to accurately grasp the dependency relations of inputs and outputs.

The aforesaid data processing device of the present invention may be arranged such that, in a case where readout from the register and/or the main memory means is carried out while the first computing means performs a calculation of the input region, the input/output generating means performs: (1) when an address of the register and/or the main memory means from which the readout is carried out has been registered, as an output element, in the dependency relations storage section, a process to temporarily store, in the temporal storage section, a logical OR of (i) a row element, of the dependency relations storage section, which corresponds to the output element and (ii) the elements in the temporal storage section, and store, in the group temporal storage section, a logical OR of (iii) a row element, of the output side group storage section, which corresponds to the output element and (iv) the elements in the group temporal storage section; (2) when an address of the register and/or the main memory means from which the readout is carried out is registered, as an input element rather than an output element, in the dependency relations storage section, a process to store, in the temporal storage section, information in which a memory element corresponding to a column, of the dependency relations storage section, which corresponds to the input element is set at 1 and remaining memory elements are set at 0, and store, in the group temporal storage section, a logical OR of (v) elements, in the input side group storage section, which correspond to the input element and (vi) the elements in the group temporal storage section; and (3) when an address of the register and/or the main memory means from which the readout is carried out is not registered in the dependency relations storage section as either an output element or an input element, a process to register, as input elements, the address and its value in the dependency relations storage section, and temporarily store a provisional matrix in which a memory element corresponding to a column, of the dependency relations storage section, which corresponds to the input element is set at 1 while remaining memory elements are set at 0, in a case where writing is carried out to the register and/or the main memory means, the input/output generating means performs: (4) when an address of the register and/or the main memory means to which the writing is carried out is registered as an output element, a process to update an output value corresponding to the registered output element to the written value, replace a row element, of the dependency relations storage section, which corresponds to the registered output element, with the information temporarily stored in the temporal storage section at the time, and update (viii) the information in the output side group storage section, which information corresponds to the output element, and (ix) the information in the input side group storage section, which information corresponds to the input elements on which the output element depends, based on the information stored in the group temporal storage section; and (5) when an address of the register and/or the main memory means to which the writing is carried out is not registered as an output element, a process to register the address and its value, as output elements, in the dependency relations storage section, replace a row element, of the dependency relations storage section, which corresponds to the output element, with the information temporarily stored in the temporal storage section at the time, and update (x) the information, in the output side group storage section, which information corresponds to the output element, and (xi) the information, in the input side group storage section, which information corresponds to the input elements on which the output element depends, based on the information stored in the group temporal storage section.

By the processes above, it is possible to properly store, in the 2D-arranged memory of the dependency relations storage section, the input/output relations at the time of execution of an instruction region, i.e. information regarding fro which input element in the input pattern each output element in the output pattern derives, and also possible to properly set the input/output group.

The aforesaid data processing device of the present invention may be arranged such that, the instruction region storage means includes input pattern storage means which stores the input patterns as a tree structure in which items to be subjected to equal comparison are regarded as nodes.

According to the arrangement above, an item shared between a plurality of input patterns is stored as one node. It is therefore possible to reduce the redundancy in the content of the input pattern storage means. Since the required capacity of the instruction region storage means is reduced the costs of the data processing device is also reduced.

In a case where the input pattern storage means is, for example, made up of an associative search device, past input patterns are likely to be registered as divided groups. Therefore, it is possible the feasibility to perform search of a plurality of input patterns at once. That is, long latency and high throughput, which are the characteristics of typical associative search devices are effectively obtained. Also, Since past input patterns are likely to be registered as divided groups, the feasibility of the reuse of an input pattern is improved.

The aforesaid data processing device of the present invention may be arranged such that, the input pattern storage means realizes the tree structure in such a manner that a value of an item in the input pattern, which item is subjected to equal comparison, is stored in association with an item to be subjected to comparison next.

In this case, items which should be subjected to equal comparison are serially subjected to equal comparison. Therefore, it is possible to store an input pattern as a tree structure in which items which should be subjected to equal comparison are regarded as nodes.

The aforesaid data processing device of the present invention may be arranged such that, the input pattern storage means includes associative search means and additional storage means, the associative search means includes one or more search target line which includes: a value storage area where a value of an item to be subjected to equal comparison is stored; and a key storage area where a key for identifying each item is stored, and the additional storage means has a search item designation area in which an item to be subjected to associative search next is stored in accordance with a corresponding line corresponding to said one or more search target line.

In this case, as a value of an item which should be subjected to equal comparison is supplied to the associative search means, a search target line in which the value is matched with a key is single-matched, and an item to be subjected to associative search next is determined by a corresponding line, of the additional storage means, which line corresponds to the single-matched search target line.

Since each input pattern is stored as a tree structure in which an item to be subjected to equal comparison is regarded as node as above, a matching search target regarding an item is one (single match) as above, in the associative search means. An associative search memory only with a single-match mechanism is basically commercially available, but an associative search memory which can analogously perform both multiple matches and a single match is generally not commercially available. Therefore, since a commercially-available associative search memory can be used, it is possible to realize the data processing device of the present invention, with a short period and low costs.

The data processing device of the present invention, which reads out an instruction region from main memory means and writes a result of a computation into the main memory means, includes: first computing means for performing a computation based on the instruction region read out from the main memory means; a register by which the first computing means reads out or writes data to/from the main memory means; and input/output pattern storage means for storing an input pattern and an output pattern which are a result of execution of a plurality of instruction regions, in a case where the first computing means executes an instruction region and an input pattern of the instruction region is matched with an input pattern stored in the input/output storage means, a reuse process is performed so that an output pattern, which is stored in the input/output storage means in association with the input pattern, is outputted to the register and/or the main memory means, the data processing device further comprising: registration processing means for (i) distinguishing, among the input elements in the input pattern, an input element to be subjected to prediction from an input element not requiring prediction, at the time of storing, in the input/output storage means, a result of execution of the instruction region by the first computing means, and (ii) registering, in the input/output storage means, information regarding the distinction; prediction processing means for predicting a variation of a value of the input element to be subjected to prediction among the input elements stored in the input/output storage means, based on the information regarding the distinction; and second computing means for subjecting the instruction region to precomputation, based on the input element predicted by the prediction processing means, a result of the precomputation of the instruction region by the second computing means being stored in the input/output storage means.

According to the arrangement above, the input/output storage means stores input patterns and output patterns as a result of execution of a plurality of instruction regions, and reuse is carried out when, at the time of execution of an instruction region, an input pattern of the instruction region is matched with an input pattern stored in the input/output storage means. The prediction processing means predicts a future variation of an input element stored in the input/output storage means, and the second computing means performs precomputation of an instruction region, based on the prediction result.

The aforesaid conventional technique has such a problem that, when a prediction of an input element is carried out in a simple manner, the predictability is low and hence the effect of precomputation based on the prediction is very low. On the other hand, according to the arrangement above, first, the registration processing means distinguishes an input pattern which should be subjected to a prediction from an input pattern not requiring a prediction, among the input elements in the input pattern. Then the prediction processing means performs a prediction as to an input element which is determined, by the registration processing means, as the target of the prediction. Since the predictability improves because of the above, effective precomputation of an instruction region is realized. With such precomputation, a value stored in the instruction sequence storage means is reusable in case where the same sequence of instruction appears and an input identical with the predicted input value is done.

The aforesaid data processing device of the present invention may be arranged such that, in a case where (i) an address of the register used for input is used as a stack pointer or a frame pointer or (ii) a writing instruction to the address is a constant setting instruction, the registration processing means sets a constant flag in the address, as the information for the distinction, while in a case where neither (i) or (ii) holds true, the registration processing means resets a constant flag of the address.

According to the arrangement above, among addresses of registers used for the input, it is possible to set a constant flag in an address which is fixed and whose value presumably changes monotonously. Therefore, the predictability is improved by performing a prediction with respect to an input element based on an address of a register in which a constant flag is set.

The aforesaid data processing device of the present invention may be arranged such that, in a case where an input element is newly stored in the input/output storage means, the registration processing means resets, as the information for the distinction, a change flag in an address of the input element, while, in a case where, after the input element is stored in the input/output storage means, a storing instruction is executed with respect to the address, the registration processing means sets a change flag in the address.

According to the arrangement above, a change flag is reset as to an address which has been stored in the input/output storage means but to which writing has not performed. The content of such an address has not been changed, and hence it is unnecessary to subject this address to a prediction. That is, a prediction performed only with respect to those requiring the same is realized by providing the aforesaid change flag in an address of an input element. This makes it possible to efficiently use hardware resources for prediction.

The aforesaid data processing device of the present invention may be arranged such that, in a case where an input element is newly stored in the input/output storage means, the registration processing means resets, as the information for the distinction, a history flag in an address of the input element, while, in a case where, at the time of execution of a load instruction with respect to the address, the constant flag is set in a register address from which the address is generated, the registration processing means sets a history flag in the address.

According to the arrangement above, in a case where a load instruction is executed with respect to an address of an input element stored in the input/output storage means and the aforesaid constant flag is set in the register address that generated the address to which the load instruction is executed, a history flag is set7 in that address. The register address to which the constant flag is set is, as described above, an address which is fixed and whose value presumably changes monotonously. It is therefore assumed that a prediction based on an address generated based on the register address is accurately carried out. In other words, providing a history flag as above makes it possible to properly set an address to be subjected to a prediction.

The history flag may be an actual flag set in each address or may be realized as a mask indicating the location of a byte as a target of history storage, in an address made up of sets of byte data.

The aforesaid data processing device of the present invention may be arranged such that, in a case where an input element is newly stored in the input/output storage means, the registration processing means resets, as the information for the distinction, a flag of an address of the input element, while, after the input element is stored in the input/output storage means, a storing instruction is executed with respect to the address, the registration processing means sets a change flag in the address, and the prediction processing means performs prediction of a variation of an input element, as to an address in which the change flag and the history flag are set, among addresses of the input elements stored in the input/output storage means.

As described above, an address in which a change flag is set is promising in terms of the effect of a prediction. Also, as described above, an address in which a history flag is set is highly likely to be predictable. Therefore, according to the arrangement above, a prediction is performed only with respect to highly predictable addresses. On this account, hardware resources for prediction are efficiently used.

The aforesaid data processing device of the present invention may be arranged such that, the prediction processing means performs prediction of a variation of an input element, only as to an input element in which a variation of a value of the input element in the history is not 0, among the input elements stored in the input/output storage means.

According to this arrangement, a prediction of a variation of a value of an input element is performed only with respect to input elements whose variation in a history is not 0. An input element whose variation in a history is 0 is assumed to remain unchanged, and hence it is unnecessary to perform a prediction of such an input element. Therefore, according to the arrangement above, a prediction is carried out only with respect to those requiring a prediction. On this account, hardware resources for prediction are efficiently used.

The aforesaid data processing device of the present invention may be arranged such that, when the result of execution of the instruction region by the first computing means is stored in the input/output storage means, the registration processing means (i) distinguishes, among the input elements in the input pattern, an input element to be subjected to prediction from an input element not requiring prediction, (ii) registers information regarding the distinction in the input/output storage means, (iii) counts how many times storing is carried out at the time of execution of the instruction region, as to the output elements of the output pattern stored in the input/output storage means, and (iv) store the counted value in the input/output storage means, and the second computing means (i) subjects the instruction region to precomputation, based on the input element having been predicted by the prediction processing means, and (ii) performs the precomputation of the instruction region by waiting for a time corresponding to the number of times of storing performed with respect to the input element based on the counted value, and then performing readout from the main memory.

According to the arrangement above, as to an output element in the output pattern stored in the input/output storage means, to which output element the storing is performed, the registration processing means counts how many times the storing is performed while the execution of the instruction region. The registration processing means then stores the counted value in the input/output storage means. The prediction processing means performs precomputation of the corresponding instruction region by performing readout from the main memory after waiting for a time corresponding to the number of times of the storing with respect to the input element performed based on the counted value. Therefore, for example, a prediction is difficult as to an output element whose value inconsistently changes. In such a case, the readout from the main memory is carried out after waiting for a time corresponding to the number of times of the storing counted as above, so that precomputation in a state that a suitable value of an input element is set is achieved.

With the arrangement above, precise precomputation is realized. With such precomputation, the feasibility of reuse of a value stored in the input/output storage means is further improved in a case where the same sequence of instructions appears and the same input as the predicted input value is done.

The aforesaid data processing device of the present invention may be arranged such that, the input/output storage means includes an input/output storage area which temporarily stores an input pattern and an output pattern which are the result of execution of the instruction region by the first computing means, and the input/output storage area includes a store counter which counts how many times the storing is carried out with respect to each of the output elements.

According to the arrangement above, the input/output storage means has an input/output storage area, and a store counter that stores the number of times of the storing performed with respect to each output element is provided in the input./output storage area. With this, when the first computing means executes an instruction region, it is possible to precisely store the number of times of the storing performed with respect to each output element, at the time of execution of the instruction region.

The aforesaid data processing device of the present invention may be arranged such that, the input/output storage means includes a history storage area which stores a history of a past result of execution of each instruction region subjected to computation by the first computing means, and the registration processing means (i) stores, in the history storage area, the result of execution which is stored in the input/output storage area, and (ii) with respect to an input element having an address identical with an address of an output element which is stored, in the history storage area, as a result of execution of the last time, registers a store counter of a corresponding directly-preceding output element, as a store counter of the input element.

According to this arrangement, first, results of executions stored in the input/output storage area is serially stored in the history storage area provided for each of the instruction region. Then, with respect to an address of an input element, which address is identical with the output element registered in the history storage area as the previous execution result, among the input elements supplied from the input/output storage area to the history storage area, a store counter of the corresponding previous output element is registered as a store counter of that input element. Among the input elements stored in the history storage area, an input element whose address is identical with the address of the output element which is the previous execution result is influenced by the previous execution result. Therefore, setting the store counter in the input element as above makes it possible to precisely set the number of times of the storing during which waiting is performed, on the occasion of performing a prediction of the input element.

The aforesaid data processing device of the present invention may be arranged such that, the input/output storage means includes a predicted value storage area which stores an input element predicted by the prediction processing means, and the prediction processing means subjects, to prediction, an input element whose value consistently varies between execution histories, among the input elements stored in the history storage area, and stores a result of the prediction in the predicted value storage area.

According to the arrangement above, the input/output storage means is provided with a predicted value storing region. The prediction processing means performs a prediction of a value as to an input element whose variation in an execution history is consistent, and stores the result in the predicted value storing region. Since an input element whose variation (differences) in the execution result of the instruction region in the history is consistent is highly likely to be consistent in the future. It is therefore possible to perform a prediction based on this. A result of such a prediction is stored in the predicted value storing region, and hence a predicted value which is highly accurately predicted is set.

The aforesaid data processing device of the present invention may be arranged such that, the input/output storage means includes a waiting-required address storage area which stores an input element that should be read out from the main memory after waiting for a time corresponding to the number of times of the storing, and with respect to an input element whose address in an execution histories does not change and whose variation of a value between the execution histories is inconsistent, the prediction processing means stores, in the waiting-required address storage area, the store counter and a waiting counter as a value based on a predicted distance.

According to the arrangement above, the input/output storage means is provided with a waiting-required address storage region. The prediction processing means stores, in the waiting-required address storage region, the store counter and an waiting counter as a value based on a predicted distance, as to an input element whose address in the execution history does not change and whose variation of the value in the execution history is inconsistent. The predicted distance indicates how many times the execution is performed from the present, if the instruction region is repeatedly executed hereafter. An input element whose address in the execution history does not change and whose variation of the value in the execution history is inconsistent is such that the storing to the address is carried out each time the instruction region is repeatedly executed. Therefore, setting the waiting counter in accordance with the store counter and the predicted distance makes it possible to suitably set the number of times corresponding to a time for waiting.

The aforesaid data processing device of the present invention may be arranged such that, the input/output storage means includes a waiting-required address storage area which stores an input element that should be read out from the main memory after waiting for a time corresponding to the number of times of the storing, and with respect to an input element whose address changes between execution histories and values of changed addresses change on account of the storing, among the input elements stored in the history storage area, the prediction processing means stores, in the waiting-required address storage area, a waiting counter as a value based on the store counter.

According to the arrangement above, the input/output storage means is provided with a waiting-required address storage region. The prediction processing means stores, in the waiting-required address storage region, a waiting counter as a value based on the store counter, with respect to an input element whose address changes in the execution history and in which a value of the address changes on account of the storing. An input element whose address changes in the execution history and in which a value of the address changes on account of the storing has an address that changes each time the instruction region is repeatedly executed, and a variation of the value is inconsistent. Therefore, setting the waiting counter in accordance with only the store counter makes it possible to suitably set the number of times corresponding to a time for waiting.

The aforesaid data processing device of the present invention may be arranged such that, in a case where the second computing means reads out a value from the main storage means, a store counter value is not set in the predicted value storing region, and a predicted value is valid, the predicted value is read out and set as a value, and waiting is performed until the store counter becomes if the store counter is more than 0, and then the value is fetched once the store counter becomes 0.

The aforesaid data processing device of the present invention may be arranged such that, when the second computing means writes a value into the main storage means, the written address and value are notified to another second computing means, and said another second computing means receiving the notification stores the written value after subtracting the store counter of the input element by 1, while do not perform anything if the store counter has already been 0.

BRIEF DESCRIPTION OF DRAWINGS

FIG. 4(*b*) shows another example of the associative search of the instruction region storage section.

FIG. 5(*b*) illustrates a further example of the associative search of the instruction region storage section.

FIG. 11 shows an example of an instruction region.

FIG. 14 illustrates a case where an input/output set generated by the RW of the second example is registered in the form of a tree structure.

FIG. 15 shows an example of the instruction region.

FIG. 32 shows an example of how histories are registered in the RB, in a case where an instruction region is repeatedly executed.

FIG. 33 shows input items that are recorded, as predicted entries, in the RB, in a case where a prediction processing section predicts values of addresses A2 and R5.

FIG. 36(*a*) shows an example of an instruction region.

FIG. 36(*b*) briefly shows input addresses and input data which are registered in the RB and output addresses and output data, in a case where the instruction region shown in FIG. 36(*a*) is executed.

FIG. 36(*c*) shows an example of a second loop process which is executed subsequent to the instruction region shown in FIG. 36(*a*).

FIG. 36(*d*) briefly shows input addresses and input data which are registered in the RB of FIG. 36(*c*) and output addresses and output data.

FIG. 36(*e*) shows an example of a third loop process which is executed subsequent to the instruction region shown in FIG. 36(*c*).

FIG. 36(*f*) briefly shows input addresses and input data which are registered in the RB of FIG. 36(*e*) and output addresses and output data.

FIG. 37 shows how registration in the RB is actually carried out when the instruction region shown in FIG. 36(*a*) is executed.

FIG. 38(*a*) shows an example of registration of histories in the RB, in a case where the instruction region shown in FIG. 36(*a*) is repeatedly executed.

FIG. 38(*b*) shows input items recorded, as predicted entries, in the RB, in a case where a prediction processing section predicts a value of an address A1.

FIG. 40(*a*) shows an example of input/output recording rows in the RB.

FIG. 40(*b*) shows an example of history recording rows in the RB.

FIG. 41(*a*) shows an example of registration of history recording rows, in a case where the instruction region shown in FIG. 36(*a*) is repeatedly executed.

FIG. 41(*b*) shows an example of a predicted value storing region and a waiting-required address storage region, in a case where the prediction processing section performs a prediction described below, based on the histories shown in FIG. 41(*a*).

FIG. 42 shows an example of precomputation based on predicted values.

FIG. 46(*a*) is a conceptual diagram of a structure in which a Function-A calls a Function-B.

FIG. 46(*b*) shows a memory map in a main memory at the time of execution of the program structure shown in FIG. 46(*a*).

FIG. 49 shows an example of the instruction region.

FIG. 51 shows how registration in the RB is actually carried out.

FIG. 52 shows an example of histories registered on the input side of the RB, in a case where the instruction region shown in FIG. 49 is repeatedly executed.

FIG. 53 shows a result of a prediction based on a conventional input prediction.

BEST MODE FOR CARRYING OUT THE INVENTION

Embodiment 1

The following will describe an embodiment of the present invention in reference to figures.

(Data Processing Device)

Figure 2:
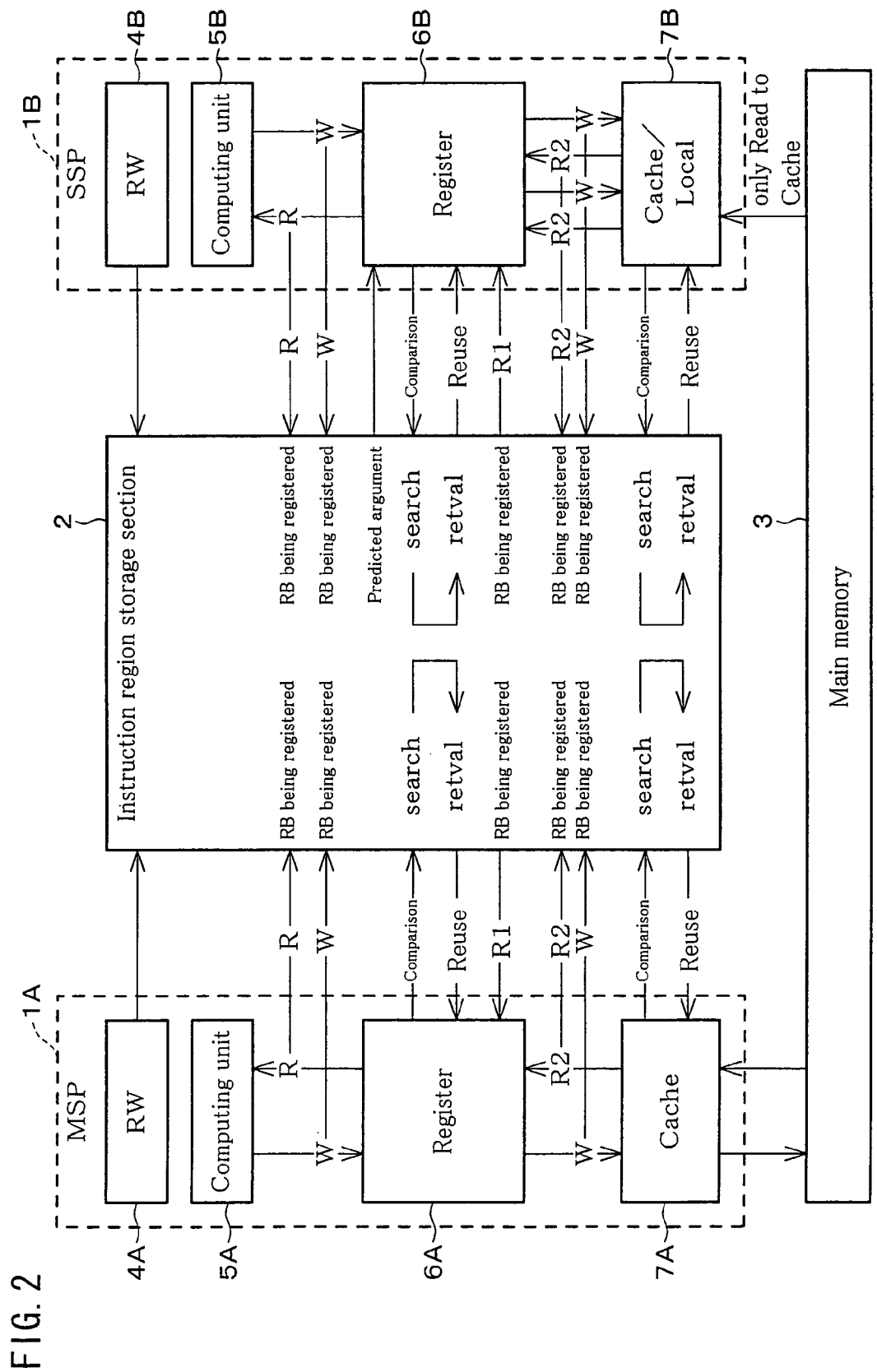
FIG. 2 is a block diagram that outlines the data processing device.

FIG. 2 outlines a data processing device of the present embodiment. As shown in the figure, the data processing device includes a MSP (Main Stream Processor) 1A, a SSP (Shadow Stream Processor) 1B, an instruction region storage section (instruction region storage means) 2 as a reuse table, and a main memory (main storage means) 3. In this data processing device, various arithmetic processes are executed by reading out program data from the main memory 3, and a computation result is written into the main memory 3. Note that, although one SSP 1B is illustrated in the figure, two or more SSPs 1B may be provided. Also, although the SSP 1B is illustrated in the figure, the SSP 1B may not be provided. Effects of the SSP 1B will be described later.

The instruction region storage means 2 is memory means for storing data used for reusing instruction regions such as functions and loops of a program. Details of this instruction region storage section 2 will be given later.

The main memory 3 is a working space of the MSP 1A and SSP 1B, and is composed of, for example, a RAM (Random Access Memory). From an external storage means such as a hard disc or an external device such as an external I/O (input/output) device, a program, data, or the like is read out to the main memory 3. A result of this computation is supplied to the external device.

The MSP 1A includes: a RW (input/output generating means) 4A functioning as reuse storage means; a computing unit (first computing means) 5A; a register 6A; and a Cache 7A. The SSP 1B includes: an RW (second computing means) 4B functioning as reuse storage means; a computing unit (second computing means) 5B; a register 6B; and a Cache/Local 7B.

RWs 4A and 4B are reuse windows. They store, as linked ring structure stacks, lines of the RF (additional storage means) and RB (associative search means; described later) which are currently executed and registered. In an actual hardware structure, each of the RWs 4A and 4B is an assembly of control lines each of which causes a particular line of the instruction region storage section 2 to be active. Also, as specifically described below, each of the RWs 4A and 4B generates an input/output pattern for an executed instruction region, and registers, as an execution result, the generated input/output group in the instruction region storage section 2.

The computing units 5A and 5B perform arithmetic processes based on data stored in the registers 6A and 6B, respectively. Each of the computing units 5A and 5B is therefore termed ALU (Arithmetic and Logical Unit). The registers 6A and 6B are storage means for storing data used for computation by the computing units 5A and 5B. In the present embodiment, the computing units 5A and 5B and the registers 6A and 6B are compliant with the SPARC architecture. The Caches 7A and 7B are cache memories among the main memory 3, MSP 1A, and SSP 1B. In the SSP 1B, the Cache 7B includes a Local 17B functioning as a local memory.

(Instruction Region Storage Section)

Figure 1:
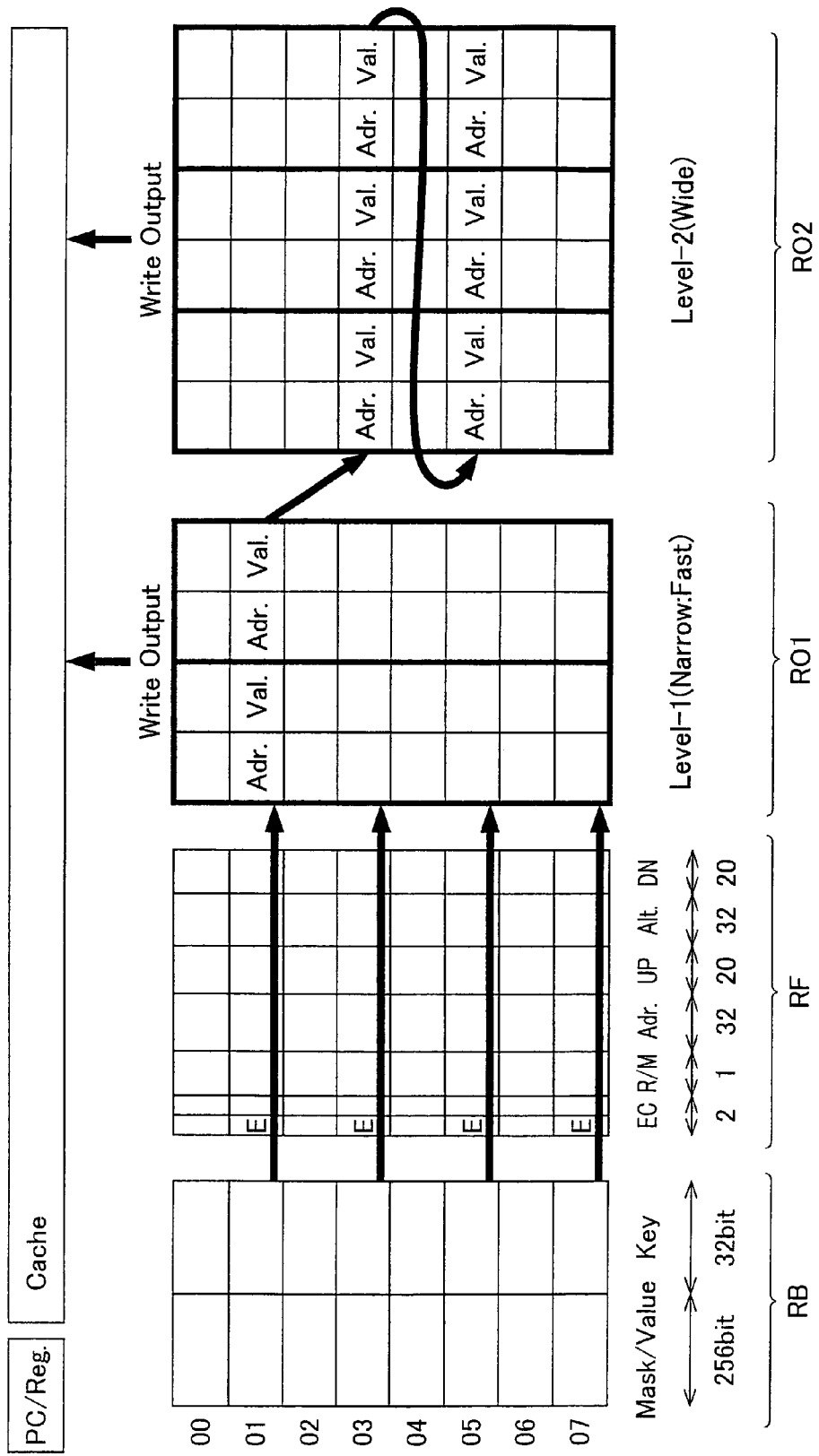
FIG. 1 outlines an instruction region storage section of a data processing device of an embodiment of the present invention.

FIG. 1 is a reuse table realized using the instruction region storage section 2 of the present embodiment. As shown in the figure, the instruction region storage section 2 includes an RB, an RF, an RO1 (second output pattern storage means), and an RO2 (first output pattern storage means).

The RB has (i) a Value (value storage area) where a register value or a main storage input value, which is a target of comparison, is stored; and (ii) a Key (key storage area) storing a key number. In the RB, there are a plurality of lines each of which includes a combination of the Value and Key.

The RF includes: an ending flag E indicating that there is no register number or main memory address to be compared next; a comparison-needed flag C indicating that the content of a register number or a main memory address to be compared next has been updated; an R/M indicating whether a comparison target is a register or a main memory; an Adr. (search item designation area) indicating a register number or a main memory address to be compared next; an UP (parent node storage area) indicating the line number which has just been referred to; an Alt. (comparison-needed item designation area) indicating a register number or a main memory address which should be subjected to a comparison in preference to a register number or a main memory address to be compared next; and a DN (comparison-needed key designation area) indicating a key required for a preferential comparison. These components are provided on the respective lines of the RB.

Each of the RO1 and RO2 stores an output value supplied to the main memory and/or register, in a case where reuse is judged to be feasible according to search results of the RB/RF. The RO1 stores output values and addresses to be outputted, which correspond to the respective lines of the RF. The RO2 stores output values and addresses to be outputted, which cannot be stored in the RO1, in a case where the RO1 cannot single-handedly store all of the output values. If it is necessary to read out an output value from the RO2, the corresponding line of the RO1 has a pointer indicating an output value in the RO2. Using this pointer, the output value is read out from the RO2.

Each of the RB and RF is composed of a CAM (Content-Addressable Memory) and a RAM (Random Access Memory). A memory which can refer to a value stored in an address when the address is given is typically a RAM. Meanwhile, a CAM is an associative memory, in which, when a content to be searched is given, a line corresponding to the content to be searched is selected. A CAM and a RAM are typically used in pairs.

Cooperation of the CAM and RAM is described below with a specific example. Assume that, as entries, data strings "5,5,5,5,5", "1, 3, 1, 1, 1", "1, 3, 3, 5, 2", and "6, 6, 6, 6, 6" are registered in the CAM, while, sets of data "5,5", "1,1", "1,2", and "6,6" corresponding to the respective data strings in the CAM are registered in the RAM. If, as a data string to be searched, the data string "1, 3, 3, 5, 2" is inputted in the CAM, the corresponding entries are turned on, so that the corresponding set of data "1, 2" registered in the RAM is outputted. By an arrangement and operation similar to this example, the RB and RF are realized.

Comparative Example

Figure 8:
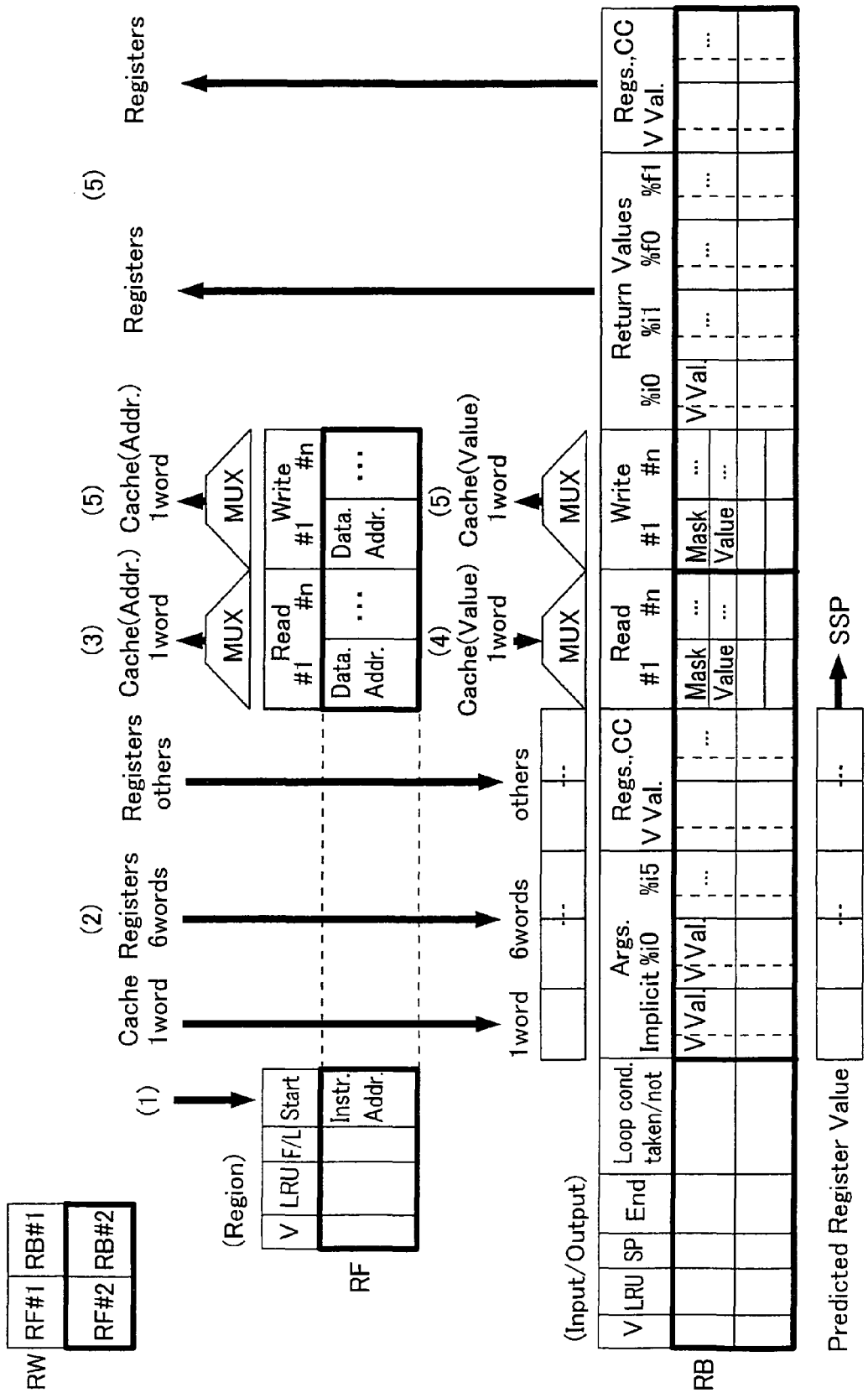
FIG. 8 outlines an RF and an RB in a comparative example.

As a comparative example, the operations of an RF and an RB which are arranged as shown in FIG. 8 are described. As shown in the figure, the RF has: a state display flag V indicating whether an entry is valid or not; an LRU indicating a hint for the replacement of an entry; a F/L for distinguishing a function from a loop; a Start indicating the leading address of an instruction region; an End which indicates an ending address of an instruction region; a Read indicating information regarding a main memory input address to be referred to; and a Write indicating information regarding a main memory output address to be referred to.

In the meantime, the RB has: a state display flag V indicating whether or not an entry is valid; an LRU indicating a hit for the replacement of an entry; a SP indicating an immediately-preceding stack point % sp at the time of calling an instruction region; an ending address (End) of a loop; a taken/not which indicates the direction of a branch at the end of a loop; an argument (Args.) (V: valid entry, Val: value) as a register input value; register input value (Regs.) other than the argument; a condition code (cc); main memory input valid byte (Mask); a main memory input value (Value); a main memory output valid byte (Mask); a main memory output value (Value); a return value (Return Values) as a register output value; a register input value (Regs.) other than the return value; and a condition code (CC) (V: valid entry, Val. value).

The judgment as to whether or not a previously-executed instruction region can be reused at the time of executing a function or a loop is performed in the following manner: (1) A search is carried out as to whether or not a leading address of a pertinent address or loop is matched with any one of leading addresses Start of entries of functions or loops registered in the RF. If a matched pair is found, (2) one or more entry is selected from the entries registered in the RB. An entry to be selected must be arranged such that (i) a state display flag V, which indicates a valid entry, is set at a registered state, and (ii) argument (args), Regs., and CC of the entry are completely matched with the corresponding values of the pertinent address or loop. In the selected entry, (3) the main memory is serially referred to in reference to a concerning main memory address, i.e. in reference to a Read address having at least one valid Mask, and (4) Main memory input values of the pertinent address or loop are compared with main memory input values registered in the RB. If all of the inputs are matched with the registered values, (5) Return Values stored in the RB are written into registers, and main memory output values (Value) in each of which a valid flag Mask is set are serially written into main memory output addresses. In this way, the reuse of a function or loop is achieved.

Figure 9:
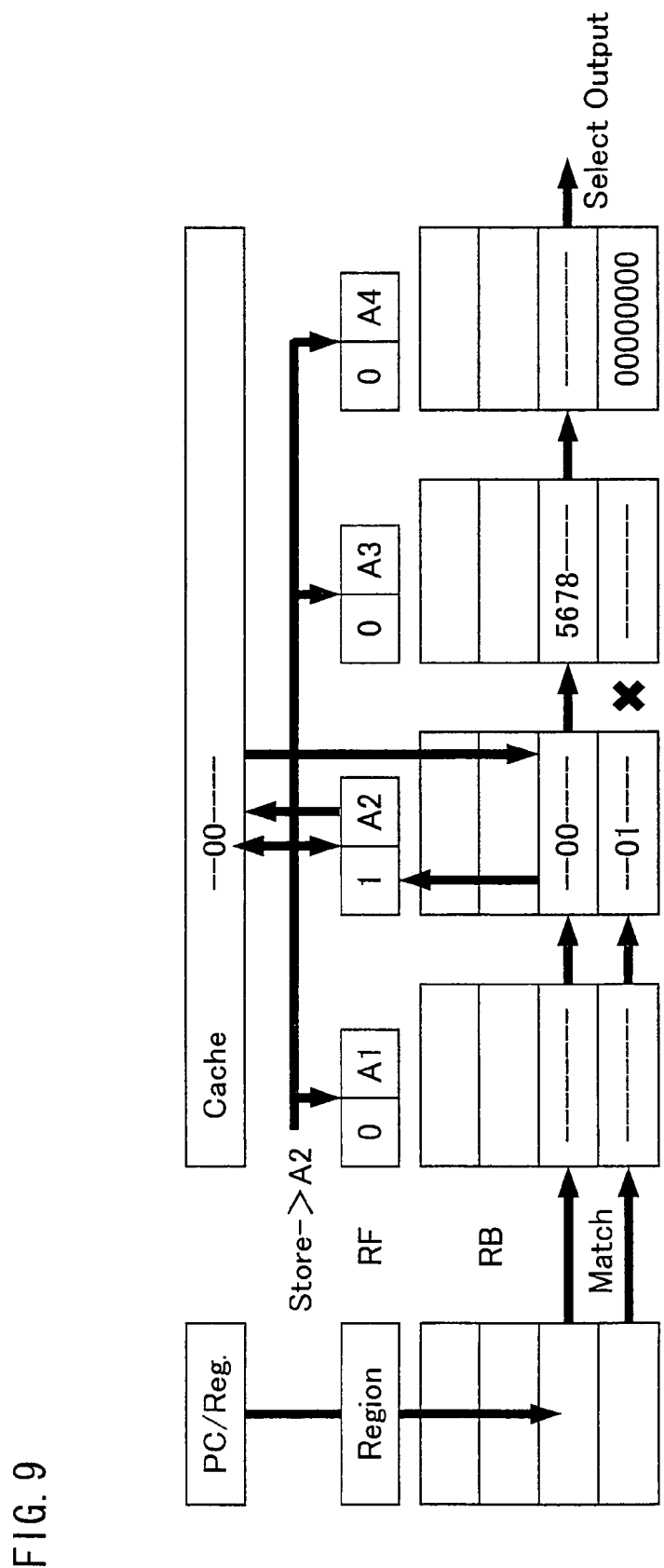
FIG. 9 shows an example of associative search in the comparative example.

The aforesaid operation in the comparative example will be described in detail in reference to FIG. 9. First, a program counter (PC) is compared with leading addresses (Region) of instruction regions registered in the RF. Also, the content (Reg.) of a register is compared with register input values (Args., Regs., CC). Assume that, among entries 01 to 04 in the RB, the entries 03 and 04 are matched with the table. In short, there are multiple matches at this stage.

Subsequently, comparison with regard to a main memory address A1 is carried out. As to the main memory address A1, however, the RF has a flag (0) indicating that equal comparison is unnecessary. On this account, equal comparison is not carried out with regard to the main memory address A1. In other words, the entries 03 and 04 remain as candidates.

Subsequently, comparison with regard to a main memory address A2 is carried out. Since the RF includes a flag (1) indicating that equal comparison must be carried out in regard of the main memory address A2, equal comparison is carried out. As a result, only the entry 03 whose content is "00" remains as a candidate. Now, there are still main memory addresses A3 and A4 to which equal comparison may be carried out. Each of these addresses, however, has a flag indicating that equal comparison is unnecessary. Therefore, as to the entry 03, all items requiring comparison are matched. As a result, as output values corresponding to the entry 03, a main memory output value and a register output value are outputted to the main memory and register, respectively.

Points of the operation in the comparative example are as follows: (a) When values registered in the RB are compared with corresponding values of a function or loop to be reused, vertical columns in the RB are serially searched for matching. Existence of plural entries having matched contents (i.e. multiple matches) is allowed. (b) While multiple matches are allowed during the search, only one entry is selected at the end. (c) Since the order of columns to be searched for matching in the RB can be optionally determined, it is possible, for example, to collectively subject register input values to comparison first.

This comparative example is disadvantageous in the following points: (d) In the RB, the number of items (i.e. crosswise length) of each entry is fixed. On this account, it is not possible to provide an item in addition to registered items. In this regard, although a memory area corresponding to an unused item is a free space, it is not possible to effectively use such a free space. (e) Each entry must be registered as a new entry, if at least one of the items of the entry does not match. The memory of the RB is therefore not effectively used.

In the comparative example above, the memory constituting each of the RF and RB is horizontally long in terms of the structure. Provided that a capacity of the memory is 2 M byte, the memory is 2K words in width and 256 entries in length.

First Example where Input Pattern is Registered in the Form of Tree Structure

In the comparative example above, a crosswise row as each entry in the RB includes all items of input values to be subjected to equal comparison. In other words, all input patterns are, as respective entries, registered in the RB.

On the other hand, in the first example, items of input values to be subjected to equal comparison are divided into short units, each of comparison units is regarded as a node, and a tree-structured input pattern is registered in the RF and RB. To perform reuse, matched nodes are serially selected and whether or not the reuse is feasible is determined at the end. In other words, common parts among plural input patterns are integrally associated with one row of the RF and RB.

This eliminates redundancy and improves the efficiency of the use of the memory constituting the instruction region storage section 2. Also, since an input pattern has a tree structure, it is unnecessary to associate one input pattern with an entry as one row of the RB. It is therefore possible to vary the number of items of input values to be subjected to equal comparison.

In the RF and RB, an input pattern is registered in the form of tree structure. For this reason, multiple matches are not carried out in equal comparison. That is, the instruction region storage section 2 can be realized by an associative search memory with a single-match mechanism. Such an associative search memory only with a single-match mechanism is basically commercially available, but an associative search memory which can analogously perform both multiple matches and a single match is generally not commercially available. Therefore, since the instruction region storage section 2 of the first example can be realized by a commercially-available associative search memory, it is possible to realize the data processing device of the present embodiment, with a short period and low costs.

Figure 3:
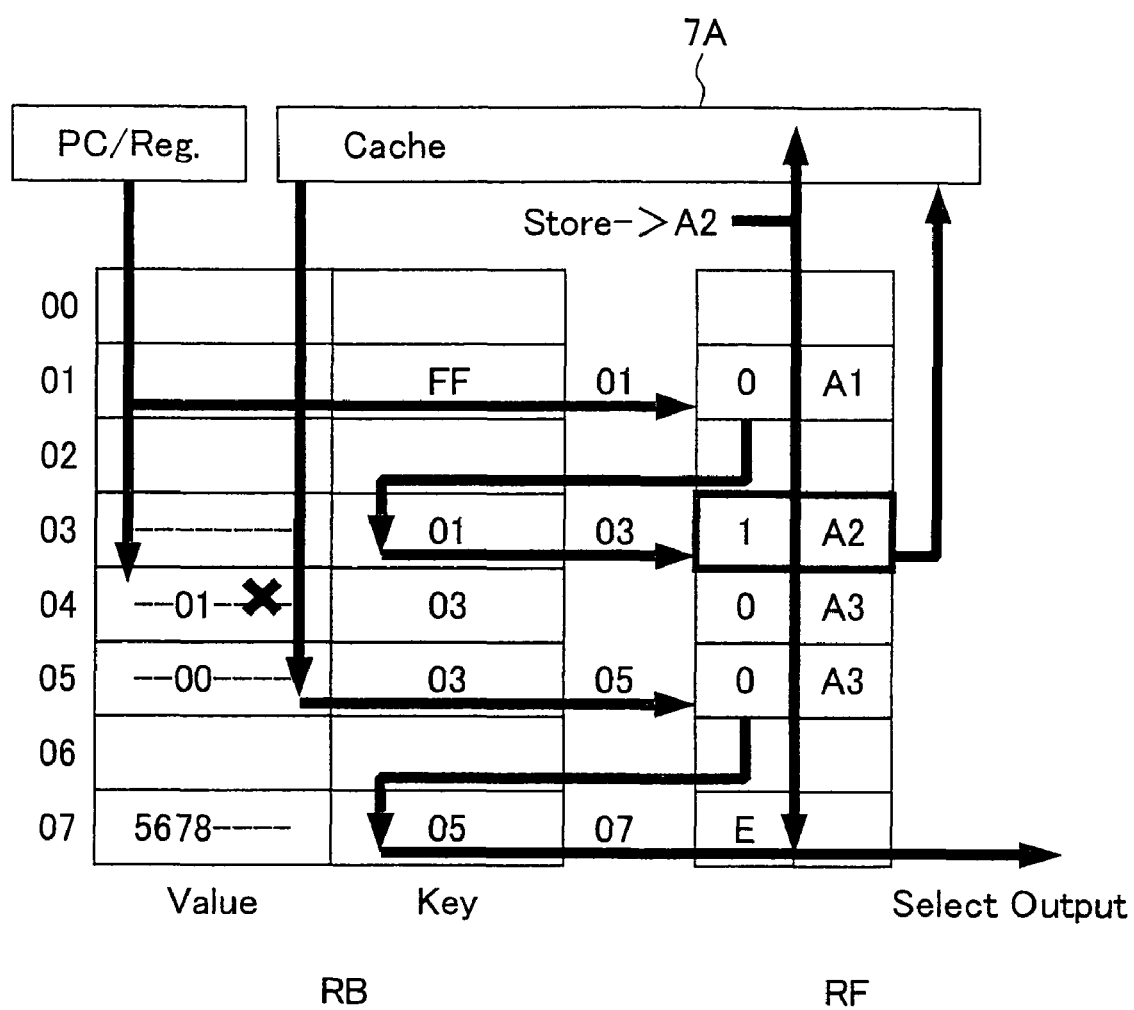
FIG. 3 shows a specific example of associative search of the instruction region storage section.

Now, referring to FIG. 3, the following will describe a specific example of associative search in the instruction region storage section 2 of the first example. First, in response to the detection of the execution of an instruction region, a program counter (PC) and the content (Reg.) of a register are supplied to the RB. In the RB, the supplied values are, by associative search, compared with leading addresses of instruction regions and register values, which are both registered in a Value column of the RB. Then a singular line having a matched value is selected as a candidate (matched line). In the example, a line "01" in the RB is selected as a matched line.

Subsequently, an address "01", in the RB, of the line selected as the matched line is supplied to the RF, as the result of the encoding. Then a line in the RF, which line corresponds to the key 01, is referred to. In this line corresponding to the key 01, a comparison-needed flag is "0", and a main memory address to be subjected to comparison is A1. On this account, the main memory address A1 is not necessarily subjected to equal comparison.

Then using the key 01, search is carried out in the column of Key in the RB. In this example, the line "03" in the RB is selected as a matched line. Then, as the encoding result, the key 03 is supplied to the RF, and the line in the RB, which line corresponds to the key 03, has a comparison-needed flag "1" and a main memory address A2 to be compared. That is, as to the main memory address A2, equal comparison is necessary. A value of the main memory address A2 is read out from the main memory 3, via a Cache 7A. In the RB, search is carried out for finding a line whose Value is read out from the main memory 3 and whose Key is "03". In the example shown in FIG. 3, lines "04" and "05" have Key "03". However, as the value read out from the main memory 3 is "00", the line "05" is selected as the matched line. To the RF, the key 05 is supplied as an encoding result.

The process above is repeated. If, as a result of the repetition of the process, an ending flag E indicating that there are no register number or main memory address to be compared next is detected in the RF, it is determined that the input pattern is completely matched, and the instruction region can be reused. Subsequently, from the line where the ending flag E is detected, a Select Output signal is outputted, and output values corresponding to that line and stored in the RO1 and RO2 are supplied to the register 6A and the main memory 3.

As described above, the associative search in the instruction region storage section 2 in the first example has the following characteristics: first, in the RB, there is only one matched line indicating that the content is matched. On this account, one result of encoding is transmitted at the time of transferring the search to the next column. Therefore, one group (N lines) of signal lines for connecting the RB with the RF is required as an encoding result of an address. On the other hand, in the comparative example, since multiple matches are allowed in the RB, signal lines for connecting the lines in the RB must be provided for the respective lines (i.e. $2^n$ signal lines are required). That is, according the first example, the number of signal lines in the associative search memory of the instruction region storage section 2 is significantly reduced.

Also, since only a single match is allowed during search, the order of comparison of items is limited to the order of references in the tree structure. That is, register values and memory contents must be, in a mixed manner, subjected to comparison in line with the order of references.

An input pattern registered in the RB and RF has a tree structure, so that items are interlinked in the form of Key to be referred to. Also, the end of each item in the input pattern is indicated by an ending flag. It is therefore possible to change the number of items in the input pattern, and hence the number of items in the input pattern can be flexibly changed in accordance with a state of an instruction region to be registered in a reuse table. Furthermore, since the number items in an input pattern is not fixed, unused items do not redundantly occupy the memory capacity. On this account, the efficiency in the use of the memory capacity is improved.

In addition to the above, since an input pattern is registered in the form of a tree structure, a plurality of input patterns can share one line, in a case where contents of items are overlapped. This also makes it possible to improve the efficiency in the use of the memory capacity.

In the arrangement above, the memory constituting each of the RF and RB is vertically long in terms of the structure. Provided that a capacity of the memory is 2M byte, the memory is 8 words in width and 65536 lines in length.

Second Example for Registering Input Pattern in the Form of Tree Structure

In the example above, items UP, Alt., and DN are not used in the RF shown in FIG. 1. That is, in the RF, it is unnecessary to provide these items. Now, the following will describe a second example and how it operates. In the second example, associative search is further accelerated by using items UP, Alt., and DN.

Figure 4A:
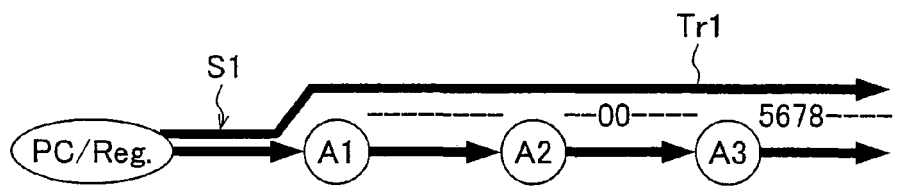
FIG. 4(*a*) illustrates the associative search of FIG. 4(*b*), in the form a tree structure.
Figure 4B:
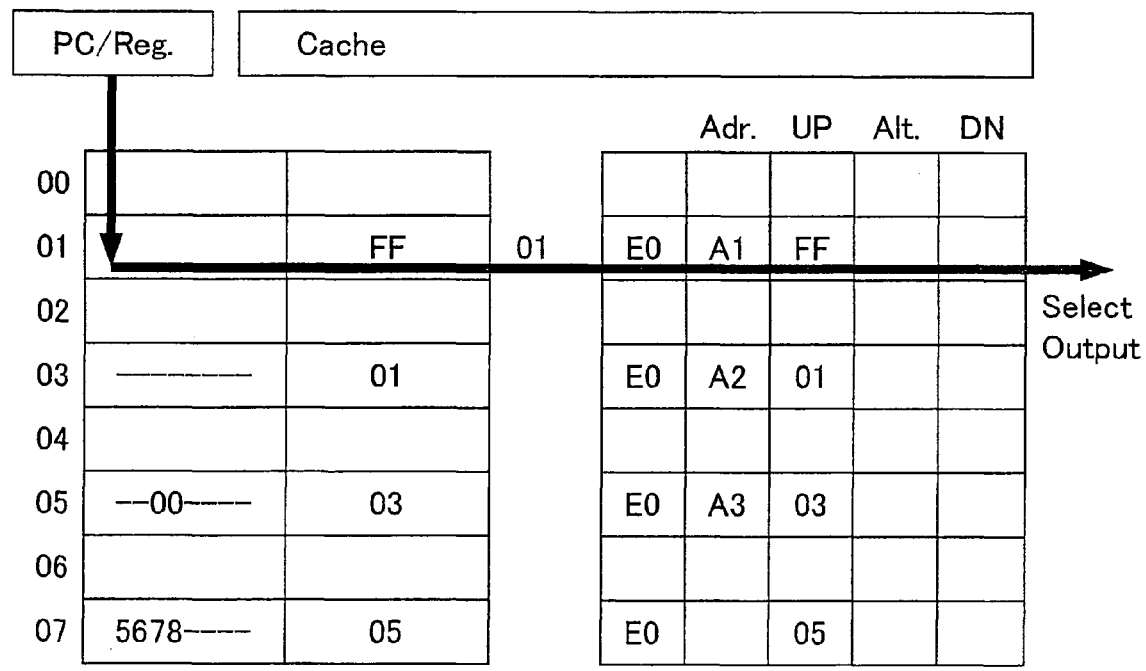

FIG. 4(b) shows a case where only a program counter (PC) and the content (Reg.) of a register are subjected to comparison, and reuse of the region is determined to be feasible without performing comparison of a main memory value, if the program counter and the content are matched. In this case, in a line "01" in the RB, PC and Reg. are registered in Value. Meanwhile, in a line "01" in the RF, a leading flag is "E", a comparison-needed flag is "0", a main memory address to be subjected to comparison is "A1", and UP indicating a parent node number is "FF". In a line "03" in the RB, there is none in Value, while Key is "01". In a line "03" in the RF, an ending flag is "E", a comparison-needed flag is "0", a main memory address to be subjected to comparison is "A2", and UP indicating a parent node number is "FF". In the following, lines "05" and "07" are registered in the RB and RF, and in each line an ending flag is "E" while a comparison-needed flag is "0".

In this state, when execution of an instruction region is detected, PC and Reg. are inputted in the RB, and the line "01," in the RB is selected as the matched line. Then the address "01" of the selected matched line in the RB is, as an encoding result, supplied to the RF, and a line in the RF, which line corresponds to a key 01, is referred to. In the line in the RF which line corresponds to a key 01, an ending flag is "E". It is therefore understood that there is no main memory address to be compared next. Also, since a comparison-needed flag is 0, it is unnecessary to perform comparison as to a main memory address A1.

Therefore, as shown in the tree structure in FIG. 4(a), when it is confirmed that PC and Reg. are matched in S1, a corresponding output value is outputted as indicated by a node Tr1, without performing comparisons of main addresses A1, A2, and A3.

Assume that writing into the main address A2 is carried out when the RF and RB are arranged as above. In this case, while, at the time of registering an input pattern in the RF and RB, it is unnecessary to subject the main address A2 to equal comparison, the change in the main memory address A2 gives rise to the need for subjecting the main memory address A2 to equal comparison. Therefore, in this case, the RF and RB are changed as shown in FIG. 5(b).

First, the column Adr. in the RF is searched using, as a key, A2 which is a main memory address whose content has been changed. As a result, the line "03" in the RF is selected. In the selected line "03", the comparison-needed flag is set at 1 and the ending flag "E" is deleted.

Subsequently, referring to UP in the line "03", the line "01" as a parent node is recognized. In the line "01", A2 which is a main memory address whose content has been changed is written into Alt. which indicates a main memory address which must be subjected to comparison in preference to a main memory address to be compared next. Also, the ending flag "E" is deleted. In the line "01", moreover, "03" is written into DN which indicates a key required for the preferential comparison.

In a case where the RF and RB are rewritten as above, associative search is carried out as follows. When an instruction region is detected, PC and Reg. are inputted to the RB. In the RB, associative search is conducted so that the inputted values are compared with (i) an instruction region leading address registered in the column "Value" of the RB and (ii) a register value. As a result the line "01" in the RB is selected as a matched line.

Subsequently, the address "01", in the RB, of the line selected as a matched line is supplied to the RF, as the encoding result, so that, in the RF, the line corresponding to the key 01 is referred to. In the line corresponding to the key 01 in the RF, the comparison-needed flag is "0" and a main memory address to be compared with is A1. This indicates that equal comparison is unnecessary for the main memory address A1.

Indicated by Alt. is a main memory address which must be subjected to comparison in preference to a main memory address to be compared next, and the main memory address A2 is registered in Alt. Also, DN that indicates a key required for the preferential comparison is "03". In this case, the value of the main memory address A2 in the main memory 3 is read out via the Cache 7A, and the RB is searched for a line whose Value is read out from the main memory 3 and whose Key is "03" which is indicated by DN.

Figure 5A:
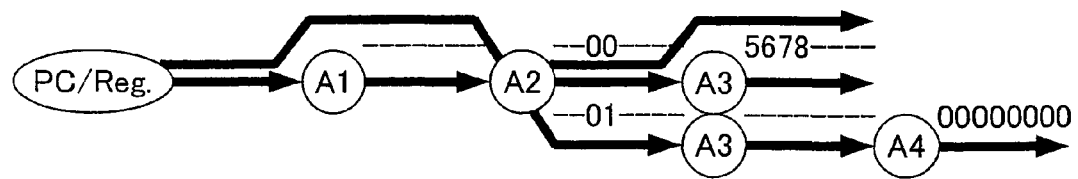
FIG. 5(*a*) illustrates the associative search of FIG. 5(*b*), in the form a tree structure.
Figure 5B:
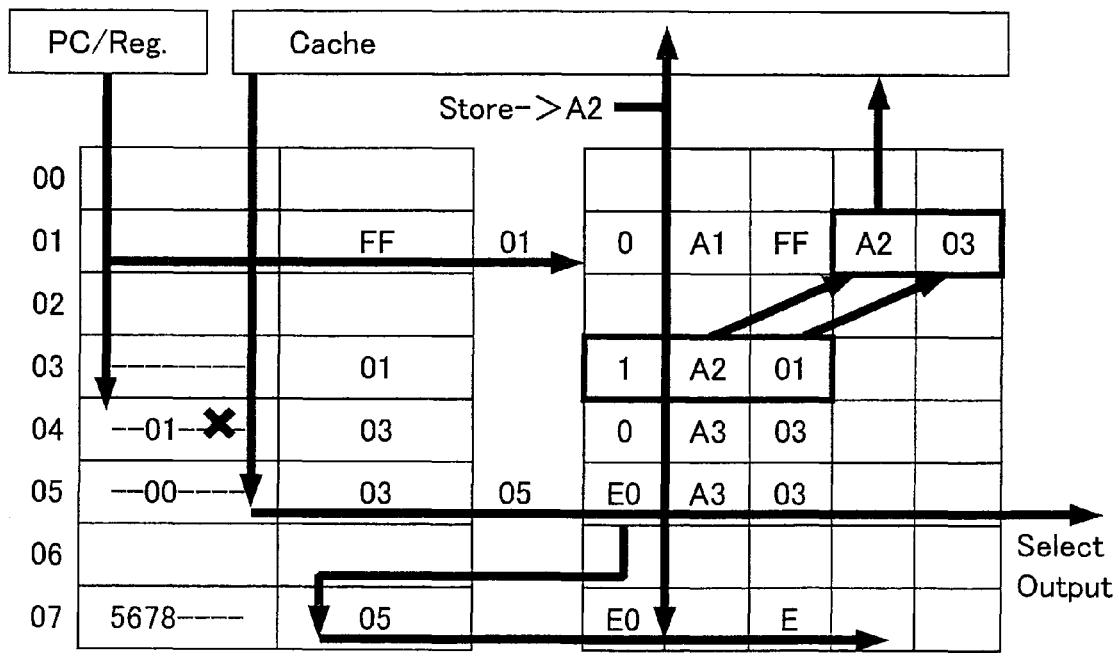

In the example shown in FIG. 5(*b*), the lines "04" and "05" have Key "03". Since the value read out from the main memory 3 is "00". the line "05" is selected as a matched line, and a key 05 is supplied, as the encoding result, to the RF. In the line corresponding to the key 05 in the RF, the ending flag is "E". It is therefore determined that the input pattern is completely matched, and the instruction region is reusable. From the line where the ending flag E is detected, a "Select Output" signal is outputted. Also, output values, which correspond to the aforesaid line and are stored in the RO1 and RO2, are supplied to the register 6A and the main memory 3.

In the second example in which the associative search is performed as above, the RF includes: (i) Alt. which indicates a main memory address which must be subjected to comparison in preference to a main memory address to be compared next; and (ii) DN which indicates a key required for the preferential comparison. Therefore, as the tree structure in FIG. 5(*a*) shows, the search by means of the content of the main memory address A2 and the key 03 is possible while skipping the search by means of the content of the main memory address A1 and the key 01. The number of the steps for the search is reduced in this manner, and hence the processing speed is improved.

Example of Means for Storing Output Value

Described above are to register input patterns of an instruction region to the RF and RB and to conduct associative search. Now, the following describes an example in which an output value which is outputted for reuse is stored after the matching of an input pattern is confirmed. As described in reference to FIG. 1, the instruction region storage section 2 is provided with the RO1 and the RO2, which are output value storage means storing output values outputted to the main memory and/or register, in a case where it is determined that reuse is feasible.

An output value can be obtained by referring to storage means such as a RAM which stores an output value, based on addresses supplied from the RF and RB. However, as in the case of an input pattern, the number of items of an output pattern is preferably variable. The method for storing output values has therefore required improvement.

An input pattern is registered in the RF and RB, in the form of a tree structure. Whether or not reuse is feasible is determined in the line at the end of the tree structure, i.e. the line in which the ending flag E is registered. Therefore, the output operation for the reuse is realized by registering, in each line in which the ending flag E is registered, a pointer to output value storage means that stores an output value to be outputted.

However, in a case where, at the instant of confirmation that the input pattern is completely matched, a storage location in the output storage means is specified based on the pointer storing the output value, a conversion process to specify the storage location based on the pointer is required, and this decreases the processing speed.

To solve this problem, two storage means, RO1 and RO2, are provided as output value storage means. The RO1 stores addresses to be outputted and output values, in association with the respective lines of the RF in a one-to-one manner. That is, in a case where it is determined that reuse is feasible according to a line, in the RF, where the ending flag E is registered, a line, in the RO1, which corresponds to that line is selected, and an output value is outputted.

However, in the case above, i.e. when addresses to be outputted and output values are stored in association with the respective lines of the RF in a one-to-one manner, a memory area in the RO1 is reserved even for a line, in the RF, in which the ending flag E is not registered. Moreover, because output values are stored in the RO1 in association with the respective lines, in the RF, where the ending flag E is registered, the same content is redundantly stored at plural locations. Therefore, while the RO1 excels at speedy processing, the efficiency of the use of the memory is not good.

To solve this problem, the number of items capable of being registered in the RO1, i.e. the number of combinations of output values and output addresses is set so as to be small (two in the example shown in FIG. 1), and combinations which cannot be stored in the RO1 are registered in the RO2 in which a storage area is designated using a pointer.

In the RO2, a storage area is designated by a pointer. Therefore there are rarely unused memory areas. In addition, pointers can be serially connected in a case where a plurality of combinations of output values and output addresses are registered. On this account, it is possible to change the number of registerable combinations of output values and output addresses. Moreover, since a plurality of lines in the RO1 can point to pointers indicating the same storage location in the RO2, the storage information of the RO2 can be shared among plural lines in the RO1. This reduces redundant contents in the RO2.

As described above, two output value storage means, RO1 and RO2, are provided. Therefore, while fast processing is achieved by only utilizing the RO1 in a case where there are small number of output values, the efficient use of the memory is achieved by using the RO2 which can change the number of items, in a case where the number of items of output values is large. Therefore, the arrangement can achieve both fast processing and efficient memory use.

(Registration to Instruction Region Storage Section)

The operation to conduct reuse on the occasion of execution of an instruction region has been described. Now, the following will describe an operation performed in a case where reuse is not feasible on the occasion of execution of an instruction region. The operation relates to registration of inputs and outputs of the instruction region are registered to the RF, RB, RO1, and RO2.

When the execution of an instruction region is detected, values of PC and Reg. are inputted to the RB. In the RB, associative search is conducted so that the inputted values are compared with an instruction region leading address and a register value, which are registered in the Value column of the RB. If it is determined that the values in the Value column of the RB are not matched with the inputted values, the instruction region is determined to be unusable. The computing unit 5A therefore performs an arithmetic process. A register input value, main memory input value, main memory output value, and register output value of the instruction region, which are used in the arithmetic process, are registered in the RB, RF, and RO1, and RO2 as need arises. The registration to the RB and RF is carried out in such a manner that each item corresponds to one line to form the above-described tree structure. In the line where the last item of the input pattern is registered, the ending flag of the RF is set at "E". The registration of the input pattern is completed in this manner.

In the meanwhile, if values matched with the inputted PC and Reg. are registered in the Value column of the RB, equal comparison in regard of items to be subjected to the next equal comparison is carried out in the same manner as the aforesaid associative search. In this manner, equal comparisons between (i) input patterns registered in the RB and RF and (ii) the input pattern of the instruction region are serially carried out. When a non-matching item is found, the item is registered in the RB and RF, as an added node. In the line where the last item of the input pattern is registered, the ending flag of the RF is set at "E", and the registration of the input pattern is completed.

After the completion of the registration of the input pattern, output values and output addresses are registered in the line in the RO1, which line corresponds to the line, of the RF, where the ending flag is set at "E". If items to be registered as output values exceed the capacity of the RO1, the registration in the RO2 is carried out using a pointer. The registration of the instruction region is completed in this manner.

(Generation of Input/Output Set in Execution of Instruction Region)

On the execution of an instruction region, the execution result is registered in the instruction region storage section 2. The execution result is equivalent to a set of inputs and outputs to/from a register and/or a main memory (hereinafter, register/memory), on the occasion of the execution of the instruction region. The following will describe in what manner an input/output set to be registered in the instruction region storage section 2 is generated.

In the first and second examples in which an input pattern is registered in the form of a tree structure, an input/output set is generated by the RW 4A/4B. Based on the generated input/output set, the above-described registration in the RB, RF, RO1, and RO2 is carried out. The RW 4A/4B monitors, on the occasion of execution of an instruction region, (i) readout from the register/memory and/or (ii) writing into the register/memory. The following will describe in what manner an input/output set is generated by the RW 4A/4B. Although the following description relates to the RW 4A, the RW 4B is arranged in the same manner.

First Example of RW, Part One

Figure 12:
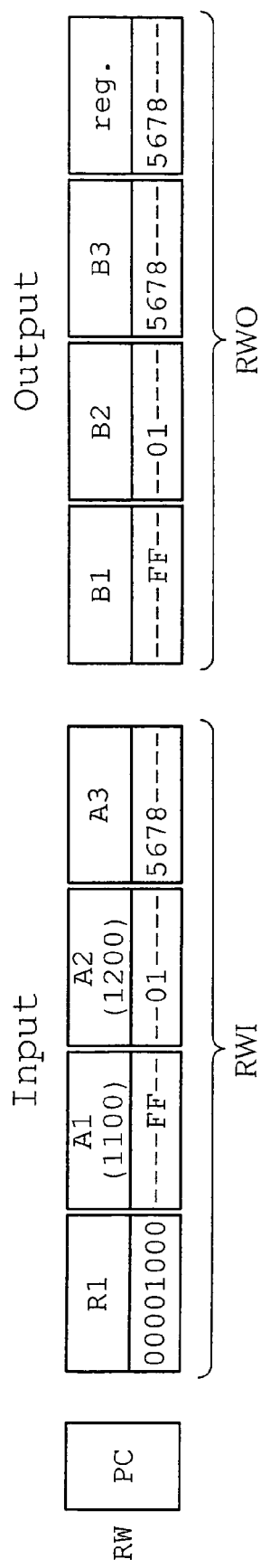
FIG. 12 outlines memory configuration of an RW of a first example.

FIG. 12 outlines a memory configuration of the RW 4A of First example, part one. As shown in the figure, the RW 4A includes the following memories: PC where a PC value of an instruction region is stored; RWI where an input address and an input value are stored; and RWO where an output address and an output value are stored. An input/output set on the occasion of executing an instruction region is stored in these memories of the RW 4A, and then registered in the instruction region storage section 2.

When the execution of an instruction region starts, a PC value thereof is stored in the PC of the RW 4A. As the executions of instruction regions are serially performed, readout from the register/memory and/or the writing to the register/memory are serially carried out.

When readout from the register/memory is performed on the occasion of execution of an instruction region, the following processes are performed by the RW 4A.

(AR1) Search is carried out to confirm whether or not an address of the register/memory from which readout is carried out is registered in the RWO. If registered in the RWO, it is confirmed that a value which has been registered, as an output value, in the input/output set is read out, and hence it is unnecessary to register the value as an input value. In other words, the process is terminated without registering the address in the RWI.

(AR2) In a case where an address of the register/memory from which readout is performed is not registered in the RWO, search is conducted to conform whether or not the address is registered in the RWI. If registered in the RWI, it is confirmed that a value which has been registered, as an input value, in the input/output set is read out, and hence it is unnecessary to register the value as an input value. In other words, the process is terminated without registering the address in the RWI.

(AR3) In a case where an address of the register/memory from which readout is performed is registered in neither the RWO nor the RWI, the address and value are registered, as an input address and an input value, in the RWI.

In a case where writing to the register/memory is conducted on the occasion of execution of an instruction region, the following processes are carried out by the RW 4A.

(AW1) Search is carried out to confirm whether or not an address of the register/memory to which writing is performed is registered in the RWO. If registered in the RWO, it is confirmed that a value which has been registered, as an output value, in the input/output set is rewritten. Therefore an output value corresponding to the registered output address is updated to the written value, and the process is completed.

(AW2) If an address of the register/memory to which writing is performed is not registered in the RWO, the address and value are registered in the RWO, as an output address and an output value.

The above-described processes are performed until the instruction region terminates. As a result, the input/output set of the instruction region is generated by the RW 4A. The generated input/output set is registered in the instruction region storage section 2, in the following manner.

The following describes an example of an instruction region. In the example, the instruction region shown in FIG. 11 is executed. In the figure, PC indicates a PC value on the occasion of execution of the instruction region. This PC value is stored in the PC of the RW 4A.

Subsequently, in the first row, a value (00001000) stored in an address R1 of the register is read out, and an instruction is executed to read out a value of a main memory address (corresponding to the address A1), the value indicating a result of computation to add 100 to the readout value. At this stage, the address R1 has not been registered in the RWO and RWI. The address R1 and value (00001000) are therefore registered in the RWI. Meanwhile, an instruction is executed to read out a value (----FF--) of the address A1, and store the readout value in an address reg. of the register. At this stage, the address R1 has not been registered in the RWO and RWI. The address A1 and value (----FF--) are therefore registered in the RWI.

At this stage, the address reg. has not been registered in the RWO. The address reg. and value (----FF--) are therefore registered in the RWO.

Subsequently, in the second line, a value is read out from an address reg. and the value is written into the main memory, and hence a value (----FF--) is written into an address B1. At this stage, the address reg. is registered in the RWO. The registration to the RWO is therefore not carried out. In the meanwhile, since the address B1 is not registered in the RWO, the address B1 and value (----FF--) are registered in the RWO.

Subsequently, in the third row, a value (00001000) stored in an address R1 of the register is read out, and an instruction to read out a value of a main memory address (corresponding to an address A2) is executed. The value indicates a result of a computation to add 200 to the readout value. At this stage, the address R1 has already been registered in the RWI. The registration to the RWI is therefore not carried out. Meanwhile, an instruction to read out a value (--01----) of the address A2 and store the value in an address reg. of the register is carried out. At this stage, the address A2 is registered neither in the RWO nor RWI. The address A2 and value (--01----) are therefore registered in the RWI.

At this stage, the address reg. is registered in the RWO. On this account, the address reg. of the RWO is updated to the value (--01----).

Subsequently, in the fourth row, a value is read out from an address reg. and written into the main memory. A value (--01----) is therefore written into an address B2. At this stage, the address reg. is registered in the RWO. The registration to the RWO is therefore not carried out. Meanwhile, the address B2 is not registered in the RWO. The address B2 and value (--01----) are registered to the RWO.

Subsequently, in the fifth row, an instruction to read out a value (5678----) of an address A3 and store the value in an address reg. of the register is executed. At this stage, the address A3 is registered neither in the RWO nor RWI. The address A3 and value (5678----) are therefore registered in the RWI.

At this stage, the address reg. is registered in the RWO. The address reg. of the RWO is updated to a value (5678----).

Finally, in the sixth row, a value is read out from an address reg. and written into the main memory. A value (5678----) is therefore written into an address B3. At this stage, the address reg. is registered in the RWO. The registration to the RWO is therefore not carried out. Meanwhile, the address B3 is not registered in the RWO. The address B3 and value (5678----) are registered n the RWO. As a result of the above, the input/output set of the RW4A shown in FIG. 12 is generated.

Figure 13:
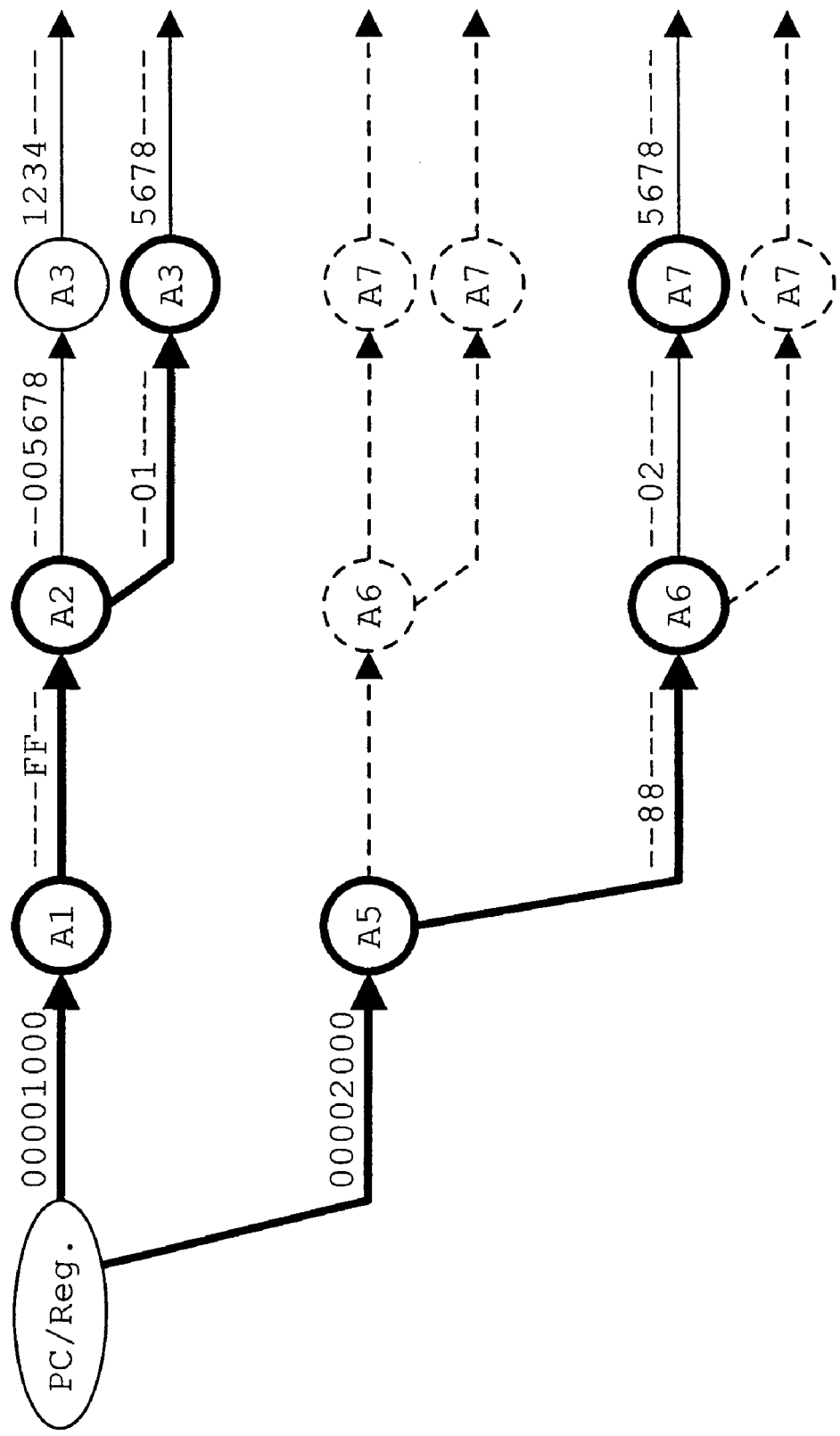
FIG. 13 illustrates a case where an input/output set generated by the RW of the first example is registered in the form of a tree structure.

The input/output set generated as above is registered in the instruction region storage section 2, in the form of the tree structure shown in FIG. 13. According to this tree structure, a registered input pattern is stored in the instruction region storage section 2, as one path from a root node to a leaf. Subsequently, before the execution of the instruction region, the following process is repeated: as shown in FIG. 3, in order to check whether or not the input pattern of the instruction region is identical with a registered input pattern, addresses recorded in nodes are serially referred to from the root node, so that those nodes corresponding to obtained values are selected by means of the associative search mechanism.

First Example of RW, Part Two

Figure 16:
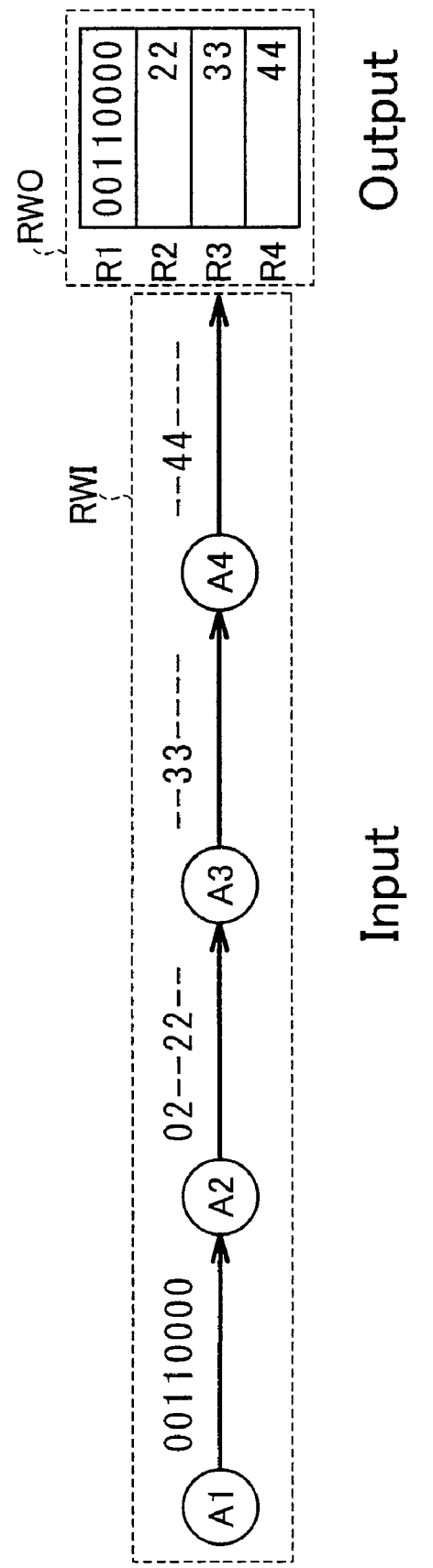
FIG. 16 outlines a memory configuration of the RW of the first example.

FIG. 16 outlines a memory configuration of the RW4A of First Example, Part Two. As shown in the figure, the RW4A includes the following memories: PC that stores a PC value of an instruction region, and RWO that stores an output address and an output value. An input/output set on the occasion of execution of an instruction region is stored in these memories of the RW4A, and thereafter registered in the instruction region storage section 2.

First, when the execution of an instruction region starts, a PC value thereof is stored in the PC of the RW4A. Subsequently, execution of the instruction regions is serially carried out, so that readout from the register/memory and/or writing to the register/memory is(are) serially carried out.

In a case where readout from the register/memory is carried out on the occasion of execution of an instruction region, the RW 4A performs the aforesaid processes (AR1), (AR2), and (AR3). In the meanwhile, in a case where writing into the register/memory is carried out on the occasion of execution of an instruction region, the RW 4A performs the aforesaid processes (AW1) and (AW2).

The processes above are carried out until the completion of the execution of the instruction region. As a result, the input/output set of the instruction region is generated by the RW 4A. The generated input/output set is registered in the instruction region storage section 2, through the aforesaid registration process.

As an example of an instruction region, the following will describe a case where the instruction region shown in FIG. 15 is executed. In the figure, indicated by PC is a PC value at the start of the instruction region. The PC value is stored in the PC of the RW 4A.

By the first-row instruction (hereinafter, first instruction), 4-byte data (00110000) loaded from an address A1 of the memory is stored in an address R1 of the register. At this stage, the address A1 having been read out is registered neither in the RWO nor RWI. The address A1 and data (00110000) are therefore registered in the RWI. Meanwhile, the address R1 where writing has been done is not registered in the RWO. The address R1 and data (00110000) are therefore registered in the RWO.

By the second instruction, one-byte data (02) loaded from an address A2 of the memory is stored in an address R2 of the register. At this stage, the address A2 having been read out is registered neither in the RWO nor in the RWI. The address A2 and data (02) are therefore registered in the RWI. On this occasion, the remaining 3 bytes of the address A2 are "-" which indicates "Don't Care". Also, since the address R2 where writing has been done is not registered in the RWO, the address R2 and data (02) are registered in the RWO.

Subsequently, by the third instruction, one-byte data (22) loaded from an address (A2+R2) of the memory is stored in an address R2 of the register. Since the data stored in the address R2 is (02), an address in the memory from which readout is carried out is (A2+02). At this stage, the address (A2+02) from which readout is carried out is registered neither in the RWO nor the RWI. The address (A2+02) and data (22) are therefore registered in the RWI. On this occasion, in 4 bytes of the address A2, data (22) is registered in the bytes corresponding to the address (A2+02). That is, by the second instruction, data (02) is registered in the bytes corresponding to the address A2. On this account, bytes corresponding to the addresses (A2+01) and (A2+03) still store "-" which indicates "Don't Care".

The address R2 to which writing has been carried out has already been registered in the RWO. Therefore, an output value corresponding to the address R2 is rewritten from data (02) to data (22).

Subsequently, by the fourth instruction, one-byte data (33) loaded from an address A3 of the memory is stored in an address R3 of the register. At this stage, the address A3 from which readout is carried out is registered neither in the RWO nor in the RWI. The address A1 and data (33) are therefore registered in the RWI. Also, since the address R3 to which writing is carried out is not registered in the RWO. The address R3 and data (33) are therefore registered in the RWO.

Finally, by the fifth instruction, one-byte data (44) loaded from an address (R1+R2) of the memory is stored in an address R4 of the register. Since the addresses R1 and R2 are the addresses of the register overwritten in the execution of the instruction region, these addresses cannot function as inputs of the instruction region. Meanwhile, an address A4 generated by (R1+R2) is an input of the instruction region. This address A4 is registered neither in the RWO nor in the RWI. On this account, the address A4 and data (44) are registered in the RWI. The address R4 to which readout has been carried out is not registered in the RWO. The address R4 and data (44) are therefore registered in the RWO. As a result of the processes above, the input/output set of the RW4A shown in FIG. 16 is generated.

Figure 17:
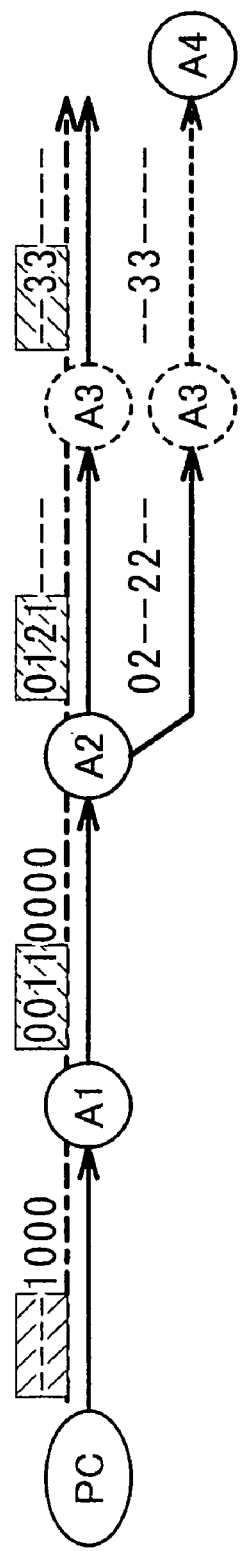
FIG. 17 illustrates a case where an input/output set generated by the RW of the first example is registered in the form of a tree structure.

The input/output set generated as above is registered in the instruction region storage section 2, in the form of the tree structure shown in FIG. 17. According to this tree structure, a registered input pattern is stored in the instruction region storage section 2, as a path from a root node to a leaf. Subsequently, before the execution of the instruction region, the following process is repeated: as shown in FIG. 3, in order to check whether or not the input pattern of the instruction region is identical with a registered input pattern, addresses recorded in nodes are serially referred to from the root node, so that those nodes corresponding to obtained values are selected by means of the associative search mechanism.

(Problems in Tree-Structured Associative Search)

In the tree structure above, input patterns are serially read out one by one, and associative search is carried out. After a matched node is found, the next node is selected. That is, after the search of a current node completes, the search of the next node starts.

An associative search device made up of CAM/RAM typically has characteristics of long latency and high throughput. That is, a typical associative search device has such a characteristic that, while a period from one search input to output is relatively long, a plurality of search inputs can be processed and outputted. On the other hand, as described above, in a case where the search of the next node starts after the completion of the search of the current node, high throughput of the associative search device is not exerted, and hence the associative search device cannot fully fulfill its potential (Problem 1).

In the above-described tree structure, an input pattern of an instruction region is represented as a path in line with the order of references, and the reuse of outputs cannot be done unless the entire input pattern is matched. Assume that, an input pattern on the occasion of execution of an instruction region is divided into the first half (pattern A1) and the second half (pattern A2), and an output corresponding to the pattern A1 is X1, while an output corresponding to the pattern A2 is X2. Also assume that, an input pattern on the occasion of execution of another instruction region is divided into the first half (pattern B1) and the second half (pattern B2), and an output corresponding to the pattern B1 is Y1, while an output corresponding to the pattern B2 is Y2. In a case where an input pattern at the time of execution of an instruction region is arranged such that the first half is the pattern A1 while the second half is the pattern B2, even if each of the first and second halves of the input pattern is reusable, the input pattern as a whole has not appeared in the past. The input pattern is therefore not reusable (Problem 2).

For example, according to an example shown in FIG. 16, in an input set, an input pattern made up of addresses A1 and A2 and an input pattern made up of an address A3 do not depend on each other, i.e. are independent from each other. In other words, it is not possible to reuse (i) an instruction region which includes the input pattern made up of the addresses A1 and A2 but does not include the input pattern made up of the address A3, and (ii) an instruction region that includes the input pattern of the address A3 but does not include the input pattern of the addresses A1 and A2, even if the instruction region has tree-structured input patterns shown in FIG. 16.

Second Example of RW

The above-described two problems occur because an input pattern of an instruction region at a particular calling point is represented as one path from the root node to a leaf. To solve the problems, a tree structure is arranged so that an input pattern is divided into groups and each group retains past input patterns, and a plurality of tree structures are concurrently searchable. This makes it possible to effectively utilize the associative search device. For example, the tree structure shown in FIG. 13 is divided into the tree structures shown in FIG. 14, and each of input groups corresponding to respective paths from the root node to leaves is individually reused.

Figure 18:
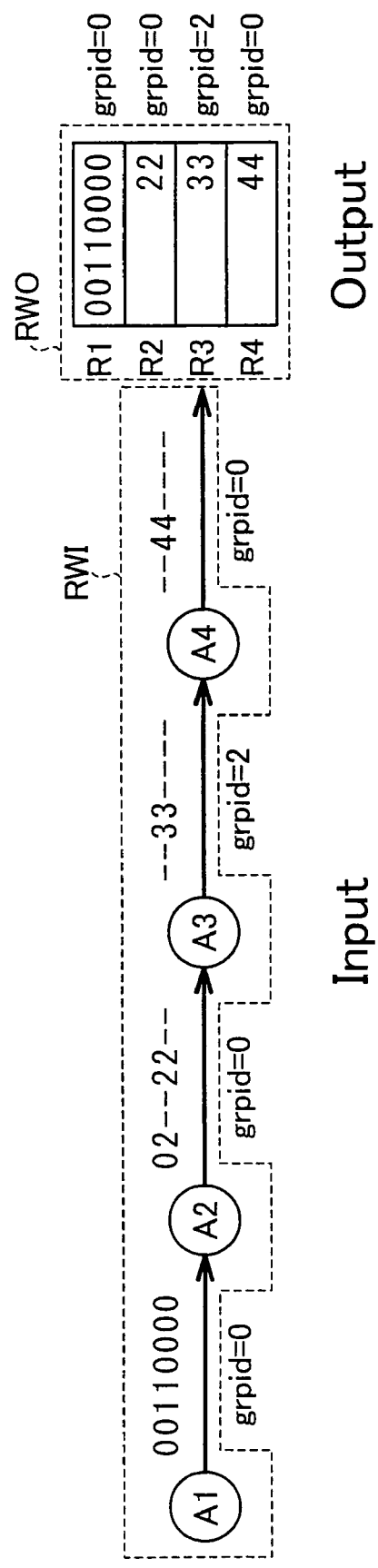
FIG. 18 shows a state in which group numbers are assigned to an input set and an output set which are independent of the input/output set shown in FIG. 16.

For example, in the input/output set shown in FIG. 16, group numbers are assigned to input sets and output sets which are independent from one another, as shown in FIG. 18. That is, a group number (grpid) 0 is assigned to an input pattern made up of an address A1, an input pattern made up of an address A2, and an input pattern made up of an address A4. Also, A group number (grpid) 2 is assigned to an input pattern made up of an address A3. Furthermore, a group number (grpid) 0 is assigned to an output pattern made up of an address R1, an output pattern made up of an address R2, and an output pattern made up of an address R4, while a group number (grpid) 2 is assigned to an output pattern made up of an address R3.

Figure 19:
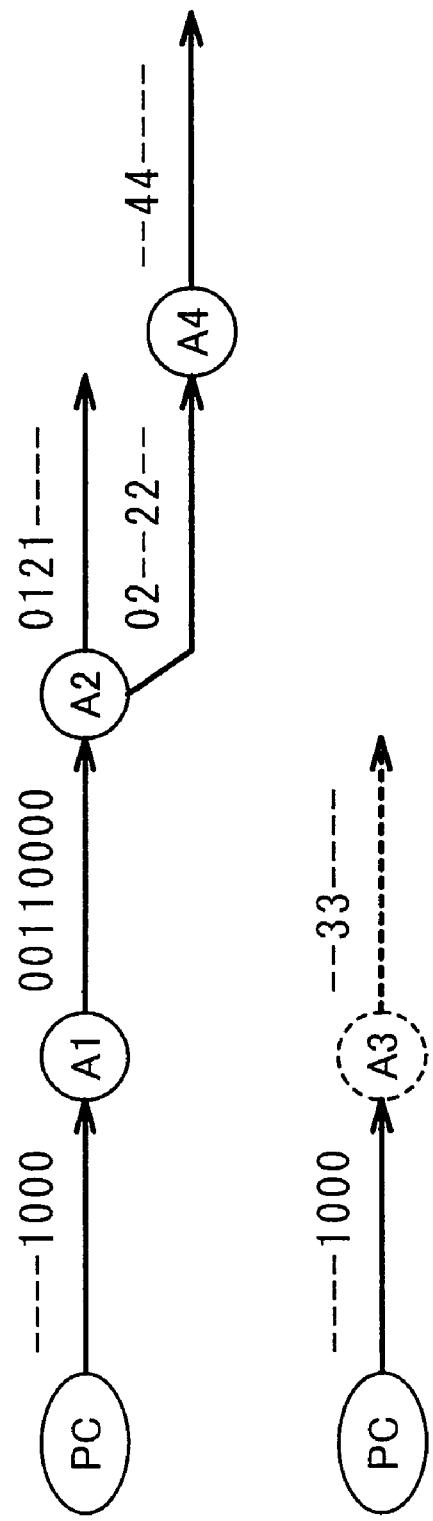
FIG. 19 shows a case where the tree structure of FIG. 17 is divided into a plurality of tree structures, based on the group numbers.

Then, based on the group numbers, the tree structure shown in FIG. 17 is divided into the tree structures shown in FIG. 19. In this manner, input patterns belonging to different groups can be individually registered, and each input group corresponding to a path from the root node to a leaf is individually reusable, and parallel search is feasible.

As described above, the division of a tree structure is achieved when input groups do not depend on each other, in terms of data. That is, in a case where an input pattern is divided into groups A and B and an input of the group A depends on an input of the group B or an input of the group B depends. on an input of the group A, each group is unlikely to be individually reused, even if the group division is carried out.

To divide into groups having no data dependency relations, it is necessary to examine data dependency relations, at the time of generating an input pattern. That is, the RW 4A examines data dependency relations, and then divides an input pattern into groups having no data dependency relations so as to generate an input/output set.

Figure 10:
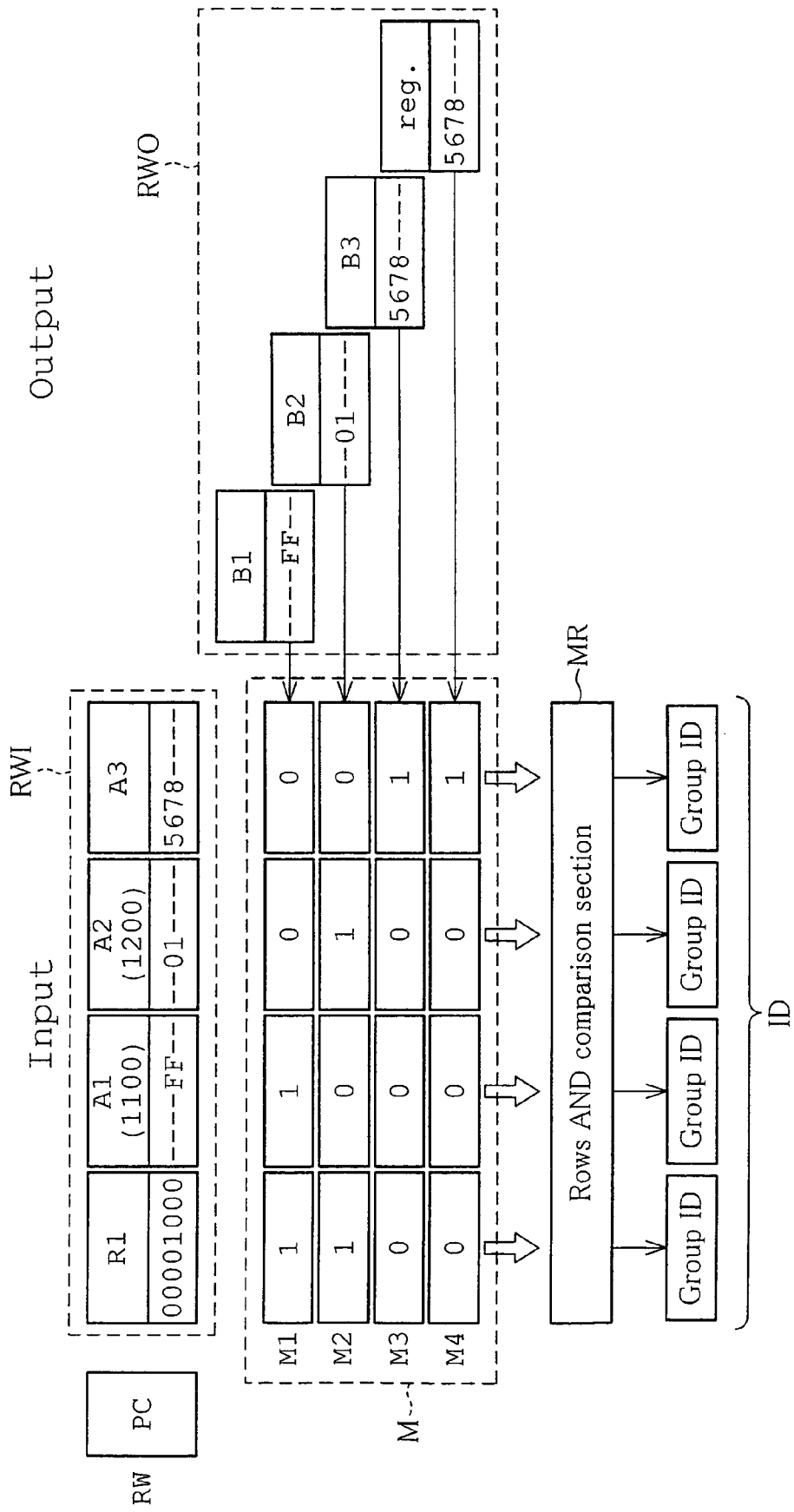
FIG. 10 outlines an RW in a second example.

FIG. 10 outlines a second example of the RW 4A which realizes the above. As shown in the figure, the RW 4A includes: PC storing a PC value of an instruction region; RWI storing an input address and an input value; RWO storing an output address and an output value; a dependency relations storage section M; a rows AND comparison section (input/output group setting means) MR; and a group ID storage section ID.

The dependency relations storage section M is a 2D-arranged memory, and each memory element stores 0 or 1. In the dependency relations storage section M, each column corresponds to each input address and input value registered in the RWI, while each row corresponds to each output address and output value registered in the RWO. The dependency relations storage section M indicates from which input address and input value each output address and output value derive.

The rows AND comparison section MR is a computation section that performs an AND operation on row elements stored in the dependency relations storage section M, and sets an input/output group made up of: an output pattern including at least one output address and output value; and an input pattern including at least one input address and input value. Details of the AND operation by the rows AND comparison section MR will be given later.

The group ID storage section ID is a memory that stores group IDs assigned to input addresses and input values corresponding to the respective columns in the dependency relations storage section M, based on the result of the AND operation by the rows AND comparison section MR. Details of the group IDs will be given later.

When the execution of an instruction region starts, memory elements in the dependency relations storage section M are all set at 0 as initial values. Then a PC value of the instruction region is stored in the PC of the RW 4A. Thereafter, as the execution of instruction regions is serially carried out, readout from the register/memory and/or writing into the register/memory is serially carried out.

When readout from the register/memory is carried out on the occasion of execution of an instruction region, the following processes are carried out by the RW 4A.

(BR1) Search is carried out so as to check whether or not an address of the register/memory from which readout is carried out has been registered in the RWO. If registered in the RWO, it is determined that the value having already registered, as an output value, in the input/output set is read out, and hence it is unnecessary to register the value ad an input value. That is, the process is terminated without registering the address in the RWI.

On this occasion, values of memory elements of row elements of the dependency relations storage section M, which correspond to the addresses having already registered in the RWO, are fetched, and stored as a provisional matrix A(x) which is a one-dimensional matrix only including row elements. Indicated by x is the number assigned in line with the order of generating the provisional matrices A. The provisional matrix A(x) is initialized when the below-mentioned writing process is completed. Although not illustrated in FIG. 10, the provisional matrix A(x) is stored in a provisional matrix storage memory that can store more than one provisional matrix A(x).

(BR2) In a case where the address of the register/memory from which readout is carried out is not registered in the RWO, search is carried out so as to check whether or not the address is registered in the RWI. If registered in the RWI, it is determined that the value having already registered, as an input value, in the input/output set is read out, and hence it is unnecessary to register the value as an input value. That is, the process is terminated without registering the address in the RWI.

On this occasion, a provisional matrix A(x) is stored. This provisional matrix A(x) is arranged such that a memory element corresponding to a column, of the dependency relations storage section M, which corresponds to an address having already registered in the RWI is set at 1, while other memory elements are set at 0.

(BR3) In a case where an address of the register/memory from which readout is carried out is registered neither in the RWO nor in the RWI, the address and value are registered in the RWI, as an input address and an input value.

On this occasion, a provisional matrix A(x) is stored. This provisional matrix A(x) is arranged such that a memory element corresponding to a column, of the dependency relations storage section M, which corresponds to the newly-added input address and input value (entry) is set at 1, while other memory elements are set at 0.

When writing into the register/memory is carried out on the occasion of execution of an instruction region, the RW 4A performs the following processes.

(BW1) Search is carried out so as to check whether or not an address of the register/memory to which writing is carried out is registered in the RWO. If registered in the RWO, it is determined that rewriting of a value having already registered, as an output value, in the input/output set has been carried out. Therefore an output value corresponding to the registered output address is updated to the written value, and the process is terminated.

On this occasion, a row element, of the dependency relations storage section M, which corresponds to an address having been registered in the RWO is replaced by a logical OR of all provisional matrices A(x) stored at this moment. With this, a pattern of input addresses/values, from which an output with respect to output addresses/values having been registered in the RWO derive, is represented by the row element, of the dependency relations storage section M, which corresponds to the output address. After the completion of the writing process and the replacement to the logical OR of the provisional matrices A(x), all provisional matrices A(x) are initialized.

(BW2) In a case where an address of the register/memory to which writing is carried out is not registered in the RWO, the address and value are registered in the RWO, as an output address and an output value.

On this occasion, a row element, of the dependency relations storage section M, which corresponds to the output address and output value (entry) that are newly added is replaced by a logical OR of all provisional matrices A(x) stored at this moment. With this, a pattern of input addresses/values, from which output with respect to output addresses/values newly registered in the RWO derive, is represented by the row element, of the dependency relations storage section M, which corresponds to the output address. After the completion of the writing process and the replacement to the logical OR of the provisional matrices A(x), all provisional matrices A(x) are initialized.

Now, as an example of an instruction region, the following describes a case where the instruction region shown in FIG. 11 is executed. In the figure, PC indicates a PC value at the start of the execution of the instruction region. This PC value is stored in the PC of the RW 4A.

Thereafter, in the first row, an instruction is executed so that a value (00001000) stored in an address R1 of the register is read out, and a value, of the main memory address (corresponding to the address A1), which indicates a result of adding 100 to the readout value is read out. At this stage, the address R1 is registered neither in the RWO nor in the RWI. The address R1 and value (00001000) are therefore registered in the RWI.

On this occasion, a provisional matrix A(1) [1000] is stored. In the provisional matrix A(1) [1000], a memory element corresponding to a column, of the dependency relations storage section M, which corresponds to the address R1 is set at 1, and other memory elements are set at 0.

Also, an instruction is executed so that a value (----FF--) of an address A1 is read out and stored in an address reg. of the register. At this stage, the address A1 is registered neither in the RWO nor in the RWI. The address A1 and value (----FF--) are therefore registered in the RWI.

On this occasion, a provisional matrix A(2) [0100] is stored. In the provisional matrix A(2) [0100], a memory element corresponding to a column, of the dependency relations storage section M, which corresponds to the address A1 is set at 1, and other memory elements are set at 0.

At this stage, the address reg. is not registered in the RWO. The address reg. and value (----FF--) are therefore registered in the RWO. On this occasion, a row element, of the dependency relations storage section M, which corresponds to the newly-added address reg. is replaced by logical OR [0100] of all provisional matrices A(1) and A(2) which are stored at this moment. Thereafter, the provisional matrix A(x) is initialized.

Subsequently, in the second row, a value is read out from an address reg. and written into the main memory, so that a value (----FF--) is written into an address B1. At this stage, the address reg. is registered in the RWO, and hence the registration to the RWO is not carried out. On this occasion, a row element, of the dependency relations storage section M, which corresponds to the address reg. is fetched, and a provisional matrix A(1) [1100] is stored.

The address B1 is not registered in the RWO. The address B1 and value (----FF--) are therefore registered in the RWO.

On this occasion, a row element, of the dependency relations storage section M, which corresponds to the newly-added output address is replaced by a logical OR [1100] of all provisional matrices A(1) stored at this moment. Thereafter, the provisional matrix A(x) is initialized.

Subsequently, in the third row, an instruction is executed so that a value (00001000) stored in an address R1 of the register is read out, and a value, of the main memory address (equivalent to an address A2), which indicates a result of adding 200 to the readout value is read out. At this stage, the address R1 has already been registered in the RWI, and hence the registration to the RWI is not carried out.

On this occasion, a provisional matrix A(1) [1000] is stored. In the provisional matrix A(1) [1000], a memory element corresponding to a column, of the dependency relations storage section M, which corresponds to the address R1 is set at 1, while other memory elements are set at 0.

Also, an instruction is executed so that a value (--01----) of the address A2 is read out and stored in an address reg. of the register. At this stage, the address A2 is registered neither in the RWO nor in the RWI. The address A2 and value (--01----) are therefore registered in the RWI.

On this occasion, a provisional matrix A(2) [0010] is stored. In the provisional matrix A(2) [0010], a memory element corresponding to a column, of the dependency relations storage section M, which corresponds to the address A2 is set at 1, while other memory elements are set at 0.

At this stage, the address reg. is registered in the RWO, and a value of the address reg. in the RWO is updated to a value (--01----). On this occasion, a row element, of the dependency relations storage section M, which corresponds to the updated address reg., is replaced by a logical OR [1010] of all provisional matrices A(1) and A(2) stored at this moment. Thereafter the provisional matrix A(x) is initialized.

Subsequently, in the fourth row, a value is read out from an address reg. and writing into the main memory is carried out, so that a value (--01----) is written into an address B2. At this stage, the address reg. is registered in the RWO, and hence the registration to the RWO is not carried out. On this occasion, a row element, of the dependency relations storage section M, which corresponds to the address reg. is fetched, and a provisional matrix A(1) [1010] is stored.

The address B2 is not registered in the RWO. The address B2 and value (--01----) are therefore registered in the RWO.

On this occasion, a row element, of the dependency relations storage section M, which corresponds to the newly-added output address is replaced by a logical OR [1010] of all provisional matrices A(1) stored at this moment. Thereafter, the provisional matrix A(x) is initialized.

Subsequently, in the fifth row, an instruction is executed so that a value (5678----) of an address A3 is read out and stored in an address reg. of the register. At this stage, the address A3 is registered neither in the RWO nor in the RWI. The address A3 and value (5678----) are registered in the RWI.

On this occasion, a provisional matrix A(1) [0001] is stored. In the provisional matrix A(1) [0001], a memory element corresponding to a column, of the dependency relations storage section M, which corresponds to the address A3 is set at 1, while other memory elements are set at 0.

At this stage, the address reg. is registered in the RWO, and a value of the address reg. in the RWO is updated to a value (5678----). On this occasion, a row element, of the dependency relations storage section M, which corresponds to the updated address reg. is replaced by a logical OR [0001] of all provisional matrices A(1) stored at this moment. Thereafter, the provisional matrix A(x) is initialized.

Finally, in the sixth row, a value is read out from an address reg. and written into the main memory, and a value (5678----) is written into an address B3. At this stage, the address reg. is registered in the RWO, and hence the registration to the RWO is not carried out. On this occasion, a row element, of the dependency relations storage section M, which corresponds to the address reg. is fetched, and a provisional matrix A(1) [0001] is stored.

Since the address B3 is not registered in the RWO, the address B3 and value (5678----) are registered in the RWO.

On this occasion, a row element, of the dependency relations storage section M, which corresponds to the newly-added output address is replaced by a logical OR [0001] of all provisional matrices A(1) stored at this moment. Thereafter, the provisional matrix A(x) is initialized. As a result of the processes above, the input/output set of the RW 4A shown in FIG. 10 is generated.

Since the dependency relations storage section M is generated as above, the following information is obtained when the execution of an instruction region is completed.

(Rs1) In a row element of the dependency relations storage section M, an input address/value from which a corresponding output address/value derives is 1.

(Rs2) If, in a row element Ma, a group of input addresses/values that are 1 forms one input group, and the input group is matched, a reusable output address/value is an output address/value corresponding to the row element Ma.

(Rs3) If a logical AND of "an inversion of a row element Ma" and "a row element Mb" is all 0, a pattern of 1 in the Ma includes a pattern of 1 in the Mb. That is, a group of input addresses/values belonging to the Ma forms one input group, and a reusable output address/value in a case where the input group is matched is an output address/value corresponding to the Ma and an output address/value corresponding to the Mb.

(Rs4) If a logical AND of "a row element Ma" and "a row element Mb" is all 0, an input address/value belonging to the Ma and an input address/value belonging to the Mb are independent of each other.

Based on the information above, the RW 4A divides an input/output set into a plurality of input/output groups. First, as a process related to the aforesaid (Rs3), the rows AND comparison section MR extracts a group of row elements where a logical AND of "an inversion of a row element Ma" and "a row element Mb" is all 0, from the dependency relations storage section M. Among the extracted groups of row elements, row elements including the largest number of groups of input addresses/values, i.e. row elements including all groups of input addresses/values of other row elements are selected as upper row elements. Then, among the extracted row elements, lower row elements that are different from the upper row elements are deleted. As a result of this process, it is possible to exclude redundant input/output groups.

After deleting the lower row elements, the rows AND comparison section MR extracts, as a process related to the aforesaid (Rs4), groups of row elements where a logical AND of "a row element Ma" and "a row element Mb" is all 0. Then, among the extracted groups of row elements, a row element where 0 is always obtained by a logical AND of the element and all other elements is further extracted. The extracted row elements do not depend on any row elements. The extracted row elements are therefore termed independent row elements, while the remaining row elements are termed non-independent row elements.

In regard of the independent row elements, a group of corresponding input addresses/values and a group of corresponding output addresses/values is extracted, and set as one input/output group. As to non-independent row elements, setting as one input/output group is carried out by one of the following processes. In the meanwhile, non-independent row elements are set as an input/output group, by either one of the following two processes.

According to the first process, the total sum of a group of input addresses/values and a group of output addresses/values, which are included in all non-independent row elements, is set as one input/output group. According to the second process, each of non-independent row elements is set as an independent input/output group. When the first process is carried out, the number of input/output groups does not unnecessarily increases, so that a used memory capacity of the instruction region storage section 2 can be reduced. Meanwhile, when the second process is carried out, the number of input/output groups is relatively large and a used memory capacity of the instruction region storage section 2 is also relatively large. However, since it is possible in the instruction region storage section 2 to increase the number of tree structures to be concurrently searched. On this account, it is possible to exploit the capability of high throughput of an associative search device.

When input/output groups are set as above, the rows AND comparison section MR assigns group IDs to the respective input/output groups, and stores, in a group ID storage section ID, information which indicates in which group ID each input address/value registered in the RWI is included. As a result, it is possible to specify an input pattern of each input/output group, by referring to the content of the group ID storage section ID.

As described above, the RW4A generates one or more input/output groups, and registers the generated input/output groups in the instruction region storage section 2, as an execution result. On account of this process, an execution result of one instruction region is registered in the instruction region storage section 2, as one or more input/output groups. Therefore, when an instruction region is executed through reuse, it is possible to increase the feasibility of the reuse, even if only a part of the input pattern of the previously-executed instruction region is matched. Moreover, since it is possible to increase the feasibility that plural tree structures to be concurrently searched exist, it is possible to exploit the capability of high throughput of an associative search device, and hence the improvement in processing speed is expected.

In the present embodiment, an input group generated by the RW 4A is registered in the instruction region storage section 2 where an input pattern is registered in the form of a tree structure. The present invention, however, is not limited to this arrangement. That is, the RW 4A of the present embodiment can be adopted to an instruction region storage section which can register an input/output group generated by the RW 4A, in such a form that an execution result of an instruction region is reusable.

Third Example of RW

According to the second example of the RW, the rows AND comparison section MR performs a computation using the dependency relations storage section M, and this makes it possible to register an execution result of one instruction region in the instruction region storage section 2, as one or more input/output groups. However, if the number of patterns of output addresses and output values is large in an execution result of an instruction region, the number of rows in the dependency relations storage section M is also large. In such a case, the logical AND calculation by the rows AND comparison section MR is enormous, and hence the size of the circuit of the rows AND comparison section MR must also be large. The third example of the RW described below resolves this problem.

Figure 20:
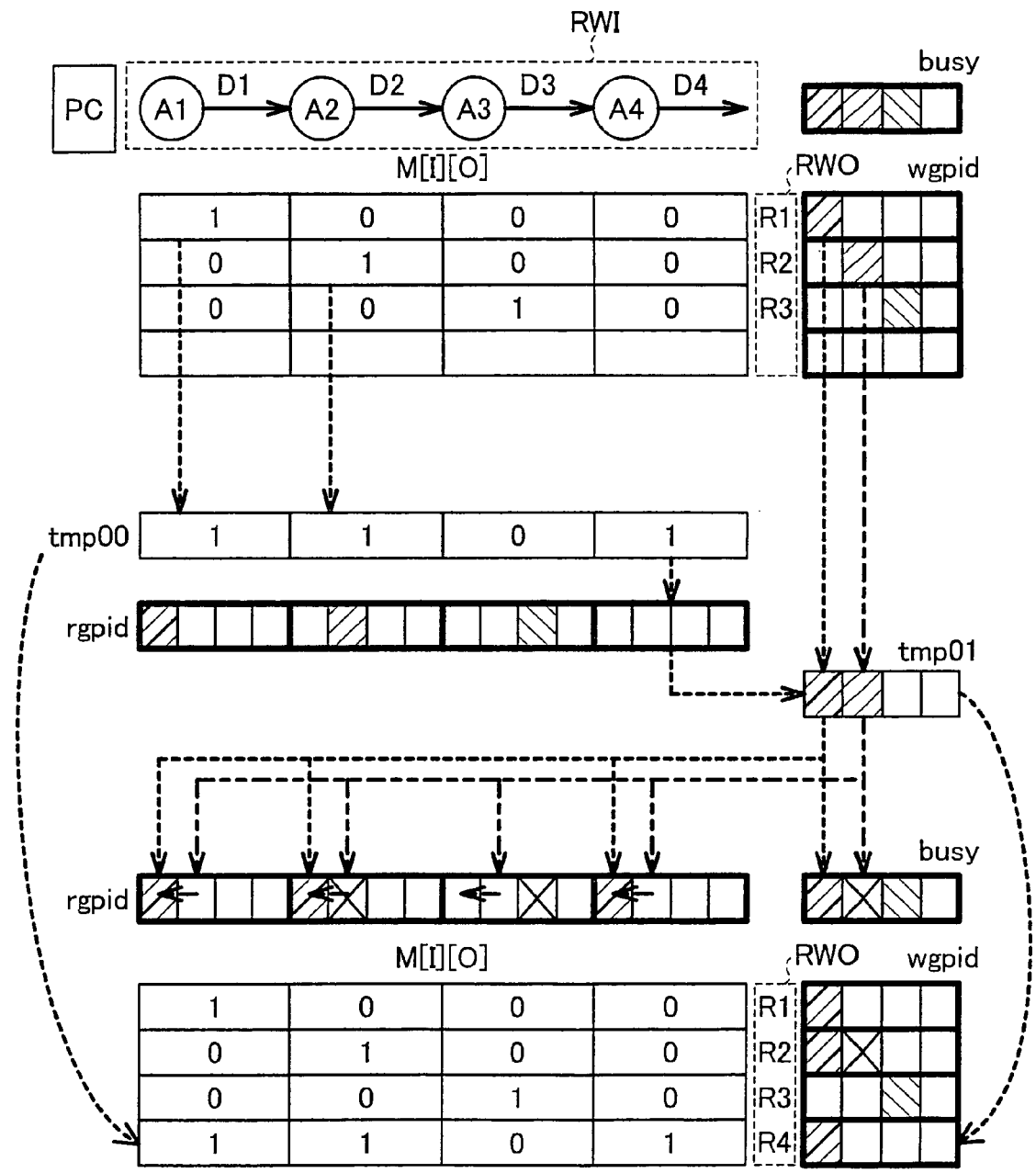
FIG. 20 outlines an RW of a third example.

FIG. 20 outlines the RW 4A of the third example. As shown in the figure, the RW 4A includes: PC that stores a PC value of an instruction region; RWI that stores an input address and an input value; RWO that stores an output address and an output value; a dependency relations storage section M; a row temporal storage section (temporal storage section) tmp00; input side number storage section (input side group storage section) rgpid; output side number storage section (output side group storage section) wgpid; a number management section (group management section) busy; and a number temporal storage section (group temporal storage section) tmp01.

The dependency relations storage section M is a 2D-arranged memory, whose input side is a row specifier [I] while whose output side is a column specifier [O]. In each memory element, 0 or 1 is stored. In the dependency relations storage section M, each column corresponds to a group of an input address and an input value registered in the RWI, while each row corresponds to a group of an output address and an output value registered in the RWO. The dependency relations storage section M indicates from which group of an input address and an input value a group of an output address and an output value derives.

The row temporal storage section tmp00 is a memory that temporarily stores a row read out from the dependency relations storage section M. The input side number storage section rgpid is a memory that stores a group number assigned to each group of an input address and an input value. The output side number storage section wgpid is a memory that stores a group number assigned to each group of an output address and an output value. When the execution of an instruction region is completed, (1) a group number) to which each set of input data belongs is represented by a bit location where 1 is assigned in the corresponding input side number storage section rgpid, and (2) a group number to which each set of output data belongs is represented by a bit location where 1 is assigned in the corresponding output side number storage section wgpid.

The number management section busy is a memory that manages the availability of group numbers. The number temporal storage section tmp01 is a memory that temporarily stores group number information which is read out from the input side number storage section rgpid and the output side number storage section wgpid.

Immediately before the start of the execution of an instruction region, the dependency relations storage section M, the row temporal storage section tmp00, the input side number storage section rgpid, the output side number storage section wgpid, the number management section busy, and the number temporal storage section tmp01 are all initialized to 0. Then a PC value of that instruction region is stored in the PC of the RW 4A. Thereafter, as the execution of the instruction regions is serially carried out, readout from the register/memory and/or writing into the register/memory is serially carried out.

When the readout from the register/memory is carried out on the occasion of the execution of an instruction region, the RW 4A performs the following process.

(CR1) Search is performed so as to check whether or not an address of the register/memory from which the readout is carried out is registered in the RWO. If registered in the RWO, it is determined that a value having already been registered, as an output value, in an input/output set is read out. It is therefore unnecessary to register the value as an input value. That is, the process is terminated without registering the address in the RWI.

On this occasion, a value of each memory element of a row element, of the dependency relations storage section M, which corresponds to an address having already been registered in the RWO is fetched, and a logical OR of the fetched value and the elements stored in the row temporal storage section tmp00 is worked out. The logical OR as a result of the calculation is stored in the row temporal storage section tmp00. That is, information regarding the input is stored in the row temporal storage section tmp00 which indicates the origin of the data thus read out.

Also, a value of each element of a row element, of the output side number storage section wgpid, which corresponds to an address having already been stored in the RWO is fetched, and a logical OR of the fetched value and the elements stored in the number temporal storage section tmp01 is worked out. The logical OR as a result of the calculation is stored in the number temporal storage section tmp01. That is, information regarding the input is stored in the number temporal storage section tmp01 which indicates a group to which readout data belongs.

(CR2) In a case where an address of the register/memory from which the readout is carried out is not registered in the RWO, search is carried out so as to check whether or not the address is registered in the RWI. If registered in the RWI, it is determined that a value which has been registered, as an input value, in an input/output set is read out. It is therefore unnecessary to register the value as an input value. Therefore, the process is terminated without registering the address in the RWI.

On this occasion, a bit of a memory element corresponding to a location [I], on the input side, where registration has been performed, is set at 1, in the row temporal storage section tmp00. That is, a row temporal storage section tmp00, which indicates the origin of the readout data, is newly generated.

In the row temporal storage section tmp00, the input side number storage section rgpid, which corresponds to the column location of a memory element whose bit is set at 1 in the row temporal storage section tmp00, is read out, and a logical OR of the readout value and elements stored in the number temporal storage section tmp01 is worked out. The logical OR as a computation result is stored in the number temporal storage section tmp01. That is, information regarding the input is stored in the number temporal storage section tmp01 indicating a group to which the readout data belongs.

(CR3) In a case where an address of the register/memory from which the readout is carried out is registered neither in the RWO nor in the RWI, the address and value are registered in the RWI, as an input address and an input value.

On this occasion, a bit of a memory element, of the row temporal storage section tmp00, which corresponds to the newly-registered location [I] is set at one that is, a row temporal storage section tmp00 that indicates the origin of the data from which the readout is carried out is newly generated.

When writing into the register/memory is carried out on while an instruction region is executed, the following process is carried out by the RW 4A.

The input side number storage section rgpid, which corresponds to the column location of a memory element whose bit is set at 1 in the row temporal storage section tmp00, is read out, and a logical OR of the input side number storage section rgpid and the element stored in the number temporal storage section tmp01 is worked out. This logical OR as a computation result is stored in the number temporal storage section tmp01. That is, information regarding the input is stored in the number temporal storage section tmp01 indicating a group to which the readout data belongs.

(CW1) Search is carried out so as to check whether or not an address of the register/memory to which writing is performed is registered in the RWO. If registered in the RWO, it is determined that a value having already been registered, as an output value, in an input/output set is rewritten. On this account, a registered output value corresponding to the output address is updated to the written value, and the process is terminated.

On this occasion, a value of each memory element of a row element, of the dependency relations storage section M, which corresponds to an address having already registered in the RWO, is replaced by a value of each element which is generated at the time of the execution of the instruction region and is stored in the row temporal storage section tmp00. That is to say, the origin of the written data is replaced by a value in the row temporal storage section tmp00.

On this occasion, a value of each element in the number temporal storage section tmp01 is checked. If all elements in the number temporal storage section tmpO1 are zero, a row location in the number temporal storage section tmp01, which corresponds to a row location that is a vacant group number in the number management section busy, is set at 1. More specifically, a row location in the number temporal storage section tmp01, which corresponds to the leftmost row location with 0 in the number management section busy, is set at 1. On this occasion, moreover, in the number temporal storage section tmp01, a row location in the number management section, which corresponds to the row location set at 1, is also set at 1.

In the meanwhile, in a case where an element of the number temporal storage section tmp01 is 1, the row location corresponding to the leftmost 1 is recognized as a group number to be used. Then values of all elements of the number temporal storage section tmp01 are set at 0 except the leftmost element which is set at 1, and the values are written into the registered location [O] in the output side number storage section wgpid and in the corresponding locations in the input side number storage section rgpid whose location corresponds to the locations of the row temporal storage section tmp00 which is 1.

Among all elements of the number temporal storage section tmp01, the values except the leftmost 1 are compared with the entirety of the input side number storage section rgpid and the entirety of the output side number storage section wgpid, so that a logical AND of the elements is worked out. As a result of the logical AND, the column locations of the input side number storage section rgpid and the output side number storage section wgpid, which retain the elements that are 1, are set at 0. Consequently, the sections rgpid and wgpid are set at values of the entirety of number temporal storage section tmp01 whose values are set at 0 except the leftmost 1.

(CW2) In a case where an address of the register/memory to which writing is carried out is not registered in the RWO, the address and value are registered in the RWO, as an output address and an output value.

On this occasion, a value of each memory element of a row element, of the dependency relations storage section M, which corresponds to the newly-added output address and output value (entry) is rewritten to a value of each element which is generated at the time of the execution of the instruction region and is stored in the row temporal storage section tmp00. That is, the origin of the written data is replaced by a value of the row temporal storage section tmp00.

In a manner similar to the CW2, a value of each element of the number temporal storage section tmp01 is checked. If all elements of the number temporal storage section tmp01 are 0, a row location, of the number temporal storage section tmp01, which corresponds to a row location that is a vacant group number in the number management section busy, is set at 1. More specifically, among the elements in the number management section busy, a row location of the number temporal storage section tmp01, which corresponds to the leftmost 0, is set at 1. On this occasion, moreover, in the number temporal storage section tmp01, a row location of the number management section busy is set at 1. This row location corresponds to a row location of the number temporal storage section tmp01, which is set at 1.

In the meanwhile, if an element of the number temporal storage section tmp01 is 1, a row location corresponding to the leftmost 1 is recognized as a group number to be used. Then values of all elements of the number temporal storage section tmp01 are set at 0 except the leftmost element set at 1, and the values are written into the registered location [O] in the output side number storage section wgpid and in the corresponding locations in the input side number storage section rgpid whose location corresponds to the locations of the row temporal storage section tmp00 which is 1.

Among all elements of the number temporal storage section tmp01, the values except the leftmost 1 are compared with the entirety of the input side number storage section rgpid and the entirety of the output side number storage section wgpid, so that a logical AND of the elements is worked out. As a result of the logical AND, the column locations of the input side number storage section rgpid and the output side number storage section wgpid, which retain the elements that are 1, are set at 0. Consequently, the sections rgpid and wgpid are set at values of the entirety of number temporal storage section tmp01 whose values are set at 0 except the leftmost 1.

As a result of the process above, the following information is obtained at the time of the completion of the execution of the instruction region.

(1) A group number to which each set of input data belongs is obtained in reference to a bit location, which is 1, of the corresponding input side number storage section rgpid.

(2) A group number to which each set of output data belongs is obtained in reference to a bit location, which is 1, of the corresponding output side number storage section wgpid.

As an example of an instruction region, the following will describe a case where the instruction region shown in FIG. 15 is executed. In the figure, indicated by PC is a PC value at the time of starting the execution of the instruction region. This PC value is stored in the PC of the RW 4A.

By the first instruction, 4-byte data (00110000) loaded from an address A1 of the memory is stored in an address R1 of the register. At this stage, the address A1 having been read out is registered neither in the RWO nor in the RWI. The address A1 and data (00110000) are therefore registered in the first position in the column of the RWI.

Concurrently, the first position in the column of the row temporal storage section tmp00 is set at 1, and hence the row temporal storage section tmp00 stores "1000". A value "0000", is written into the number temporal storage section tmp01. This number "0000" is read out from the first position in the column of the input side number storage section rgpid, which position corresponds to the first position in the column the row temporal storage section tmp00 where 1 is set. In a case where all elements of the number temporal storage section tmp01 is 0, the elements of the number management section busy is checked. Subsequently, the first position in the column, which corresponds to the leftmost 0 of the elements "0000" of the number management section busy, is recognized as a vacant group number to be used next. Thereafter, the first positions in the columns of the number management section busy and the number temporal storage section tmp01 are set at 1. As a result, the number management section busy stores "1000", while the number temporal storage section tmp01 stores "1000".

Since an address R1 to which the writing is carried out is not registered in the RWO, the address R1 and data (00110000) are registered in the first row of the RWO. Concurrently, all of the elements "1000" of the row temporal storage section tmp00 are written into the first row of the dependency relations storage section M. Also, all of the elements "1000" of the number temporal storage section tmp01 are written into the first row of the output side number storage section wgpid. Moreover, all of the elements "1000" of the number temporal storage section tmp01 are written into the first position in the column of the input side number storage section rgpid in a row, of the row temporal storage section tmp00, which is set at 1.

Subsequently, by the second instruction, one-byte data (02) loaded from an address A2 of the memory is stored in an address R2 of the register. At this stage, the address A2 from which the readout is carried out is registered neither in the RWO nor in the RWI. The address A2 and data (02) are therefore registered in the second column of the RWI. On this occasion, "-" which indicates "Don't Care" is stored in the remaining 3 bytes of the address A2.

Concurrently, the second position in the column of the row temporal storage section tmp00 is set at 1, so that the row temporal storage section tmp00 stores "0100".

Also, a value "0000" is written into the number temporal storage section tmp01. This value "0000" is read out from the second position in the column of the input side number storage section rgpid, which position corresponds to the second position in the column of the row temporal storage section tmp00 where 1 is set. In a case where all of the elements of the number temporal storage section tmp01 are 0, the elements of the number management section busy are checked. Among the elements "1000" of the number management section busy, the second position in the column, which is the leftmost 0, is recognized as a vacant group number to be used next. Thereafter, the second positions in the columns of the number management section busy and the number temporal storage section tmp01 are set at 1. As a result, the number management section busy stores "1100", while the number temporal storage section tmp01 stores "0100".

An address R2 to which writing is carried out is not registered in the RWO. The address R2 and data (02) are therefore registered in the second row of the RWO. Concurrently, all of the elements "0100" of the row temporal storage section tmp00 are written into the second row of the dependency relations storage section M. Moreover, all of the elements "0100" of the number temporal storage section tmp01 are written into the second row of the output side number storage section wgpid. Furthermore, all of the elements "0100" of the number temporal storage section tmp01 are written in the second position in the column of the input side number storage section rgpid, in the column, of the row temporal storage section tmp00, which is set at 1.

Subsequently, by the third instruction, one-byte data (22) loaded from an address (A2+R2) of the memory is stored in an address R2 of the register. In this case, the address R2 is a register overwritten in the instruction region. The address R2 does not therefore function as an input of the instruction region.

Meanwhile, since data stored in the address R2 is (02), an address of the memory from which the readout is carried out is (A2+02). At this stage, the address (A2+02) from which the readout is carried out is registered neither in the RWO nor in the RWI. The address (A2+02) and data (22) are therefore additionally registered in the second column of the RWI.

On this occasion, among 4 bytes in the address A2, data (22) is registered in bytes representing the address (A2+02). That is to say, since the second instruction caused the data (02) to be registered in the bytes representing the address A2, the bytes representing the address (A2+02) and the bytes representing the address (A2+03) still store "-" indicating "Don't Care".

Concurrently, the second position in the row of the row temporal storage section tmp00 is set at 1, and hence the row temporal storage section tmp00 stores "0100".

In accordance with the readout from the address R2, a value "0100", which is read out from the second position in the row, of the dependency relations storage section M, which corresponds to the address R2, is written into the row temporal storage section tmp00. Furthermore, a value "0100", which is read out from the second position in the row, of the output side number storage section wgpid, which corresponds to the address R2, is written into the number temporal storage section tmp01.

Also, a value "0100" is written into the number temporal storage section tmp01, as a logical OR. The value "0100" is read out from the second position in the column of the input side number storage section rgpid, which position corresponds to the second column of the column, of the row temporal storage section tmp00, which is set at 1. In a case where the number temporal storage section tmp01 has an element whose bit is 1, the second position in the column, which corresponds to the leftmost 1, is recognized as a vacant group number to be used next.

An address R2 to which the writing is carried out has already been registered in the RWO. Therefore, an output value corresponding to the address R2 is rewritten from data (02) to data (22). Concurrently, all of the elements "0100" of the row temporal storage section tmp00 are written into the second row of the dependency relations storage section M. Moreover, all of the elements "0100" of the number temporal storage section tmp01 are written into the second row of the output side number storage section wgpid. Furthermore, all of the elements "0100" of the number temporal storage section tmp01 are written into the second position in the column of the input side number storage section rgpid. The column is set at 1.

Subsequently, by the fourth instruction, one-byte data (33) loaded from an address A3 of the memory is stored in an address R3 of the register. At this stage, the address A3 from which the readout is carried out is registered neither in the RWO nor in the RWI. The address A3 and data (33) are therefore registered in the third column of the RWI.

Concurrently, the third position in the column of the row temporal storage section tmp00 is set at 1, and hence the row temporal storage section 00 stores "0010".

Also, a value "0000" is written into the number temporal storage section tmp01. The value "0000" is read out from the third position in the column, of the input side number storage section rgpid, which corresponds to the third position in the column of the row temporal storage section tmp00, which is set at 1. In a case where all of the elements of the number temporal storage section tmp01 are 0, the elements of the number management section busy are checked. Among the elements "1100" of the number management section bust, the third position in the column, which is the leftmost 0, is recognized as a vacant group number to be used next. Thereafter, the third position in the column of the number management section busy and the number temporal storage section tmp-1 are set at 1. As a result, the number management section busy stores "1110", while the number temporal storage section tmp01 stores "0010".

Since the address R3 to which the writing is carried out is not registered in the RWO, the address R3 and data (33) are registered in the third row of the RWO. Concurrently, all of the elements "0010" of the row temporal storage section tmp00 are written into the third row of the dependency relations storage section M. Moreover, all of the elements "0010" of the number temporal storage section tmp01 are written into the third row of the output side number storage section wgpid. Furthermore, all of the elements "0010" of the number temporal storage section tmp01 are written into the third position in the column of the input side number storage section rgpid. The column is set at 1.

Finally, by the fifth instruction, one-byte data (44) loaded from an address (R1+R2) of the memory is stored in an address R4 of the register. Since the addresses R1 and R2 are registers overwritten in the instruction region, these addresses does not function as inputs of the instruction region. In the meanwhile, an address A4 generated by (R1+R2) functions as an input of the instruction region. This address A4 is registered neither in the RWO nor in the RWI. The address A4 and data (44) are therefore registered in the fourth column of the RWI.

Concurrently, the fourth position in the column of the row temporal storage section tmp00 is set at 1. The row temporally storage section tmp00 therefore stores "0001".

In accordance with the readout from the addresses R1 and R2, a logical OR "1101" of the values "1000", "0100", and "0001" is written into the row temporal storage section tmp00. The values "1000" and "0100" are read out from the first and second positions in the row, of the dependency relations storage section M, which correspond to the addresses R1 and R2, respectively. Meanwhile, the value "0001" is that of the row temporal storage section tmp00. Moreover, a logical OR "1100" of values "1000" and "0100" are written into the number temporal storage section tmp01. The values "1000" and "0100" are read out from the first and second positions in the row, of the output side number storage section wgpid, which correspond to the addresses R1 and R2, respectively.

A logical OR "1100" of values "0000" and "1100" are written into the number temporal storage section tmp01. The value "0000" is read out from the fourth position in the column, of the input side number storage section tgpid, which corresponds to the fourth position in the column of the row temporal storage section, which is initially set at 1. The value "1100" is stored in the number temporal storage section tmp01. In a case where the number temporal storage section tmp01 has an element whose bit is 1, the first position in the row, which is the leftmost 1, is recognized as a vacant group number to be used next.

The address R4 to which the writing is carried out is not registered in the RWO. The address R4 and data (44) are therefore registered in the fourth row of the RWO. Concurrently, all of the elements "1101" of the row temporal storage section tmp00 are written into the fourth row of the dependency relations storage section M. Also, all of the elements "1110" of the number temporal storage section tmp01 are changed to 0 except the leftmost 1, and the resultant "1000" is written into the fourth row of the output side number storage section wgpid. Also, all of the elements "1100" of the number temporal storage section tmp01 are changed to 0 except the leftmost 1, and the resultant value "1000" is written into the first, second, and fourth positions in the column of the input side number storage section rgpid, which correspond to the column, of the row temporal storage section wgpid, which is set at 1.

From all of the elements "1100" of the number temporal storage section tmp01, the leftmost 1 is excluded. The resultant value "0100" is compared with all of the elements of the input side number storage section rgpid and all of the elements of the output side number storage section wgpid. As to entries of the input side number storage section rgpid and the output side number storage section wgpid, which retain bits whose logical AND is 1, the bits are reset at 0. On this account, all of the elements "1100" of the number temporal storage section tmp01 are set at 0 except the leftmost 1, i.e. "0100".

As a result of the process above, a group 0 is displayed as to the input sets A1-D1, A2-D2, and A4-D4, in the corresponding position in the column of the input side number storage section rgpid. As to the output sets R1, R2, and R4, a group 0 is displayed at the corresponding position in the row of the output side number storage section wgpid. In the meanwhile, as to the input sets A3-D3, a group number 2 is displayed at the corresponding position in the row of the input side number storage section rgpid. As to the output set R3, a group 2 is displayed at the corresponding position in the row of the output side number storage section wgpid.

Fourth Example of RW

In a case where an instruction region includes a conditional branch instruction, the resource related to the generation of a condition code used for the conditional branch takes part in all executions of instructions after the execution of the conditional branch instruction. On this account, a technique of group division in consideration of the conditional branch instruction is required. A fourth example of the RW described below realizes this technique.

Figure 21:
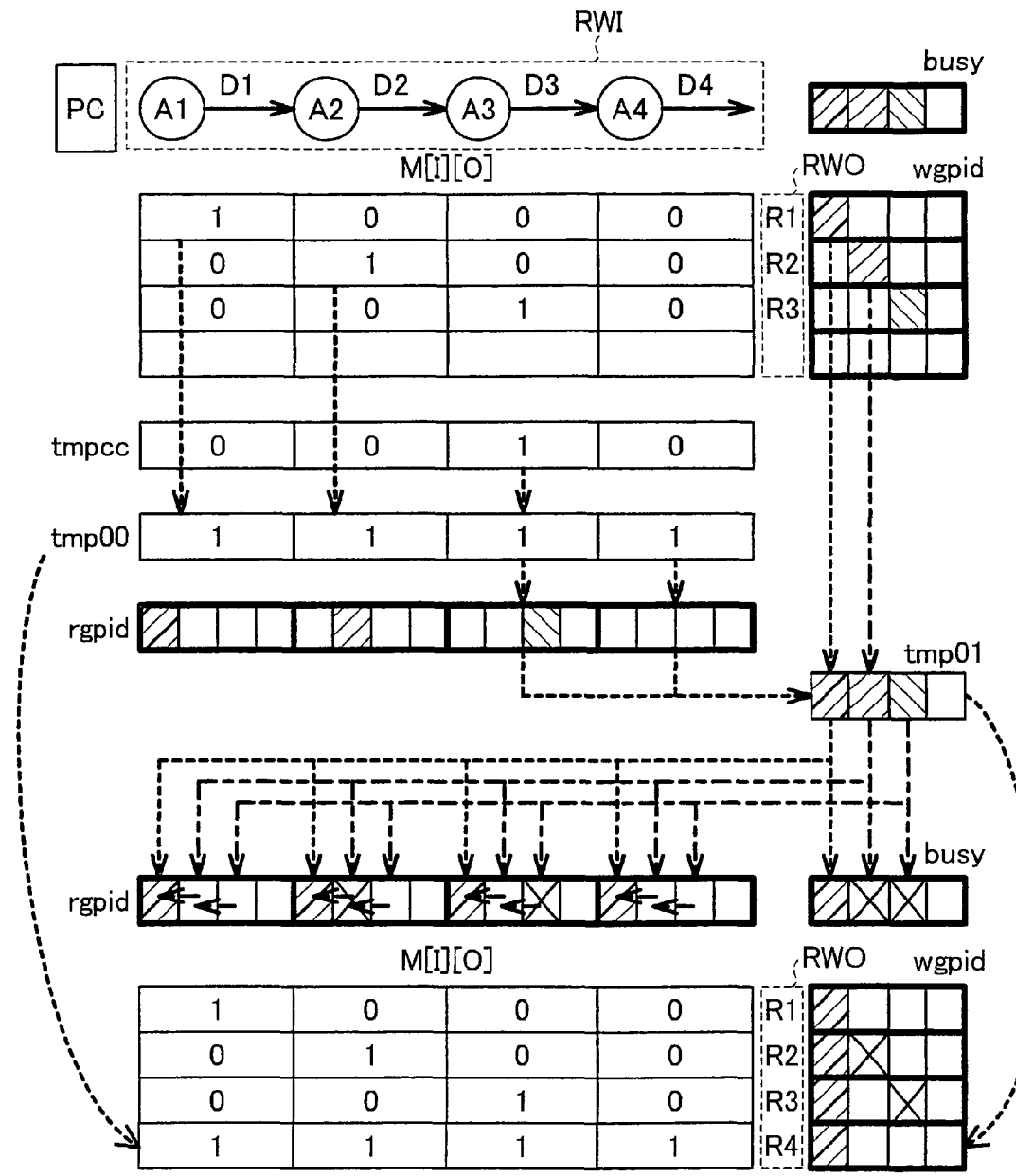
FIG. 21 shows an RW of a fourth example.

FIG. 21 outlines the RW 4A of the fourth example. As shown in the figure, the RW 4A includes: PC storing a PC value of an instruction region; RWI which stores an input address and an input value; RWO which stores an output address and an output value; a dependency relations storage section M; a row temporal storage section tmp00; input side number storage section rgpid; output side number storage section wgpid; a number management section busy; and a number temporal storage section tmp01. in addition to them, the RW4A is further provided with a conditional branch storage section (conditional branch storage section) tmpcc, for the purpose of handling the disturbance of dependency relations on account of the execution of a conditional branch instruction.

The conditional branch storage section tmpcc is a memory that stores an input set involved with a conditional branch. No matter whether the conditional branch is true or false, executions of instructions after the branch instruction depend on all inputs involved with the generation of the condition code.

In the above-described third example of the RW, the row temporal storage section tmp00 is initialized in response to each instruction. On the other hand, in the fourth example of the RW, the initialization of the row temporal storage section tmp00 is carried out in such a manner that a value of the conditional branch storage section tmpcc is copied to the row temporal storage section tmp00.

Figure 22:
FIG. 22 shows a further example of the instruction region.

The example shown in FIG. 21 illustrates a case where the instruction region shown in FIG. 22 is executed. In the instruction region shown in FIG. 22, the first to fourth instructions are identical with those of the instruction region shown in FIG. 15.

By the fifth instruction, a value of an address R3 is inspected. By the sixth instruction, a conditional branch is carried out based on the result of the inspection by the fifth instruction. Since the fifth and sixth instructions depend on the value of the address R3, the third row of the dependency relations storage section M is copied to the conditional branch storage section tmpcc, at the time of the execution. Thereafter, before the execution of the seventh instruction, a value "0010" stored in the conditional branch storage section tmpcc is copied to the row temporal storage section tmp00.

By the seventh instruction, one-byte data (44) loaded from an address (R1+R2) is stored in an address R4 of the register. Since the address R1 and R2 are overwritten in the instruction region, these addresses R1 and R2 do not function as inputs of the instruction region. In the meanwhile, an address A4 generated by (R1+R2) functions as an input of the instruction region. The address A4 is registered neither in the RWO nor in the RWI. The address A4 and data (44) are therefore registered in the fourth column of the RWI.

Concurrently, the fourth position in the column of the row temporal storage section tmp00 is set at 1, and hence the row temporal storage section tmp00 stores "0011".

In accordance with the readout from addresses R1 and R2, a logical OR "1111" of values "1000", "0100" and "0011" is written into the row temporal storage section tmp00. The values "1000" and "0100" are read out from the first and second positions in the row of the dependency relations storage section M, which correspond to the addresses R1 and R2, respectively. The value "0011" is that of the row temporal storage section tmp00. Furthermore, a logical OR "1100" of values "1000" and "0100" is written into the number temporal storage section tmp01. The values "1000" and "0100" are read out from the first and second positions in the row of the output side number storage section wgpid, which correspond to the addresses R1 and R2, respectively.

Also, a logical OR "0010" of values "0010", "0000", and "1100" is written into the number temporal storage section tmp01. The values "0010" and "0000" are read out from the third and fourth positions in the column of the input side number storage section rgpid, which correspond to the third and fourth positions in the column of the row temporal storage section tmp00, which are set at 1. The value "1100" is stored in the number temporal storage section tmp01. In a case where the number temporal storage section tmp01 has an element whose bit is 1, the first position in the row, which is the leftmost 1, is recognized as a vacant group number to be used next.

An address R4 to which the writing is carried out is not registered in the RWO. The address R4 and data (44) are therefore registered in the fourth row of the RWO. Concurrently, all of the elements of the number temporal storage section tmp01 are changed to 0 except the leftmost 1, i.e. to "1000", and this value "1000" is written into the fourth row of the output side number storage section wgpid. Also, all of the elements "1110" of the number temporal storage section tmp01 are changed to 0 except the leftmost 1, i.e. to "1000", and the value "1000" is written into the first, second, third, and fourth positions in the column of the input side number storage section rgpid, which correspond to the column, of the row temporal storage section tmp00, which is set at 1.

Also, from all of the elements "110" of the number temporal storage section tmp01, the leftmost 1 is eliminated. The resultant value "0110" is compared with all elements of the input side number storage section rgpid and all elements of the output side number storage section wgpid. As to entries of the input side number storage section rgpid and the output side number storage section wgpid, which retain a bit whose logical AND is 1, the bits are reset to 0. On this account, all of the elements "1110" of the number temporal storage section tmp01 are changed to 0 except the leftmost 1, i.e. set at "1000". This value "1000" is set at the number temporal storage section tmp01.

As a result of the process above, a group 0 is displayed at the corresponding position in the column of the input side number storage section rgpid, as to the input sets A1-D1, A2-D2, A3-D3, and A4-D4. As to the output sets R1, R2, R3, and R4, a group 0 is displayed at the corresponding position in the row of the output side number storage section wgpid. In other words, input data on which the output of the address R4 depends in response to the execution of the conditional branch instruction is all of the input sets A1-D1, A2-D2, A3-D3, and A4-D4.

(Setting of Reuse Table Based on Group Division)

Figure 23:
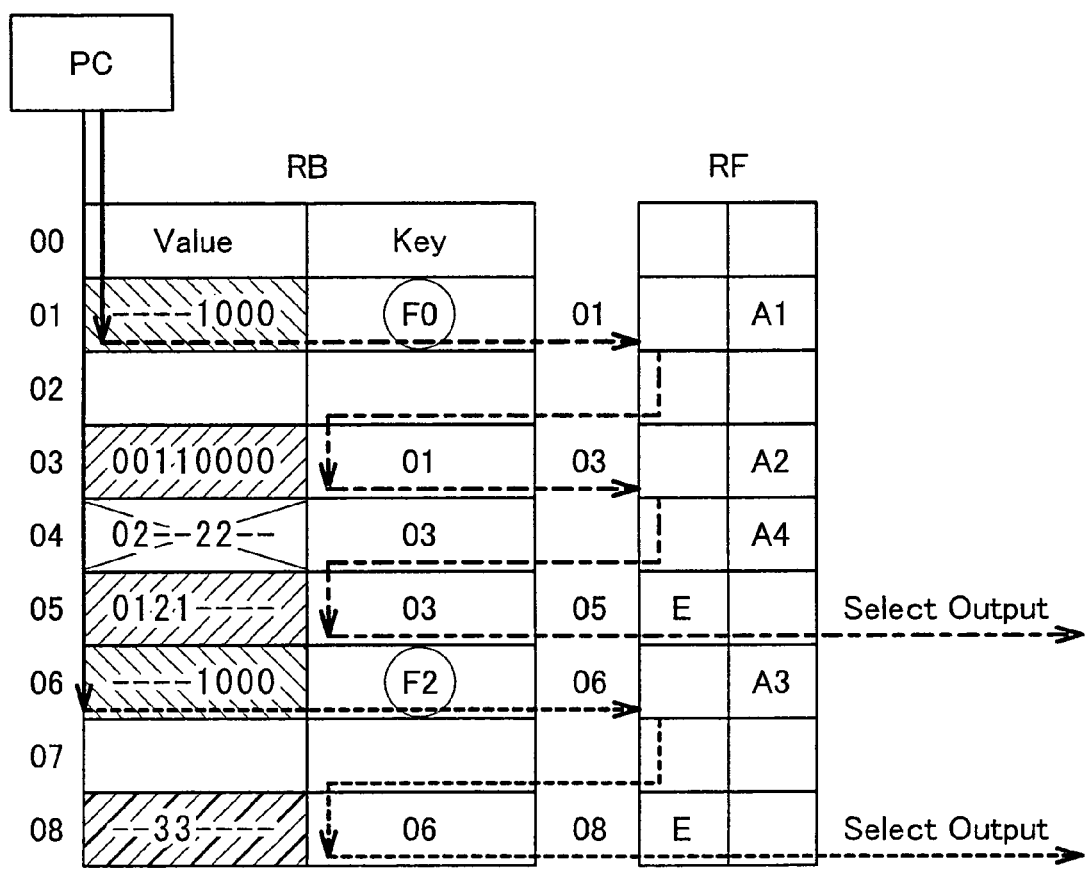
FIG. 23 shows a specific example of associative search in the instruction region storage section that stores a plurality of tree structures generated in accordance with the group numbers.

As described above, according to the third and fourth examples of the RW, a group number is assigned to each of the input sets and output sets. Based on this, input sets belonging to the same group constitutes an independent tree structure as shown in FIG. 19. Based on the tree structure, as shown in FIG. 23, each input set is stored in the associative search devices of the RB and RF. In the example shown in FIG. 3, an initial search key is only FF. However, assigning a group number to each input set as above makes it possible to use a plurality of initial search keys (F0, F1, F2, . . . ). It is therefore possible to simultaneously start a plurality of searches. In the example shown in FIG. 23, initial search keys F0 and F2 are set for the leading keys of independent tree structures whose group number are 0 and 2, respectively.

(Details of Register Value)

Examples of register input/output values include an argument, a return value (Args.), and a register code condition codes (regs., CC) other than the argument and return value. In the present embodiment, the following ones among SPARC architecture registers are used (details will be discussed later): general registers % g0-7, % o0-7, % l0-7, and % i0-7, a floating-point register % f0-31, a condition code register ICC, and a floating-point condition code register FCC. Among these registers, an input of a leaf function is the general register % o0-5, an output thereof is the general register % o0-1 or % f0-1, an input of a non-leaf function is the general register % i0-5, an output thereof is the general register % i0-1 or % f0-1. Inputs are registered in the arg[0-5], while outputs are registered in the rti[0-1] or % rtf[0-1]. According to the provision of SPARC-ABI, registers other than the above do not act as inputs and outputs of a function.

Therefore, as to a function, Args. is registered in the RB and RO1/RO2, as a register input/output value.

In the meanwhile, it is not possible to specify the type of register to be used for input/output of a loop, according to the provisions of SPARC-ABI. On this account, all types of registers must be registered in the RB in order to specify input/output of a loop. Therefore, as to a loop, the registers % g0-7, % o0-7, % i0-7, % f0-31, ICC, and FCC corresponding to Regs. and CC are registered as register input/output values.

(Multiple Reuse)

In a case where the above-described reuse mechanism is used in the first level, a function B as a leaf function and a loop C in the function B, or the like can be reused in an example shown in FIG. 46(*a*). In the meanwhile, multiple reuse is feasible in a case where registration is carried out so that, once a function is executed, all instruction regions in the function, e.g. functions and loops in the function, are reusable. In the example above, once a function A is executed, all of nested instruction regions A, B, and C are reusable. The following will describe a function enhancement required for realizing multiple reuse.

Figure 6:
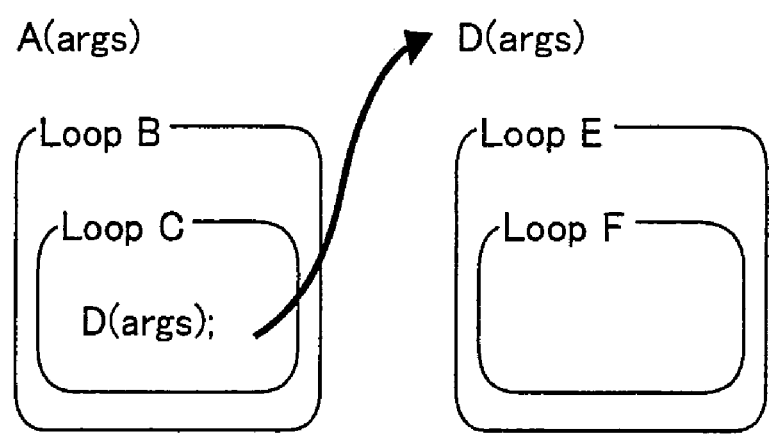
FIG. 6 shows an example in which functions and loops are nested.

FIG. 6 shows, as an example, a conceptual structure of functions A and D. In the example, a loop B exists in the function A while a loop C exists in the loop C. The loop C calls the function D. In the function D, a loop E exists, and a loop F exists in the loop E.

Figure 7:
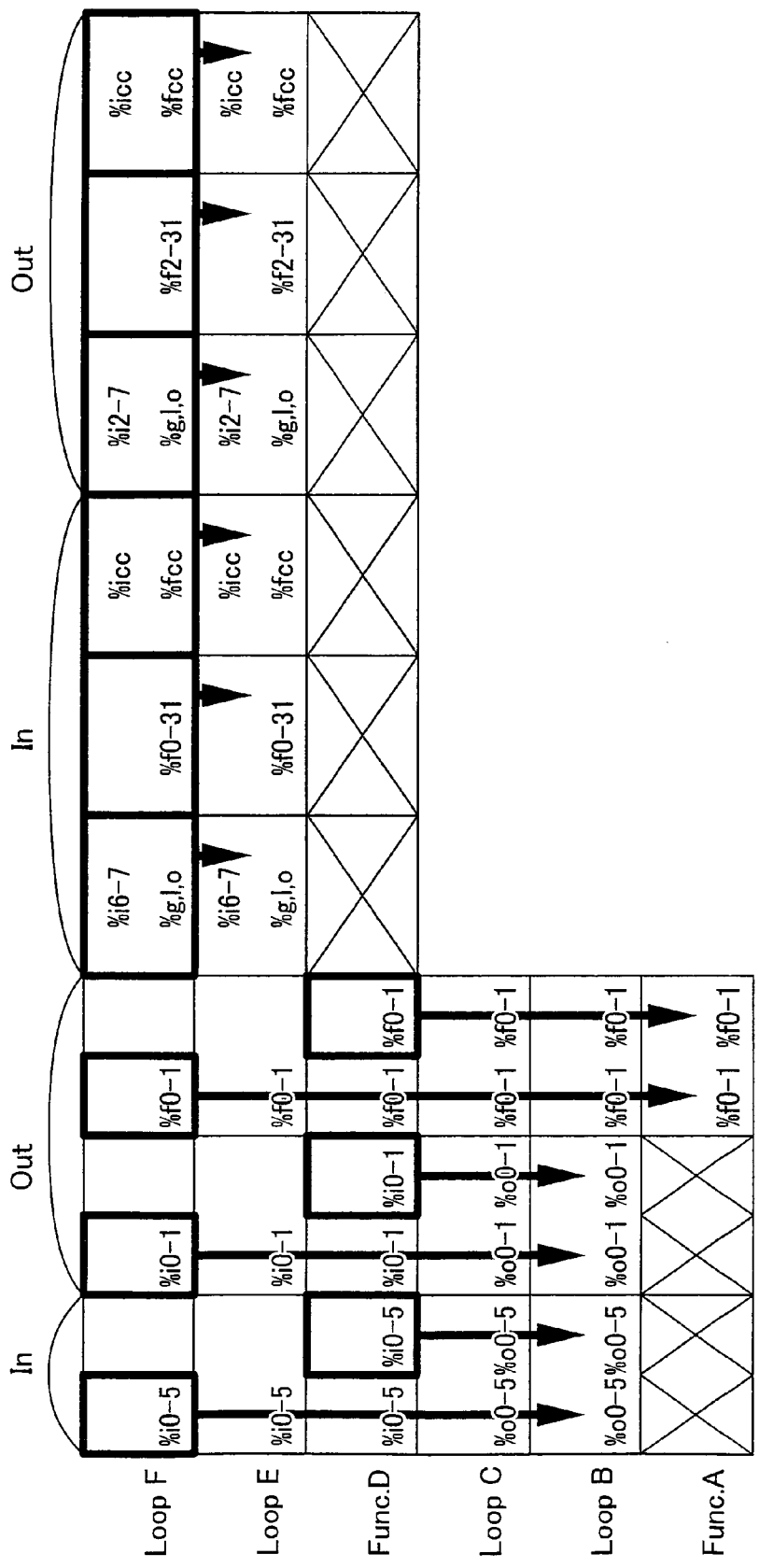
FIG. 7 illustrates a range where a register input/output of the internal structure acts as a register input/output of the external structure, in the nested structure.

FIG. 7 shows to what extent (indicated by arrows) register inputs/outputs (circumscribed by heavy lines) of the inner structure function as register inputs/outputs of the outer structure, in the nested structure of functions A and D and loops B, C, D, and F shown in FIG. 6. For example, the register % i0-5 which is referred to as an input in the loop F is inputs to the loop E and the function D, and also is inputs to the loops C and B calling the function D (in this case, the register is regarded as % o0-5). In the meanwhile, since the register % o0-5 functions as a local parameter of the function A, the register % i0-5 (% o0-5) does not function as a register input to the function A. In other words, the influence of the register % i0-5 (% o0-5) does not function as a register input to the function A, i.e. does not go beyond the loop B. To put it differently, in a case where the register % i0-5 is referred to in the function D, the register % o0-5 must be registered as an input value of the loop B, even if the loop B does not directly refer to the register % o0-5. The register % i0-5 which is referred to as an input in the loop F is also inputs to the loop E and function D, and also inputs to the loops C and B calling the function D (in this case, the register is regarded as % o0-5). In the meanwhile, since the register % o0-5 acts as a local parameter of the function A, the register % i0-5 (% o0-5) does not function as a register input to the function A. That is, the influence of the register % i0-5 (% o0-5) does not go beyond the loop B. To put it differently, in a case where the register % i0-5 is referred to in the function D, it is required to register the % o0-5 as an input value of the loop B, even if the loop B does not directly refers to the % o0-5. The same is applied to % i0-1 outputted in the loop F.

Since a floating-point register is not included in a register window, the outputted % f0-1 is an output of all levels including the function A. In the meanwhile, influences of other register inputs/outputs do not go beyond functions. That is, the influences of register inputs % i6-7, % g, 1, o, % f0-31, % icc, and % fcc and register outputs % l2-7, % g, l, o, % f2-31, % icc, and % fcc do not go beyond the loop E. As to inputs/outputs to/from the main memory, the aforesaid method to compare with % sp (SP) immediately before the function call is applied to all levels of the nested structure. On this account, the range of influence is specified.

Because the RW 4A, RW 4B, and instruction region storage section 2 are arranged as above, inputs and outputs of instruction regions can be individually stored. It is therefore possible to realize multiple reuse.

(Parallel Precomputation)

The multiple reuse of functions and loops described above cannot be carried out at all in a case where an interval between the appearances of the same parameters is long and where a parameter monotonously changes. That is, in a case where an interval between the appearances of the same parameters is longer than a survival time of an RB entry, a function or loop registered in the RB no longer exists in the RB entry when the same parameter regarding the registered function or loop reappears. Reuse is therefore not feasible. In a case where a parameter monotonously changes, the parameter is different even if the corresponding function or loop is registered in the RB, and hence reuse is not feasible.

To solve this problem, further acceleration is achieved by providing a plurality of SSPs 1B as processors that enable an RB entry by the precomputation of an instruction region.

The hardware structure for a parallel precomputation mechanism is shown in FIG. 2 as described above. As shown in the figure, the RWs 4A and 4B, computing units 5A and 5B, registers 6A and 6B, and caches 7A and 7B are individually provided for each processor. Meanwhile, the instruction region storage section 2 and the main memory 3 are shared by all processors. In the figure, dotted lines indicate paths through which the MSP 1A and SSP 1B register inputs and outputs in the instruction region storage section 2.

Problems in achieving parallel precomputation are (1) in what manner the consistency of the main memory is maintained and (2) how inputs are predicted. The following will describe solutions to solve these problems.

(Solution to Solve Problem Concerning Main Memory Consistency)

First, a solution to the problem (1), i.e. in what matter the consistency of the main memory is maintained, will be discussed. To solve the problem, as shown in FIG. 2, the SSP 1B uses the instruction region storage section 2 as a main memory reference to be registered in the RB. Also, the SSP 1B uses, as other local references, a Local 7B which is a local memory provided for each SSP 1B. It is therefore unnecessary to carry out writing into the Cache 7B and main memory 3. Incidentally, in a case where the MSP 1A carries out writing into the main memory 3, a cache line of the corresponding SSP 1B is invalidated.

More specifically, among targets to be registered in the instruction region storage section 2, the main memory 3 is referred to as to an address where readout is precedently performed, and the address and value are registered in the RB as in the case of the MSP 1A. Thereafter, not the main memory 3 but the instruction region storage section 2 is referred to, and this makes it possible to avoid the occurrence of contradiction due to overwriting by another processor. As to a local reference, readout is precedently performed and hence a variable is used without initialization. The value is therefore not necessarily specified, and hence it is unnecessary to refer to the main memory 3.

The capacity of the Local 7B as a local memory is finite. Therefore, in a case where execution cannot be continued because, for instance, the size of a function frame exceeds the capacity of the Local 7B, the precomputation is terminated. Since a result of precomputation is not written into the main memory 3, it is not possible to perform precomputation based on the result of the previous precomputation.

(Method of Predicting Input)

Now, the aforesaid problem (2), how inputs are predicted, will be discussed. To perform precomputation, it is necessary to predict a future input, based on the history of use of the instruction region storage section 2, and sends the prediction result to the SSP 1B. On this account, a small processor is provided for each input pattern stored in the instruction region storage section 2, and an input prediction value is worked out independently of the MSP 1A and SSP 1B.

More specifically, based on a difference (D) between the most recent argument (B) and two recent arguments, stride prediction is carried out. Note that it is assumed that the execution of an instruction region based on B+D has already started by the MSP 1A. In a case where N SSPs 1B are provided, a prepared input prediction value falls in the range between B+D×2 and B+D×(N+1).

Performing the input prediction as above makes it possible to effectively perform the reuse based on a presupposed result, in a case where the input parameter monotonously changes.

Embodiment 2

The following will describe another embodiment of the present invention in reference to figures.

(Data Processing Device)

Figure 25:
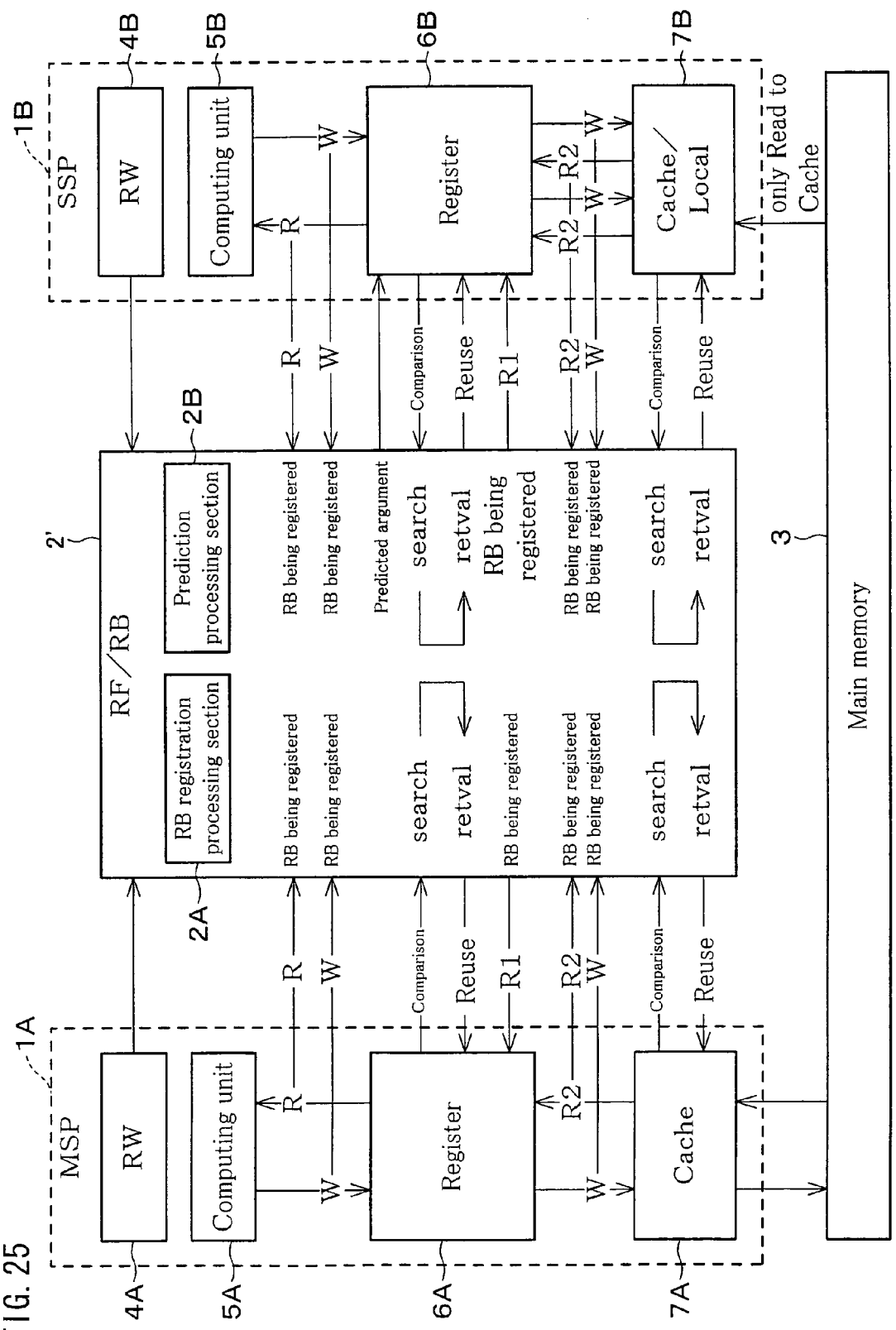
FIG. 25 is a block diagram that outlines the data processing device.

FIG. 25 outlines a data processing device of the present embodiment. As shown in the figure, the data processing device includes: a MSP 1A; a SSP 1B, an RF/RB (instruction sequence storage means) 2' as a reuse table; and a main memory (main storage means). Various arithmetic processes are carried out by reading out program data or the like stored in the main memory 3, and a computation result is written into the main memory 3. In the figure, there is one SSP 1B. However, more than one SSP 1B may be provided.

The RF/RB 2' is memory means for storing data for reusing a function and loop in a program. The RF/RB 2' is provided with an RB registration processing section (registration processing means) 2A and a prediction processing section (prediction processing means) 2B. Details of the RF/RB 2' and details of the RB registration processing section 2A and prediction processing section 2B will be described later.

The main memory 3 is a memory used as a working space for the MSP 1A and SSP 1B, and includes, for example, a RAM. For example, a program, data, or the like is read out from external storage means such as a hard disc to the main memory 3, and the MSP 1A and SSP 1B performs computation using data read out to the main memory 3.

The MSP 1A includes: an RW (reuse storage means) 4A; a computing unit (first computing means) 5A; a register 6A; and a Cache 7A. Similarly, the SSP 1B includes: an RW (reuse storage means) 4B; a computing unit (second computing means) 5B; a register 6B; and a Cache/Local 7B.

The RWs 4A and 4B are reuse windows that store, as a ring-structured stack, each entry having been executed and registered in the RF and RB (described later). In terms of an actual hardware structure, the RWs 4A and 4B are made up of control lines each activating a particular entry in the RF/RB 2'.

The computing units 5A and 5B perform an arithmetic process based on data stored in the registers 6A and 6B. Each of the computing units 5A and 5B is termed ALU. The registers 6A and 6B are storage means for storing data for calculation by the computing units 5A and 5B. In the present embodiment, the computing units 5A and 5B and registers 6A and 6B are compliant with the SPARC architecture. The Caches 7A and 7B function as cache memories between the MSP 1A and the SSP 1B. In the SSP 1B, the Cache 7B includes a Local 7B as a local memory.

(RF/RB)

Figure 24:
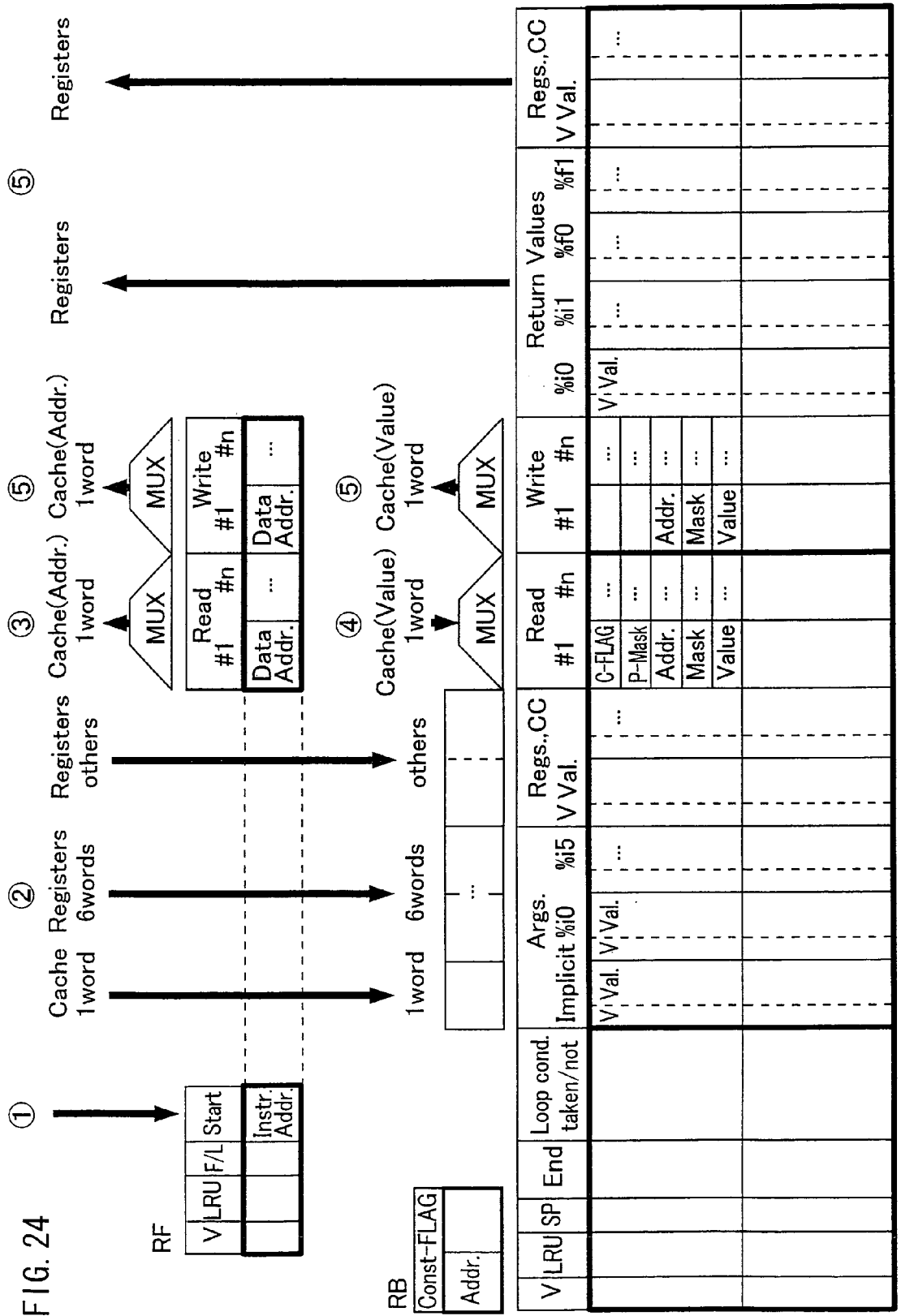
FIG. 24 shows a reuse table achieved by an RF/RB of a data processing device of another embodiment of the present invention.

FIG. 24 shows a reuse table realized by the RF/RB2' of the present embodiment. As the figure shows, the RF stores a plurality of entries. For each entry, the RF stores: V indicating whether the entry is valid or not; LBU indicating a hint for replacing the entry; Start indicating the leading address of a function; Read/Write indicating a main memory address to be referred to; and F/L for distinguishing a function from a loop.

In accordance with the entries stored in the RF, the RB also stores a plurality of entries. For each entry, the RB stores: V indicating whether the entry is valid or not; LRU indicating a hint for replacing the entry; SP indicating an immediately preceding stack point % sp at the time of calling a function or a loop; an argument (Args.) (V: valid entry, Val.: value); a main memory value (C-FLAG: a flag for changing a Read address, P-Mask: a history mask of a Read address, Mask: a valid byte of a Read/Write address, Value: value); a return value (Return Values) (V: valid entry, Val.: value); an ending address (End) of a loop; taken/not indicating the direction of a branch at the end of a loop; and a condition code and registers other than an argument and a return value (CC, Regs.). The RB has a memory area for storing a constant flag (Const-FLAG) which corresponds to one or more register address. Details of the constant flag (Const-FLAG) will be given later.

The following describes the aforesaid items of the RF and RB in detail. V indicates whether the entry is valid or not as described above. More specifically, V is "0" if the entry is not registered, "2" if the entry is being registered, and "1" if the entry has already been registered. For example, to secure the RF or RB, a non-registered entry (V=0) is preferentially used if available. If no non-registered entry is available, an entry having already been registered (V=1), which has the smallest LRU, is selected and overwriting is carried out. Overwriting to an entry being registered (V=2) cannot be carried out, because the entry is in use.

LRU indicates the number of "1" in a shift register which is shifted to the right at predetermined intervals. In the RF, "1" is written into the extreme left of the shift register, when registration for reuse is carried out to the entry or reuse is attempted. On this account, LRU is large if the entry is frequently used. On the other hand, LRU is 0 if the entry is not used for a predetermined period of time. In the RB, meanwhile, "1," is written if the entry is reused. Therefore, LRU is large if the entry is frequently used, while LRU is 0 if the entry is not used for a predetermined period of time.

Mask of the main memory value in the RB is discussed. In general, proper management is achieved by managing addresses and data bit by bit. In practice, however, cache reference is speedily carried out by managing data in units of 4 bytes. The RF therefore stores a main memory address in multiples of 4. In a case where the management is carried out in multiples of 4, it is necessary to show which byte among 4 bytes is valid, in order to allow only one byte to be loaded. That is, Mask is 4-bit data indicating which byte is valid among 4 bytes. For example, if a value is E8 as a result of loading one byte from an address C001, an address C000 is registered in the RF, "0100" is registered in Mask of the RB, and "00E80000" is registered in Value of the RB. Details of a changing flag (C-FLAG) and history mask (P-Mask) of a Read address will be given later.

The following will describe the aforesaid condition code and registers other than an argument and a return value (CC, Regs.). In the present embodiment, general registers % g0-7, % o0-7, % l0-7, and % i0-7, a floating-point register % f0-31, a condition code register ICC, and a floating-point condition code register FCC are used among SPARC architecture registers (details will be described later). Among these registers, an input of a leaf function is the general register % o0-5, an output thereof is the general register % o0-1, an input of a non-leaf function is the general register % i0-5, and an output thereof is the general register % i0-1. Inputs are registered in arg[0-5], while outputs are registered in rti[0-1]. According to the provisions of SPARC-ABI, registers other than the above do not act as inputs and outputs of a function. Therefore, items of arguments (Args.) in the RB suffice for a function.

According to the provisions of SPARC-ABI, it is not possible to specify the type of registers to be used, in regard of inputs and outputs of a loop. On this account, all types of registers must be registered in the RB, in order to specify inputs and outputs of a loop. Therefore, % g0-7, % o0-7, % l0-7, % i0-7, % f0-31, ICC, and FCC are registered in Regs. and CC of the RB.

As described above, in the RF/RB2', a Read address is centrally managed by the RF, while Mask and Value are managed by the RB. This makes it possible to compare the content of a Read address with a plurality of entries of the RB at once, by means of CAM.

(Outline of Reuse)

Now, reuse of a function and reuse of a loop will be outlined.

First, reuse of a function is discussed. In a case where there is no disturbance such as (i) the next function is called before returning from the current function, (ii) inputs and outputs to be registered exceed the capacity of the reuse table, (iii) the seventh word of an argument is detected, and (iv) system call or interruption occurs in midstream, an input/output table entry being registered is validated at the time of execution of the return instruction.

The process subsequent to the above is described in reference to FIG. 24. Prior to the call of a function, (1) search is carried out so as to check whether or not the leading address of a function in an entry registered in the RF is matched with the leading address of the function to be called. If there are matched addresses, (2) an entry, whose arguments registered in the RB and related to the function are completely matched with the arguments of the function to be called, is selected. Then, (3) all of Read addresses whose related main memory address, i.e. at least one Mask is valid are referred to in the RF, so that (4) equal comparison with the content registered in the RB is carried out. If all inputs are matched, (5) outputs (return value, global variable, and local variable of A) having already registered in the RB are written into the main memory 3. With this, the execution of the function is omitted, i.e. the reuse of the function is realized.

Now, reuse of a loop is discussed. If registration of inputs and outputs of a loop is not interrupted on account of, for example, return from a function is carried out before the completion of the loop or the disturbance occurs, an input/output table entry being registered is validated at the time of detecting a backward branch corresponding to the loop being registered. Then the registration of the loop is completed.

If the backward branch is taken, it is determined whether or not the next loop is reusable. That is, in reference to FIG. 24, prior to the backward branch, (1) search is carried out so as to check whether or not the leading address of a loop of an entry registered in the RF is matched with the leading address of the reused loop. If matched, (2) an entry, in which a register input value of the reused loop registered in the RB is completely matched with a register input value of the called loop, is selected. Then, (3) all of related main memory addresses are referred to in the RF, and (4) equal comparison with the content registered in the RB is carried out. If all inputs are matched, (5) outputs (register and main memory output values) having already been registered in the RB are written into the main memory 3. With this, the execution of the loop is omitted, i.e. reuse of the loop is realized.

If the reuse is carried out, the process similar to the above is repeated for the next loop, based on the branch direction registered in the RB. In the meanwhile, if the next loop cannot be reused, the next loop is executed in a usual manner, and registration to the RF and RB starts.

(Flow of Process on Execution of Instruction Region)

Now, the following describes the flow of a process in a case where an instruction is decoded, in a specific manner. The following describes the flows of a process in a case where a decoded instruction is (i) a function calling instruction, (ii) a function return instruction, (iii) backward branch taken, (iv) backward branch not taken, and (v) other instructions.

(Case of Function Calling Instruction)

Figure 26:
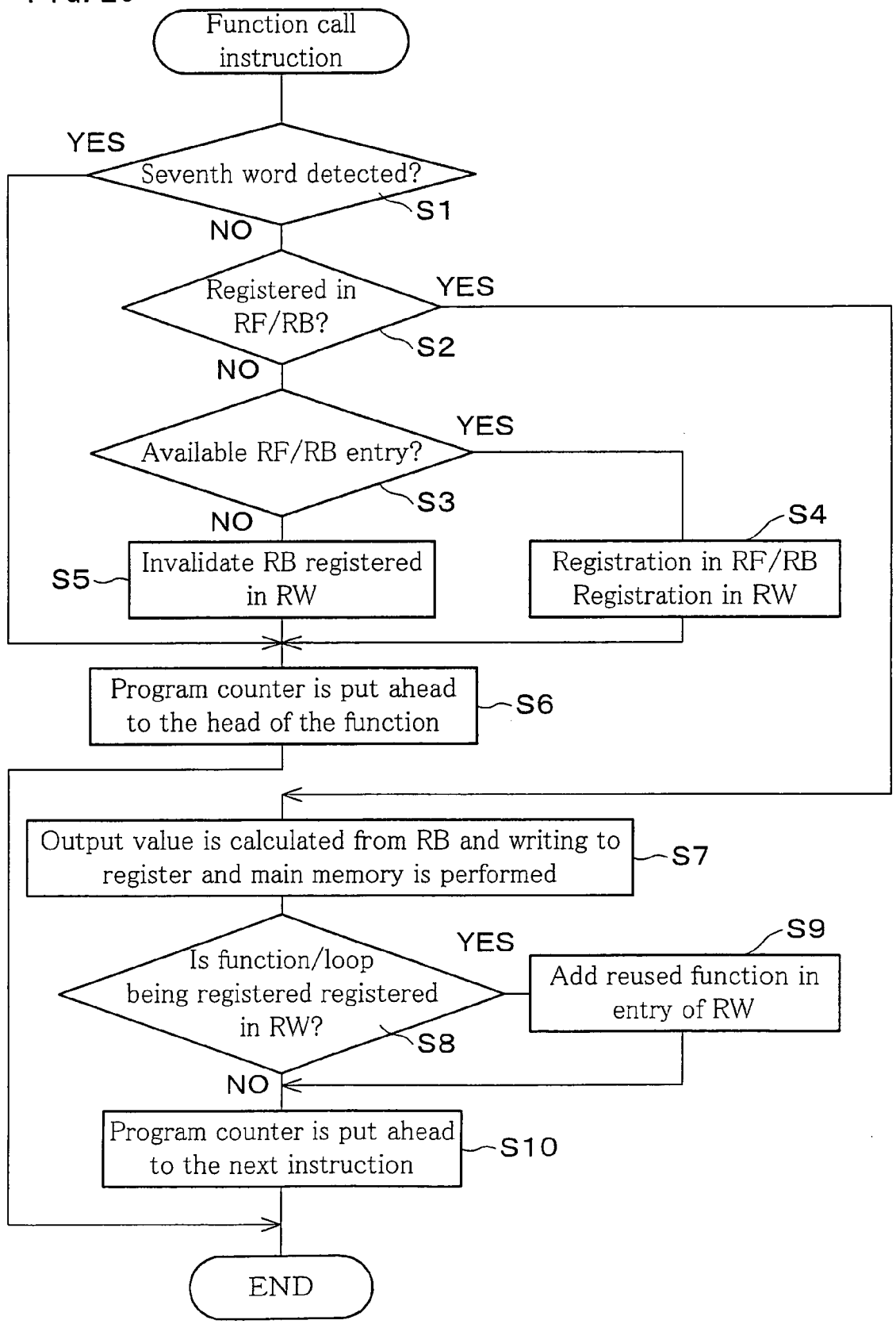
FIG. 26 is a flowchart of a process in a case where an instruction is found, as a result of decoding, to be a function call instruction.

A process in a case where a decoded instruction is a function calling instruction is described below in reference to the flowchart shown in FIG. 26. In Step 1 (hereinafter, Step will be referred to S, e.g. S1), it is determined whether or not the seventh word of an argument is detected. If Yes in S1, i.e. if it is determined that the seventh word of the argument is detected, all in-registration RB entries registered in the RW are invalidated, and the process goes to S6, so that the program counter is put ahead to the head of the function and the process is terminated.

If No in S1, i.e. if it is determined that the seventh word of the argument is not detected, search is carried out so as to check the function calling and input value are registered in the RF and RB (S2). If Yes in S2, i.e. if it is determined that the function calling and input value are registered in the RF and RB, the process goes to the below-described S7.

If No in S2, i.e. if it is determined that the function calling and input value are not registered in the RF and RB, it is attempted to secure an RF entry and RB entry for the function, so that the following (1)-(3) are determined: (1) if there is an existing RF entry; (2) if there is an available RF entry except the RF entry which cannot be expelled because the entry is being registered; and (3) if there is an available RB entry except the RB entry which cannot be expelled because the entry is being registered (S3).

If No in S3, i.e. if it is determined that there is no available RF/RB entry, registration does not start and the RB registered in the RW is totally invalidated (S5), so that the RW is made empty. In the meanwhile, If Yes in S3, i.e. if it is determined that there is an available RF/RB entry, the RF entry and RB entry are secured for the function, and registered in the RW (S4). If registered RW entries exceed the capacity of the RW, the oldest RW entry is deleted and the corresponding RB is invalidated. After S3 or S4, the program counter is put ahead to the head of the function (S6), and the process is terminated.

In the meantime, if Yes in S2, i.e. if it is determined that the function calling and input value are registered in the RF and RB, the function is reusable. That is, an output value is read out from the RB and this output value is written into the register and the main memory 3 (S7). Then it is determined whether the function/loop being registered is registered in the RW or not (S8). If registered, required ones among RB entries of the reused function are added to the entries registered in the RW (S9). The registration is carried out from the TOP of the RW. If the RB overflows in the midstream, the RB up to the BOTTOM of the RW is invalidated, and deleted from the RW. Thereafter, the program counter is put ahead to the next instruction (S10), and the process is terminated.

(Case of Function Return Instruction)

Figure 27:
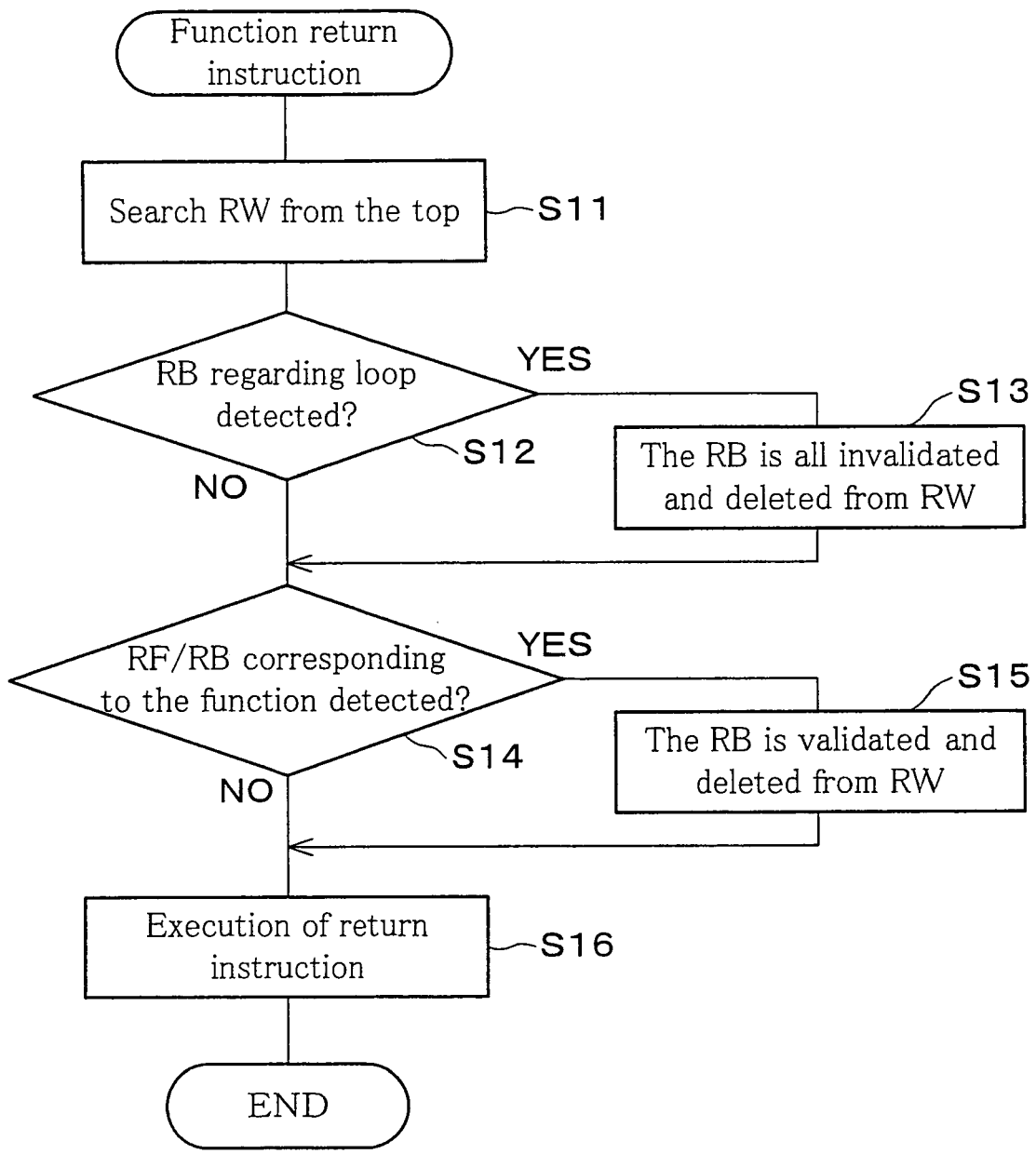
FIG. 27 is a flowchart of a process in a case where an instruction is found, as a result of decoding, to be a function return instruction.

The following will describe a case where a decoded instruction is a function return instruction, in reference to the flowchart shown in FIG. 27. In S11, the RW is searched from the TOP, and it is determined whether or not an RB related to a loop is detected, until an RF/RB corresponding to the function is detected (S12). If the RB related to the loop is detected (Yes in S12), that RB is all invalidated and deleted from the RW (S13).

In the meanwhile, it is determined whether or not an RF/RB corresponding to the function is detected, during the search in the RW (S14). If the RF/RB corresponding to the function is detected (Yes in S14), the RB entry is validated and deleted from the RW (S15).

Thereafter, a return instruction is executed (S16) and the process is terminated.

(Case of Backward Branch Taken)

Figure 28:
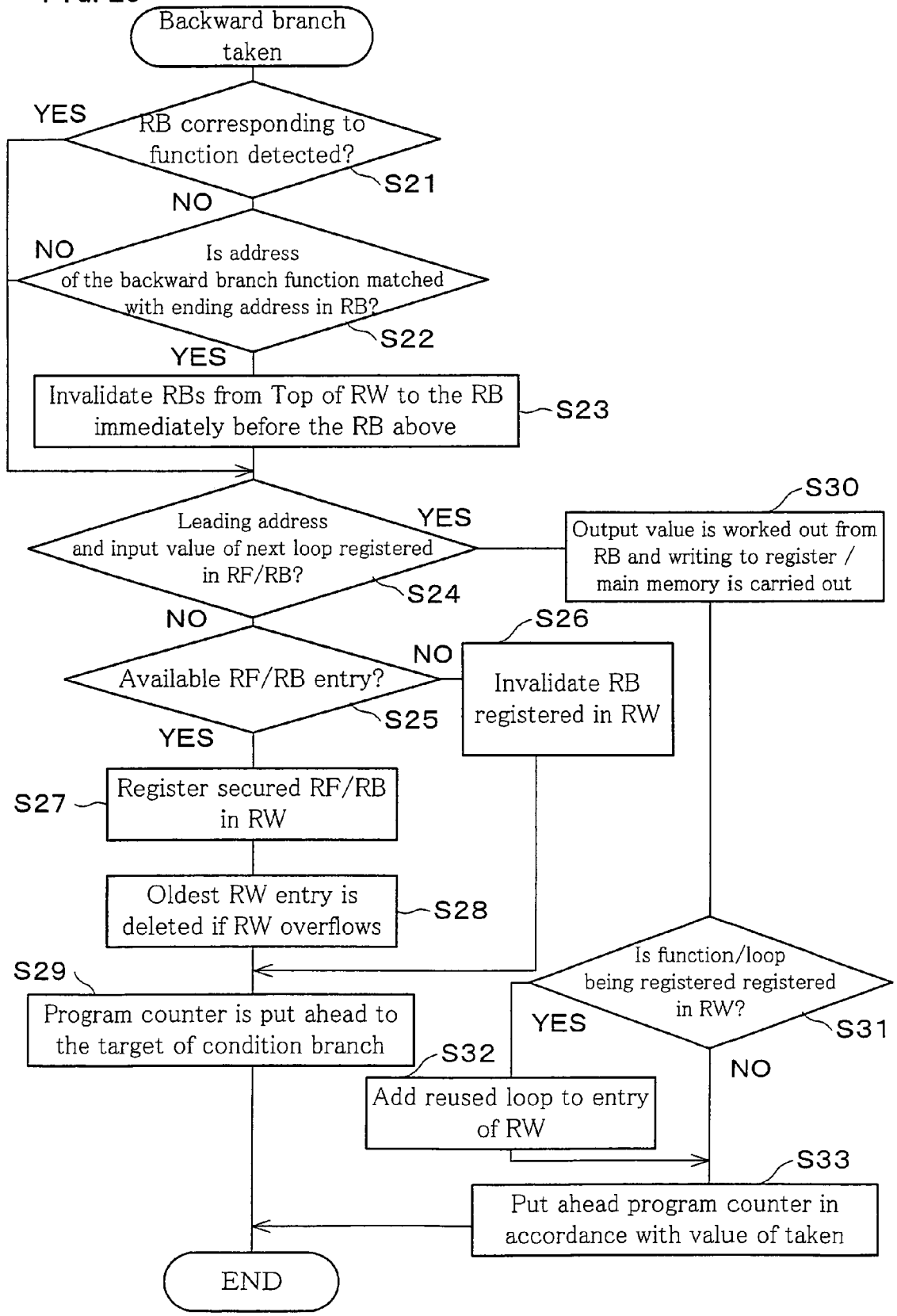
FIG. 28 is a flowchart of a process in a case where an instruction is found, as a result of decoding, to be a backward branch taken.

The following will describe a case where a decoded instruction is a backward branch taken, in reference to the flowchart shown in FIG. 28. First, the RW is searched from the TOP, and it is determined whether or not an RB corresponding to the function is detected (S21). If Yes in S21, i.e. if the RB corresponding to the function is detected, the process goes to S24 which will be described later.

In the meanwhile, if No in S21, i.e. if the RB corresponding to the function is not detected, it is then determined whether or not the address of the backward branch instruction is matched with a loop end address in the RB (S22). If No in S22, i.e. if the address of the backward branch instruction is not matched with the loop end address in the RB, the process goes to the below-mentioned S24.

If Yes in S22, i.e. if the address of the backward branch instruction is matched with the loop end address in the RB, all RBs from the TOP of the RW to the RB immediately before the RB above are invalidated (S23) and deleted from the RW. Also, the RB entry is validated and taken=1 is set, and the RB entry is deleted from the RW.

In S24, it is determined where or not the leading address and input value of the next loop are registered in the RF and RB. If Yes in S24, i.e. if the leading address and input value of the next loop are registered in the RF and RB, the process goes to S30 which will be described later.

In the meanwhile, if No in S24, i.e. if the leading address and input value of the next loop are not registered in the RF and RB, it is attempted to secure an RF entry and RB entry for the next loop, and the following points (1)-(3) are determined (S25): (1) if there is an existing RF entry; (2) if there is an available RF entry except the RF entry which cannot be expelled because the entry is being registered; and (3) if there is an available RB entry except the RB entry which cannot be expelled because the entry is being registered.

If No in S25, i.e. if there are no available RF and RB entries, the registration does not start, and all RBs registered in the RW are invalidated (S26), i.e. RW is made empty. Thereafter, in S29, the program counter is put ahead to the conditional branch target, and the process is terminated.

In the meanwhile, if Yes in S25, i.e. if there are available RF and RB entries, the available RF and RB entries are secured, and registered in the RW (S27). Also, a loop end address (the address of the backward branch instruction) is registered in the RB. If the RW overflows because of the registration to the RW, the oldest RW entry is deleted (S28), and the corresponding RB is invalidated. Thereafter, in S29, the program counter is put ahead to the conditional branch target, and the process is terminated.

On the other hand, If Yes in S24, the next loop is reusable. Therefore an output value is read out from the RB and written into the register and main memory 3 (S30). Here, it is determined whether or not a function/loop being registered is registered in the RW (S31). If registered, required ones among RB entries of the reused loop are added to the entries registered in the RW (S32). The registration is serially carried out from the TOP of the RW. If the RB overflows in the midstream, the RBs up to the BOTTOM of the RW are invalidated and deleted from the RW.

Thereafter, the program counter is moved not to the head of the next loop but, in accordance with the value of the taken in the RB, to the backward branch instruction if taken=1, or to the loop end address stored in the RB if taken=0. Then the process is terminated.

(Case of Backward Branch not Taken)

Figure 29:
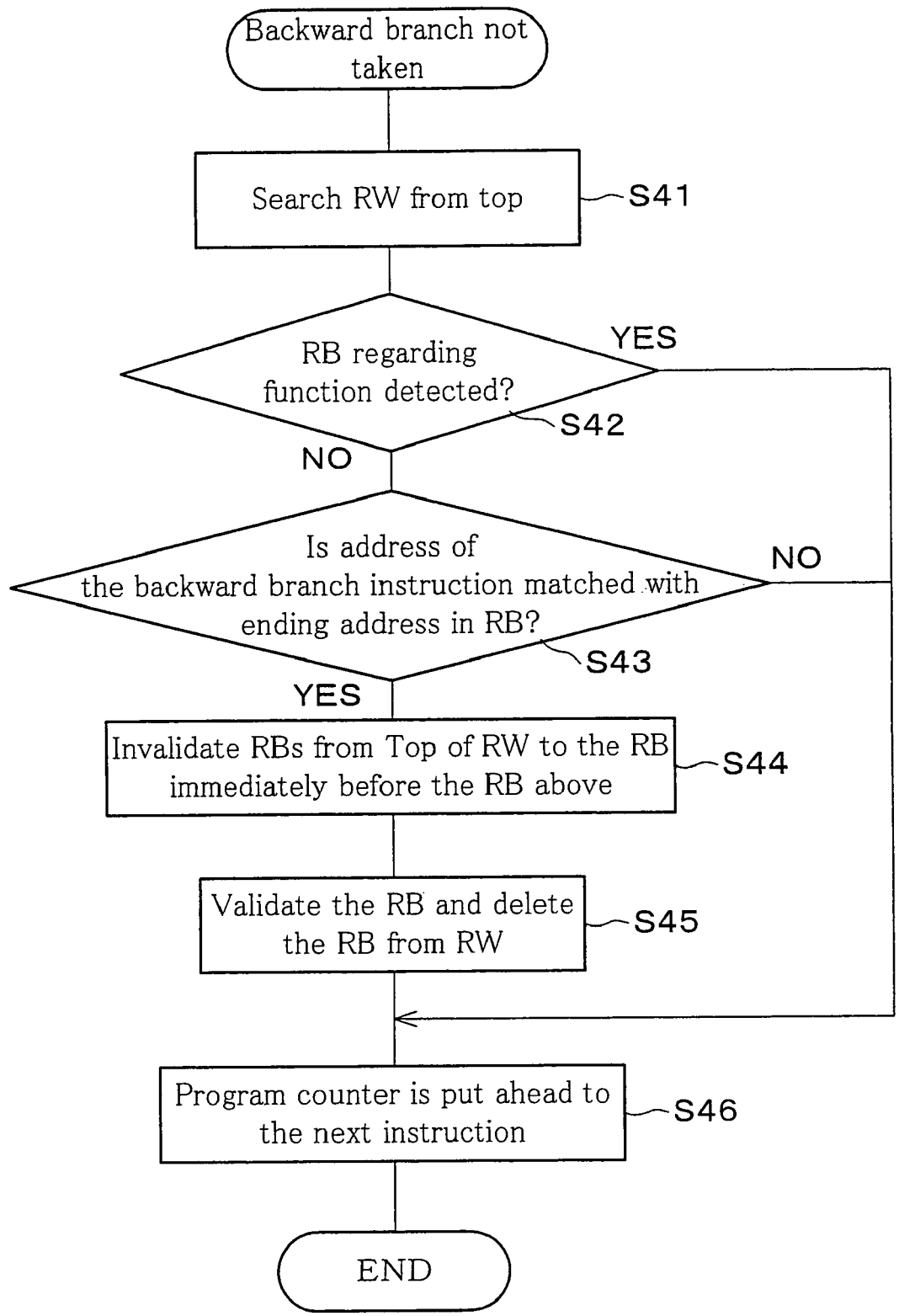
FIG. 29 is a flowchart of a process in a case where an instruction is found, as a result of decoding, to be a backward branch untaken.

The following will describe a case where a decoded instruction is a backward branch not taken, in reference to FIG. 29. First, the RW is serially searched from the TOP (S41), and it is determined whether or not an RB corresponding to the function is detected (S42). If Yes in S42, i.e. if it is determined that the RB corresponding to the function is detected, the program counter is put ahead to the next instruction in S46, and the process is terminated.

If No in S42, i.e. if it is determined that the RB corresponding to the function is not detected, it is determined whether the address of the backward branch instruction is matched with a loop end address in the RB (S43). If No in S43, i.e. if it is determined that the RF/RB corresponding to the backward branch instruction is not detected, the program counter is put ahead to the next instruction in S46, and the process is terminated.

In the meanwhile, if Yes in S43, i.e. if it is determined that the RF/RB corresponding to the backward branch instruction is detected, the RBs from the TOP of the RW to the RB immediately preceding the aforesaid RB are all invalidated (S44), and are deleted from the RW. Also, the RB entry is validated and taken=0 is set, and the RB entry is deleted from the RW (S45). Thereafter, the program counter is put ahead to the next instruction, and the process is terminated.

(Case of Other Instructions)

Now, the following will describe a case where a decoded instruction is an instruction different from any one of the above. If the decoded instruction is an instruction different from the above, a register R/W and a main memory R/W are carried out. If the RW is not empty, the register R/W and the main memory R/W registered in the RW are registered in the RB as follows. The following describes 10 cases: (1) a general register READ; (2) a general register WRITE; (3) a floating-point register READ; (4) a floating-point register WRITE; (5) a condition code register ICC-READ; (6) condition code register ICC-WRITE; (7) a floating-point condition code register FCC-READ; (8) a floating-point condition code register FCC-WRITE; (9) a main memory READ; and (10) a main memory WRITE.

(1) General Register READ

First, the RW is searched from the TOP to the BOTTOM. Thereafter, (1-1) in a case where the RB is a leaf function and % o0-6 or the RB is a non-leaf function and % i0-6, arg[0-5].V=0 is changed to arg[0-5].V=1 if applicable, and readout data is stored in arg[0-5].Val. Subsequently, the RW is further searched. If the RB is a function, the process is terminated. On the other hand, if the RB is not a function (i.e. is a loop), arg[0-5].V=0 is changed to arg[0-5].V=1 if applicable, and readout data is stored in arg[0-5].Val. The process is then terminated.

On the other hand, (1-2) in a case where the RB is loop, (a) if % g0-7 is grr[0-7].V=0, grr[0-7].V=0 is changed to grr[0-7]V=1, readout data is stored in grr[0-7].Val., and the process is terminated. (b) If % o0-7 is arg[0-7].V=0, arg[0-7].V=0 is changed to arg[0-7].V=1, readout data is stored in arg[0-7].Val, and the process is terminated. (c) If % l0-7 is lrr[0-7].V=0, lrr[0-7].V=0 is changed to lrr[0-7].Val, readout data is stored in lrr[0-7].Val, and the process is terminated. (d) If % i0-7 is irr[0-7].V=0, irr[0-7].V=0 is changed to irr[0-7].V=1, readout data is stored in irr[0-7].Val, and the process goes to the next RW entry.

(2) General Register WRITE

First, the RW is serially searched from the TOP to the BOTTOM. (2-1) If the RB is a leaf function and % o0-5 or if the RB is a non-lead function and % i0-5, arg[0-5].V=0 is changed to arg[0-5]V=2 if applicable, in order to indicate that the following readouts cannot function as inputs. Moreover, as to % o0-1/% i0-1, change to rti[0-1].V=1 is carried out and writing data is stored in rti[0-1].Val. Thereafter, the RW is further searched. If the RB is a function, the process is terminated. Meanwhile, if the RB is not a function (i.e. is a loop), arg[0-1].V=0 is changed to arg[0-1].V=2 if applicable, in order to indicate that subsequent readouts are not inputs. Also, change to rti[0-1].V=1 is carried out and writing data is stored in rti[0-1].Val. The process is then terminated.

On the other hand, (2-2) in a case where the RB is a loop, (a) if % g0-7 is grr[0-7].V=0, grr[0-7].V=0 is changed to grr[0-7].V=2, writing data is stored in grr[0-7].Val, and the process is terminated. (b) If % o0-7 is arg[0-7].V=0, arg[0-7].V=0 is changed to arg[0-7].V=2, writing data is stored in arg[0-7].Val, and the process is terminated. (c) If % l0-7 is lrr[0-7].V=0. lrr[0-7].V=0 is changed to lrr[0-7].V=2, writing data is stored in lrr[0-7].Val, and the process is terminated. (d) If % i0-7 is irr[0-7].V=0, lrr[0-7].V=0 is changed to irr[0-7].V=2, writing data is stored in irr[0-7].Val, and the process goes to the next RW entry.

(3) Floating-Point Register READ

First, the RW is serially searched from the TOP to the BOTTOM. Then, (3-1) If the RB is a function, the process is terminated without performing anything. In the meanwhile, (3-2) if the RB is a loop, frr[0-31].V=0 is changed to frr[0-31.V=1 if applicable, readout data is stored in frr[0-31].Val, and the process is terminated.

(4) Floating-Point Register WRITE

First, the RW is serially searched from the TOP to the BOTTOM. Then, (4-1) if the RB is a function and % f0-1, change to rtf[0-1].V=1 is carried out, and writing data is stored in rtf[0-1].Val. The RW is further searched. If frr[0-1].V=0, frr[0-1].V=0 is changed to frr[0-1].V=2 in order to indicate that subsequent readouts are not inputs. Also, change to rtf[0-1].V=1 is carried out, writing data is stored in rtf[0-1].Val, and the process is terminated.

On the other hand, (4-2) in a case where the RB is a loop, if frr[0-31].V=0, frr[0-31].V=0 is changed to frr[0-31].V=2, change to frw[0-31].V=1 is carried out, writing data is stored in frw[0-7].Val, and the process is terminated.

(5) Condition Code Register ICC-READ

First, RW is serially searched from the TOP to the BOTTOM. Then, (5-1) if the RB is a function, the process is terminated without doing anything. On the other hand, (5-2) in a case where the RB is a loop, if icr.V=0, change to icr.V=1 is carried out, readout data is stored in icr.Val, and the process is terminated.

(6) Condition Code Register ICC-WRITE

First, the RW is serially searched from the TOP to the BOTTOM. (6-1) If the RB is a function, the process is terminated without performing anything. On the other hand, (6-2) in a case where the RB is a loop, if icr.V=0, changes to icr.V=2 and icw.V=1 are carried out, writing data is stored in icw.Val, and the process is terminated.

(7) Case of Floating-Point Condition Code Register FCC-READ

First, the RW is serially searched from the TOP to the BOTTOM. (7-1) If the RB is a function, the process is terminated without performing anything. On the other hand, (7-2) in a case where the RB is a loop, if fcr.V=0, change to fcr.V=1 is carried out, readout data is stored in fcr.Val, and the process is terminated.

(8) Case of Condition Code Register ICC-WRITE

First, the RW is serially searched from the TOP to the BOTTOM. (8-1) If the RB is a function, the process is terminated without performing anything. On the other hand, (8-2) in a case where the RB is a loop, if fcr.V=0, changes to fcr.V=2 and fcr.V=1 are carried out, writing data is stored in fcw.Val, and the process is terminated.

(9) Main Memory READ

First, the RW is searched from the TOP to the BOTTOM. If registration to the RB as WRITE data has been carried out, that value is used. On the other hand, if registration to the RB as READ data has been carried out, that value is used. If not registered in neither of them, readout from the main memory 3 via the cache is carried out.

Subsequently, the RW is searched again from the TOP to the BOTTOM. (a) If the address registered in the RB is sp+64, it is indicated that a structure pointer is read out. Therefore, arg0.V=0 is changed to arg0.V=1 if applicable, and readout data is stored in arg0.Val. (b) Being different from (a), if the address is not lower than LIMIT and less than sp+92, nothing is carried out because the address is a registration unnecessary area. (c) If (b) does not hold true, whether or not registration as WRITE data has been done is checked. If registered, registration is not necessary because it is READ after the overwriting, and hence nothing is carried out. (d) If (c) does not hold true, whether or not registration as READ data has been done is checked. If registered, registration is unnecessary because registration has already done, and hence nothing is carried out. (e) If (d) does not hold true, registration as READ data is necessary. Therefore, a main memory READ address is secured in the RF, and registration as READ data is carried out. If a main memory address cannot be secured in the RF, registration is impossible. In this case, all RB entries corresponding to entries from that RW entry to the BOTTOM are invalidated.

(10) Case of Main Memory WRITE

First, writing into the main memory 3 via a cache is carried out. If the base register is 14(% sp) and the offset is not less than 92, the detection of the seventh word of the argument is stored.

Subsequently, the RW is searched from the TOP to the BOTTOM. (a) If the address is sp+64 registered in the RB, it is indicated that a structure pointer is read out. Therefore, arg0.V=0 is changed to arg0.V=2 if applicable. (b) If (a) does not hold true and the address is not less than LIMIT and less than sp+92, nothing is carried out because it is a registration unnecessary area. (c) If (b) does not hold true, whether or not registration as WRITE data has been done is checked. If registered, since the address has been registered, the content is updated to new WRITE data. (d) If (c) does not hold true, registration as WRITE data is necessary. On this account, a main memory WRITE address is secured in the RF, and registration as WRITE data is carried out. If a main memory address cannot be secured in the RF, registration cannot be carried out. On this account, all RB entries corresponding to entries from that RW entry to the BOTTOM are invalidated.

(Multiple Reuse Including Loop)

If the above-described reuse mechanism is performed in the first level, in the example shown in FIG. 46(*a*), a function B as a leaf function and a loop C in the function B are reusable. On the other hand, multiple reuse is feasible in a case where registration is carried out so that, once a function is executed, all instruction regions in the function, e.g. functions and loops in the function, are reusable. In the example above, once a function A is executed, all of nested instruction regions A, B, and C are reusable. The following will describe a function enhancement required for realizing multiple reuse.

Conceptual structures of functions A and D have already been illustrated in FIG. 6. In the nested functions A and D and loops B, C, E, and F shown in FIG. 6, to what extent (indicated by arrows) the register inputs/outputs (circumscribed by bold lines) of the inner structure function as the register inputs/outputs of the outer structure is shown in FIG. 7 as a above.

Figure 30:
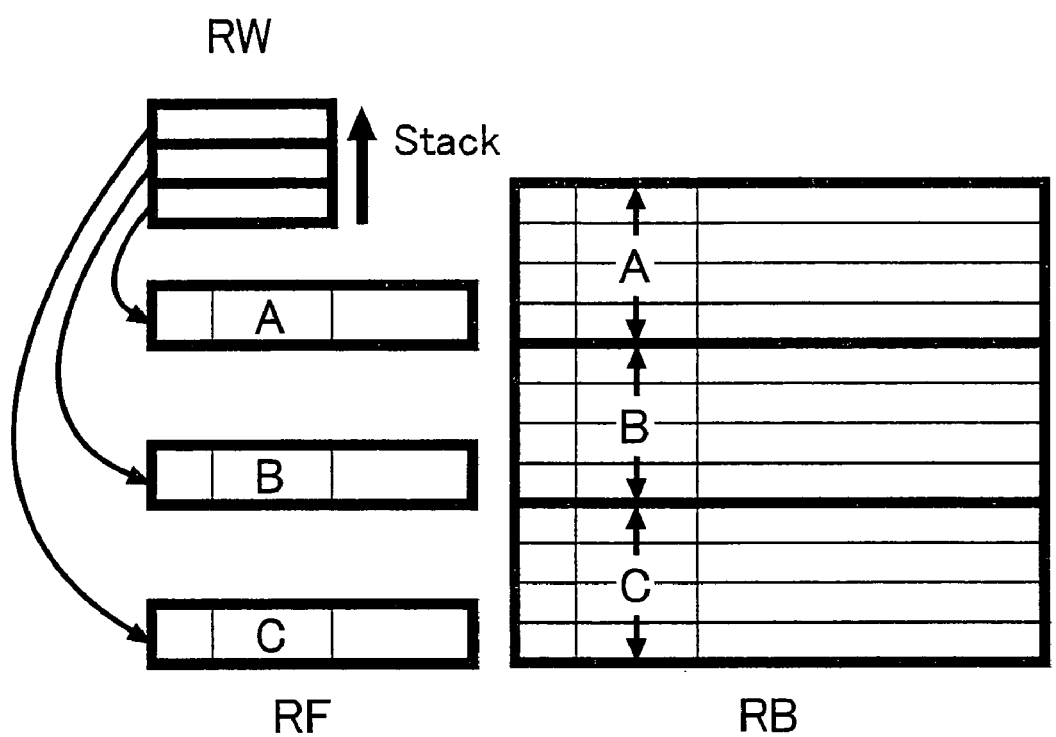
FIG. 30 shows the relationship between the RW and the RF and RB.

Because of the above, a mechanism to associate the RF and RB with the nested structure of functions and loops is required to realize multiple reuse. As shown in FIG. 30, a reuse window (RW) is provided so that each entry (A, B, and C in the figure) of the RF and RB being currently executed and registered are kept as a stack structure. While a function or a loop is executed, register and main memory references are registered based on the aforesaid method, as to all entries registered in the RW.

On this occasion, if it is determined that reuse is not feasible because of (1) excessive number of items which can be registered, (2) detection of the seventh word of the argument, or (3) detection of a system call, an RB corresponding to the entry and higher RBs are specified using the RW, and the registration is interrupted.

Although the depth of the RW is limited, dynamic changes in the nested structure are supported in the following manner: if a function or a loop is detected beyond the multiplicity allowable for registration at one time, registration is serially interrupted from the outmost instruction region, and an inner instruction region is added to the registration target. Also, when a reusable instruction region (e.g. D) is found during execution and registration (e.g. A), multiple reuse of A beyond the depth of the RW is achieved by adding registered input/output to the entry being currently registered.

(Parallel Precomputation)

As shown in Embodiment 1, further speedup is achieved by providing, in addition to the MSP 1A as a processor for multiple reuse, a plurality of SSPs 1B as processors that activate an RB entry by precomputation of an instruction region.

The hardware structure for parallel precomputation is shown in FIG. 25 as above. As shown in the figure, the RWs 4A and 4B, computing units 5A and 5B, registers 6A and 6B, and caches 7A and 7B are independently provided for each processor. Meanwhile, the RF/RB2' and the main memory 3 are shared by all processors. In the figure, dotted lines indicate paths through which inputs and outputs are registered from the MSP 1A and SSP 1B to the RF/RB2'.

Problems in realizing parallel precomputation are (1) in what manner the consistency of the main memory is maintained, and (2) in what manner an input is predicted. The following will describe solutions for these problems.

(Solution for Problem Regarding Consistency of Main Memory)

First, the following will discuss in what manner the consistency of the main memory is maintained. In a case where an instruction region is executed based on an input parameter which is specifically predicted, a value to be written into the main memory 3 is different between the MSP 1A and SSP 1B. To solve this problem, as show in FIG. 25, the SSP 1B uses RF/RB2' for main memory reference which is the target of registration to the RB, while, for other local references, the SSP 1B uses a Local 7B which is a local memory provided for each SSP 1B. On this account, writing into the Cache 7B and main memory 3 is unnecessary. Incidentally, when the MSP 1A performs writing into the main memory 3, a cache line of the corresponding SSP 1B is invalidated.

More specifically, among targets of registration to the RB, the main memory 3 is referred to as to an address where readout is precedently performed, and the address and value are registered in the RB as in the case of the MSP 1A. Hereinafter, not the main memory 3 but the RB is referred to, in order to prevent the occurrence of contradiction on account of overwriting from another processor. As to a local reference, readout is precedently performed and hence a variable is used without initialization. The value is therefore not necessarily specified, and hence it is unnecessary to refer to the main memory 3.

The capacity of the Local 7B as a local memory is limited. Therefore, in a case where execution cannot be continued because, for example, the length of a function frame exceeds the capacity of the Local 7B, precomputation is terminated. Also, since a result of precomputation is not written into the main memory 3, it is not possible to perform the next precomputation using the result of current precomputation.

(Precomputation Mechanism)

The following will describe the problem (2), i.e. in what manner an input is predicted. For precomputation, a future input must be predicted based on the history of use of the RB, and send the predicted input to the SSP 1B. To do so, the RF/RB2' is provided with a prediction processing section 2B. This prediction processing section 2B is composed of small processors corresponding to respective entries. The prediction processing section 2B works out an input prediction value, independently of the MSP 1A and SSP 1B.

As described above, conventional input prediction is not accurate, because all addresses registered in the input side of the RB are dealt with in a uniform manner. To solve this problem, it is necessary to (i) distinguish an address having a high degree of predictability from an address having a low degree of predictability, and (ii) target only a minimum-required address, in consideration of the change of a value.

An address having a high degree of predictability is fixed and its value monotonously changes. Examples of such an address include a global variable referred to by a label, and a local variable (in-frame variable) which is referred to with a stack pointer or frame pointer as the base register.

To distinguish between these types of addresses, a constant flag (Const-FLAG) is provided in a register which is referred to by an address calculation at the time of execution of a load instruction. It is assumed that a constant flag is unconditionally set in a register used as a stack pointer or a frame pointer. In other registers, a constant flag (Const-FLAG) is set at the time of execution of an instruction to set a constant.

Subsequently, among addresses having been referred to in the past, an address to which writing has not been carried out is assured that its content has not been changed. As to such an address, it is not necessary to carry out prediction. Therefore, to specify such an address, a change flag (C-FLAG) indicating that writing is carried out is provided. When an address as an input element is newly stored in the RF/RB, the change flag (C-FLAG) corresponding to the address is reset. After the registration, a change flag (C-FLAG) is set when a store instruction with respect to the address is executed.

Also, a history mask (P-mask) indicating whether or not an address as an input element is a target of storing history. When an address as an input element is newly registered in the RF/RB, a history mask (P-Mask, history flag) corresponding to the address is reset. In a case where, at the time of execution of a load instruction, a constant flag (Const-FLAG) corresponding to the register that generated the address is set, a byte position which is the target of loading in the history mask (P-Mask) is set.

The aforesaid management of setting of a constant flag (Const-FLAG), change flag (C-FLAG), and history mask (P-Mask) is carried out by an RB registration processing section 2A of the RF/RB2'. This RB registration processing section 2A is composed of a small processor, and sets a constant flag (Const-FLAG), change flag (C-FLAG), and history mask (P-Mask) by conducting the aforesaid determinations.

Example of Execution of Instruction Region

Figure 31:
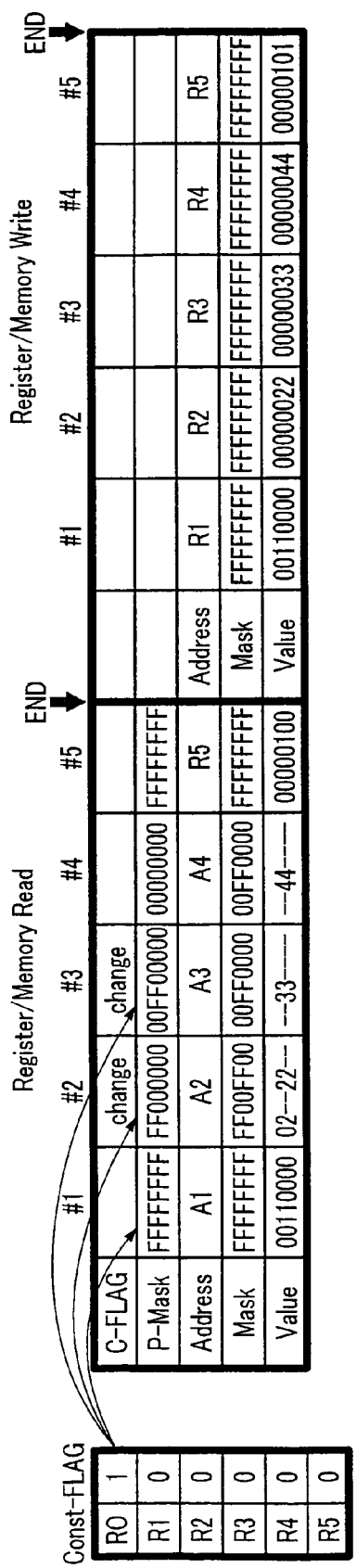
FIG. 31 shows how registration in the RB is actually carried out when an instruction region is executed.

The following will describe, as an example of an instruction region, a case where the instruction region shown in FIG. 49 is executed with the RF and RB shown in FIG. 24. In FIG. 49, PC indicates a PC value at the time of the start of the instruction region. In other words, the address of the head of the instruction region is 1000. FIG. 31 shows an actual condition of registration in the RB when the instruction region shown in FIG. 49 is executed.

By the first instruction, an address constant A1 is set at a register R0. Since this instruction sets a constant, a constant flag (Const-FLAG) corresponding to the register R0 is set.

By the second instruction, 4-byte data (00110000) loaded from the main memory 3 whose address is the content of the register R0 is stored in a register R1. In this case, an address A1, mask (FFFFFFFF), and data (00110000) are registered, as inputs, in the first row on the Input side of the RB. A register number R1, mask (FFFFFFFF), and data (00110000) are registered, as outputs, in the first row on the Output side of the RB.

Since the constant flag (Const-FLAG) corresponding to the register R0 used as the address is set, a history mask (P-Mask) corresponding to the address A1 is set. Because the target data is 4-byte data (00110000), (FFFFFFFF) is set at the history mask (P-Mask) corresponding to the address A1, accordingly. Since a constant is not set in the register R1, the constant flag (Const-FLAG) corresponding to the register R1 is reset.

By the third instruction, an address constant A2 is set in the register R0. Since this instruction sets the constant, a constant flag (Const-FLAG) corresponding to the register R0 is set.

By the fourth instruction, one-byte data (02) loaded from the main memory 3 whose address is the content of the register R0 is stored in the register R2. In this case, an address A2, mask (FF000000), and data (02) are registered, as inputs, in the second row on the Input side of the RB. On this occasion, "-" which indicates Don't Care is stored in the remaining 3 bytes of the address A2. A register number R2, mask (FFFFFFFF), and data (00000002) are registered, as outputs, in the second row on the Output side of the RB.

Since a constant flag (Const-FLAG) corresponding to the register R0 used as the address is set, a history mask (P-Mask) corresponding to the address A2 is set. Since the target data is one-byte data (02), (FF000000) is set at the history mask (P-Mask) corresponding to the address A2. Because a constant is not set in the register R2, the constant flag (Const-FLAG) corresponding to the register R2 is reset.

By the fifth instruction, one-byte data (22) loaded from an address (A2+R2) is stored in a register R2. Since the value of the address R2 is (02), an address (A2+02) and data (22) are additionally registered in the second column on the Input side of the RB. On this occasion, registration to a part corresponding to the address (A2+02) is carried out. Meanwhile, parts corresponding to the addresses (A2+01) and (A2+03) are kept storing "-" which indicates Don't Care. That is, a mask corresponding to the address A2 is (FF00FF00). A register number R2, mask (FFFFFFFF), and data (00000022) are, as outputs, overwritten into the second column on the Output side of the RB.

Since a constant flag (Const-FLAG) corresponding to the register R2 used as the address has been reset, a history mask (P-Mask) corresponding to the address (A2+02) is not set. That is, the history mask (P-Mask) corresponding to the address A2 is kept at (FF000000). Since a constant is not set in the register R2, a constant flag (Const-FLAG) corresponding to the register R2 is reset.

By the sixth instruction, an address constant A3 is set in a register R0. Since this instruction sets a constant, a constant flag (Const-FLAG) corresponding to the register R0 is set.

By the seventh instruction, one-byte data (33) loaded from the main memory 3 whose address is the content of the register R0 is stored in the register R3. In this case, an address A3, mask (00FF0000), and data (33) are registered, as inputs, in the third column on the Input side of the RB. A register number R3, mask (FFFFFFFF), and data (00000033) are, as outputs, registered in the third column on the Output side of the RB.

Since a constant flag (Const-FLAG) corresponding to the register R0 used as the address is set, a history mask (P-Mask) corresponding to the address A3 is set. Because target data is one-byte data (33), (00FF0000) is set in a history mask (P-Mask) corresponding to the address A3, accordingly. Since a constant is not set in the register R3, a constant flag (Const-FLAG) corresponding to the register R3 is reset.

By the eighth instruction, one-byte data (44) loaded from an address (R1+R2) is stored in a register R4. In this case, since addresses R1 and R2 are addresses of registers that are overwritten in the instruction region, the addresses R1 and R2 do not act as inputs of the instruction region. On the other hand, since an address A4 generated by the address (R1+R2) is an input of the instruction region, the address A4, mask (00FF0000), and data (44) are registered, as inputs, in the fourth column on the Input side of the RB. A register number R4, mask (FFFFFFFF), and data (00000044) are registered, as outputs, in the fourth column on the Output side of the RB.

Since a constant flag (Const-FLAG) corresponding to the registers R1 and R2 used as addresses has been reset, a history mask (P-Mask) corresponding to the address A4 is not set. That is, the history mask (P-Mask) corresponding to the address A4 is (00000000). Since a constant is not set in the register R4, a constant flag (Const-FLAG) corresponding to the register R4 is reset.

By the ninth instruction, a value is read out from a register R5, 1 is added to the value, and the result of the addition is stored in the register R5 again. In this case, the register R5, mask (FFFFFFFF), and data (00000100) are, as inputs, registered in the fifth column on the Input side of the RB. Also, a register number R5, mask (FFFFFFFF), and data (00000101) are registered, as outputs, in the fifth column on the Output side of the RB. On this occasion, a constant is not set in the register R5. Therefore a constant flag (Const-FLAG) corresponding to the register R5 is reset.

Thereafter, assume that a store instruction is executed with respect to addresses A2 and A3, and a change flag (C-FLAG) is set for the addresses A2 and A3.

Because of the above, mask locations where the change flag (C-FLAG) and history mask (P-Mask) are set are only the first byte of the address A2 and the second byte of the address A3. As prediction targets, addresses, masks, and values corresponding only to the mask location are stored in entries of the RB, as history information retaining the past input history for each instruction region. Registers registered in input patterns of the RB are unconditionally stored as prediction targets and histories.

FIG. 32 shows an example of registration in the RB as a history, in a case where the instruction region shown in FIG. 49 is repeatedly executed. As shown in the figure, RB stores: (FF000000) as a history mask (P-Mask) in the column of an address A2; (00FF0000) as a history mask (P-Mask) in the column of an address A3; and (FFFFFFFF) as a history mask (P-Mask) in the column of an address R5. As Time changes from 1 to 4, values corresponding to the history masks (P-Masks) of the respective addresses change. Indicated by diff between the histories is a variation (difference) of a value of a corresponding input element. This diff is worked out by the prediction processing section 2B.

In the example shown in FIG. 32, as to the columns of the addresses A2 and R5, diff are all 01 while Time changes from 1 to 4. Therefore, it is predicted that the values corresponding to these addresses increase by 1 per unit of time. On the other hand, as to the column of the address A3, diff are 00 or 02 while Time changes from 1 to 4. On this account, it is found that the address A3 is difficult to predict.

Because of the above, according to the history, the prediction processing section 2B carries out a prediction of an address with constant differences, with the assumption that the differences will also be constant thereafter. On the other hand, the prediction processing section 2B does not perform prediction as to an address whose differences are inconsistent or 0.

FIG. 33 shows a condition of input elements stored as prediction entries in the RB, in a case where the prediction processing section 2B performs a prediction of values of addresses A2 and R5. In the figure, a prediction value is not worked out as to addresses (A2+4) and A3, and these addresses are obtained by directly referring to the main memory 3.

When the prediction values of the input elements are worked out as above, the SSP 1B executes an instruction region based on these predicted input elements, so that output elements are worked out. The predicted output elements are stored as predicted entries in the RB. Thereafter, in a case where the MSP 1A executes the instruction region and an input value identical with a predicted input element stored in the RB as a predicted entry is inputted, a corresponding predicted output element is outputted. In this manner, reuse is realized.

Second Example of RF/RB

Now, a second example of the RF/RB2' is described. The RF/RB2' of the second example is identical with the instruction region storage section 2 shown in FIG. 1 in Embodiment 1. That is, the RF/RB2' of the second example includes an RB, RF, RO1 (second output pattern storage means), and RO2 (first output pattern storage means). The members and operations are identical with the above, and hence the descriptions thereof are omitted.

Prediction Mechanism in Second Example

In the second example, input/output patterns at the time of execution of an instruction region are stored in the RWs 4A and 4B. In the first example described above, input/output patterns at the time of execution of an instruction region are directly registered in the RB. On this account, the RWs 4A and 4B are realized by a pointer to each row of the RB. On the other hand, each of the RF and RB has a tree structure in the second example. Therefore the RWs 4A and 4B cannot directly point a row of the RB. That is, in the second example, the RWs 4A and 4B practically function as memories that temporarily store input/output patterns at the time of execution of an instruction region, rather than pointers to each row of the RB.

Also in the second example, the RF and RB shown in FIG. 24 are provided as temporal storage memory areas that store history entries of input patterns in a case where a predetermined instruction region is repeatedly executed. In this case, however, a row of an entry in the RB is made up of several rows as history storage rows each storing a history entry.

Upon execution of an instruction region, input elements thereof are serially stored in the RWs 4A and 4B. Arithmetic computation is performed with all input elements, and once output elements are established, the input/output pattern is stored in the history storage row, and also stored in the aforesaid tree-structured input/output pattern storage mechanism.

In a case where a predetermined instruction region is repeatedly executed, histories are serially stored in the history storage row. Once a predetermined number of histories are stored, the prediction processing section 2B performs a prediction as described above. A result of execution by the SSP 1B based on the prediction is stored in the tree-structured input/output pattern storage mechanism.

Embodiment 3

The following will describe a further embodiment of the present invention in reference to figures.

(Data Processing Device)

Figure 35:
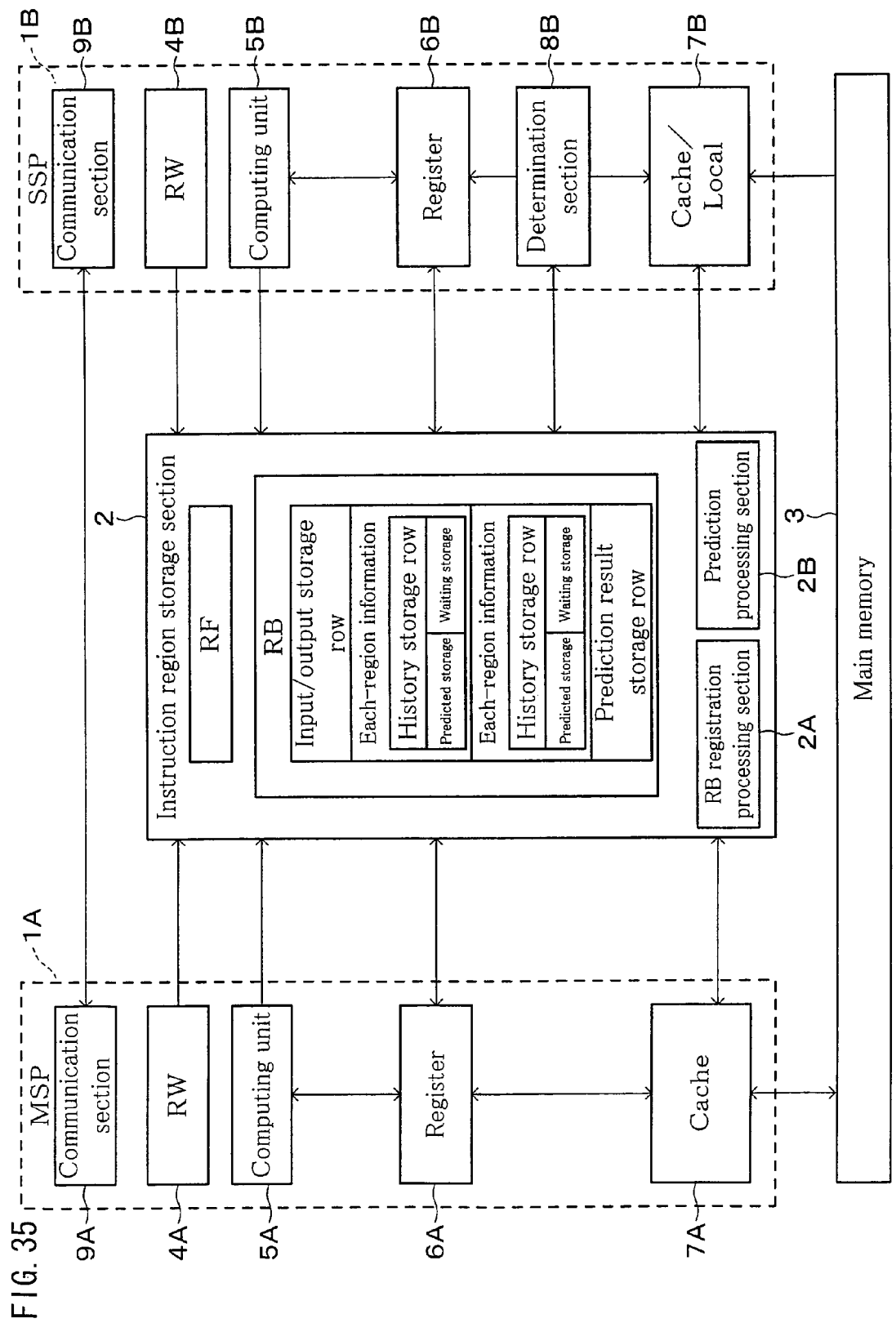
FIG. 35 is a block diagram that outlines the data processing device.

FIG. 35 outlines a data processing device of the present embodiment. As shown in the figure, the data processing device includes a MSP 1A, a SSP 1B, an instruction region storage section (input/output storage means) 2 as a reuse table, and a main memory (main storage means) 3. Various arithmetic processes are executed by reading out program data or the like from the main memory 3, and a result of the process is written into the main memory 3. Although only one SSP 1B is shown in the figure, the number of SSP 1B may be more than one.

The instruction region storage section 2 is memory means that stores data for the reuse of a function or a loop of a program. The instruction region storage section 2 includes an RF, an RB, an RB registration processing section (registration processing means) 2A, and a prediction processing section (prediction processing means) 2B. Details of the RF and RB of the instruction region storage section 2, the RB registration processing section 2A, and the prediction processing section 2B will be described later.

The main memory 3 functions as a working space for the MSP 1A and SSP 1B. The main memory 3 is, for example, made up of a RAM. For example, a program, data, or the like is read out to the main memory 3 from external storage means such as a hard disc, and the MSP 1A and SSP 1B perform an arithmetic process using the data read out to the main memory 3.

The MSP 1A includes an RW (reuse storage means) 4A, a computing unit (first computing means) 5A, a register 6A, a Cache 7A, and a communication section 9A. The SSP 1B includes an RW (reuse storage means) 4B, a computing unit (second computing means) 5B, a register 6B, a Cache/Local 7B, a determination section 8B, and a communication section 9B.

The RWs 4A and 4B are reuse windows, and store, as a ring-structured stack, each entry of the RF and RB being currently executed and registered. In an actual hardware structure, each of the RWs 4A and 4B is an assembly of control lines each of which causes a particular entry of the instruction region storage section 2 to be active.

The computing units 5A and 5B are termed ALU, and perform an arithmetic process based on data stored in the registers 6A and 6B. The registers 6A and 6B are storage means that store data used for performing calculations by the computing units 5A and 5B. In the present embodiment, the computing units 5A and 5B and the registers 6A and 6B are in compliant with the SPARC architecture. The Caches 7A and 7B function as cache memories between (i) the main memory 3 and (ii) the MSP 1A and SSP 1B. In the SSP 1B, the Cache 7B includes a Local 7B as a local memory.

The determination section 8B is a block that determines, at the time of main memory readout after activating precomputation described below, from which one of the followings a value is read out: an input/output storage row (described later) of the RB; a predicted value storing region (described later); a stand-by address storage region (described later); and the Cache/Local 7B. Details of the determination will be described later. The determination section 8B is realized by a small processor provided in the SSP 1B.

When main memory writing is carried out by the MSP 1A or SSP 1B, the communication sections 9A and 9B notify the main memory writing of all of the remaining SSPs 1B or the MSP 1A. Each of the communication sections 9A and 9B is realized by a small processor provided in the MSP 1A or SSP 1B.

(RF/RB)

Figure 34:
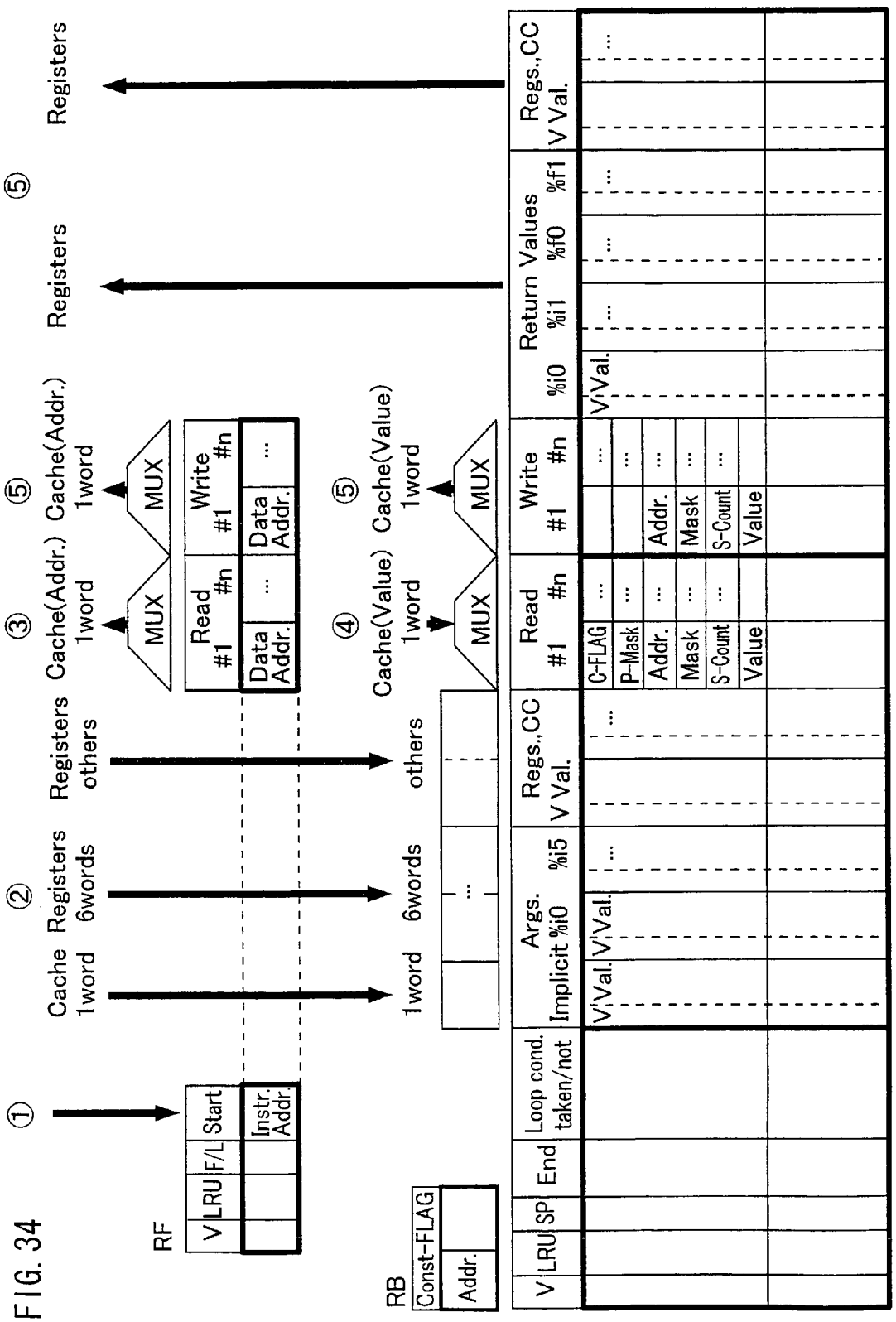
FIG. 34 outlines an RF and an RB of an instruction region storage section of a data processing device of still another embodiment of the present invention.

FIG. 34 outlines the RF and RB in the instruction region storage section 2 of the present embodiment. As shown in the figure, the RF stores a plurality of entries. For each entry, the RF stores: V indicating whether or not the entry is valid; LRU indicating a hint for replacing the entry; Start indicating the leading address of a function; Read/Write indicating a main memory address to be referred to; and F/L that distinguishes a function from a loop.

The RB stores a plurality of entries corresponding to the entries stored in the RF. For each entry, the RB stores: V indicating whether or not the entry is valid; LRU indicating a hint for replacing the entry; SP indicating a stack point % sp immediately before calling a function or a loop; an argument. (Args.) (V: valid entry, Val.: value); a main memory value (C-FLAG: change flag of Read address, P-Mask: history mask of Read address, Mask: valid byte of Read/Write address, Value: value, S-Count: store counter of Read/Write address); return value (Return Values) (V: valid entry, Val.: value); ending address (End) of a loop; taken/not indicating the branch direction at the time of the end of a loop; and register and condition code (Regs., CC) other than an argument and a return value. The RB has a memory area storing a constant flag (Const-FLAG) corresponding to one or more register address. Details of the constant flag (Const-FLAG) will be described later.

Details of the items of the RF and RB will be given. V indicates, as described above, whether or not the entry is valid. More specifically, V stores "0" if not registered, "2" if being registered, and "1" if having already been registered. For example, when the RF or RB is secured, a non-registered entry (V=0) is used if there is one. If there is no non-registered entry, an entry (V=1) having already been registered and having the smallest LRU is selected and overwriting is carried out. Overwriting to an entry (V=2) being currently registered is not possible, because the entry is in use.

LRU indicates the number of "1" in a shift register which shifts to the right at predetermined intervals. In the case of the RF, "1" is written into the extreme left of the shift register, when registration for reuse is carried out to the entry or reuse is attempted. On this account, LRU is large if the entry is frequently used. On the other hand, LRU is 0 if the entry is not used for a predetermined period of time. In the RB, meanwhile, "1" is written if the entry is reused. Therefore, LRU is large if the entry is frequently used, while LRU is 0 if the entry is not used for a predetermined period of time.

The following will describe Mask of a main memory value in the RB. In general, management is achieved by managing addresses and data bit by bit. In practice, however, cache reference is speedily carried out by managing data in units of 4 bytes. The RF therefore stores a main memory address in multiples of 4. In a case where the management is carried out in multiples of 4, it is necessary to show which byte among 4 bytes is valid, in order to allow only one byte to be loaded. That is, Mask is 4-bit data indicating which byte is valid among 4 bytes. For example, a value is E8 as a result of loading one byte from an address C001, an address C000 is registered in the RF, "0100" is registered in Mask of the RB, and "00E80000" is registered in Value of the RB. Details of a changing flag (C-FLAG) and history mask (P-Mask) of a Read address, and a store counter (S-Count) of a Read/Write address will be given later.

The following will describe the aforesaid condition code and registers other than an argument and a return value (CC, Regs.). In the present embodiment, general registers % g0-7, % o0-7, and % i0-7, a floating-point register % f0-31, a condition code register ICC, and a floating-point condition code register FCC are used among SPARC architecture registers (details will be described later). Among these registers, an input of a leaf function is the general register % o0-5, an output thereof is the general register % o0-1, an input of a non-leaf function is the general register % i0-5, and an output thereof is the general register % i0-1. Inputs are registered in arg[0-5], while outputs are registered in rti[0-1]. According to the provisions of SPARC-ABI, registers other than the above do not act as inputs and outputs of a function. Therefore, items of arguments (Args.) in the RB suffice for a function.

According to the provisions of SPARC-ABI, it is not possible to specify the type of registers to be used, in regard of inputs and outputs of a loop. On this account, all types of registers must be registered in the RB, in order to specify inputs and outputs of a loop. Therefore, % g0-7, % o0-7, % l0-7, % i0-7, % f0-31, ICC, and FCC are registered in Regs. and CC of the RB.

As described above, in the instruction region storage section 2, a Read address is centrally managed by the RF, while Mask and Value are managed by the RB. This makes it possible to compare the content of a Read address with a plurality of entries of the RB at once, by means of CAM.

As shown in FIG. 35, the RB of the present embodiment is provided with: an input/output storage row (input/output storage area); history storage row (history storage area) as each-region information; a predicted value storing region, waiting-required address storage region, and a prediction result storage row. These input/output storage row, history storage row, predicted value storing region, waiting-required address storage region, and prediction result storage region are realized in the form basically in compliant with an entry in the RB shown in FIG. 34. However, each of them are stored in a relatively different form. Details of the storing form will be described later.

(Outline of Reuse)

Outline of reuse in each case of functions and loops is not described here, because it has already been described in Embodiment 2 (Outline of Reuse).

(Flow of Process on Execution of Instruction Region)

The specific flow of the process when an instruction is decoded is identical with that (Flow of Process on Execution of Instruction Region) described in Embodiment 2, and hence description thereof are omitted. Also, the flows of processes in cases where a decoded instruction is a function calling instruction, function return instruction, backward branch taken, backward branch not taken, and other instructions are identical with those described in Embodiment 2.

(Multiple Reuse Including Loop)

Multiple reuse including a loop is also identical with that (Multiple Reuse Including Loop) described in Embodiment 2, and hence the descriptions thereof are omitted.

(Parallel Precomputation)

As described above, further speedup is achieved by providing, in addition to the MSP 1A as a processor for multiple reuse, a plurality of SSPs 1B as processors that activate an RB entry by precomputation of an instruction region.

The hardware structure for parallel precomputation is shown in FIG. 35 as above. As shown in the figure, the RWs 4A and 4B, computing units 5A and 5B, registers 6A and 6B, and caches 7A and 7B are independently provided for each processor. Meanwhile, the instruction region storage section 2 and the main memory 3 are shared by all processors.

Problems to realize parallel precomputation are (1) in what manner the consistency of the main memory is maintained, and (2) in what manner an input is predicted. The following will describe solutions for these problems.

(Solution for Problem Regarding Consistency of Main Memory)

First, the following will discuss (1) in what manner the consistency of the main memory is maintained. In a case where an instruction region is executed based on an input parameter which is specifically predicted, a value to be written into the main memory 3 is different between the MSP 1A and SSP 1B. To solve this problem, as show in FIG. 35, the SSP 1B uses the instruction region storage section 2 for main memory reference which is the target of registration to the RB, while, for other local references, the SSP 1B uses a Local 7B which is a local memory provided for each SSP 1B. On this account, writing into the Cache 7B and main memory 3 is unnecessary. Incidentally, when the MSP 1A performs writing into the main memory 3, a cache line of the corresponding SSP 1B is invalidated.

More specifically, among targets of registration to the RB, the main memory 3 is referred to as to an address where readout is precedently performed, and the address and value are registered in the RB as in the case of the MSP 1A. Hereinafter, not the main memory 3 but the RB is referred to. On this account, it is possible to prevent the occurrence of contradiction on account of overwriting from another processor. As to a local reference, readout is precedently performed first and hence a variable is used without initialization. The value is therefore not necessarily specified, and hence it is unnecessary to refer to the main memory 3.

The capacity of the Local 7B as a local memory is limited. Therefore, in a case where execution cannot be continued because, for example, the length of a function frame exceeds the capacity of the Local 7B, precomputation is terminated. Also, since a result of precomputation is not written into the main memory 3, it is not possible to perform the next precomputation using the result of current precomputation.

Referential Example of Prediction Mechanism

Now, the following describes (2) in what manner an input is predicted. To perform precomputation, it is necessary to predict a future input based on the history of use of the RB, and send the result to the SSP 1B. To do so, the instruction region storage section 2 is provided with a prediction processing section 2B. This prediction processing section 2B is composed of a small processor provided for each entry of the RF. Being independent of the MSP 1A and SSP 1B, the prediction processing section 2B works out an input prediction value.

As described above, conventional input prediction is not accurate, because all addresses registered in the input side of the RB are dealt with in a uniform manner. To solve this problem, it is necessary to (i) distinguish an address having a high degree of predictability from an address having a low degree of predictability, and (ii) target minimum-required addresses, in consideration of the change of a value.

An address having a high degree of predictability is fixed and its value monotonously changes. Examples of such an address include a global variable referred to by a label, and a local variable (in-frame variable) which is referred to with a stack pointer or frame pointer as the base register.

To distinguish between these types of addresses, a constant flag (Const-FLAG) is provided in a register which is referred to by an address calculation at the time of execution of a load instruction. It is assumed that a constant flag is unconditionally set in a register used as a stack pointer or a frame pointer. In other registers, a constant flag (Const-FLAG) is set at the time of execution of an instruction to set a constant.

Subsequently, among addresses having been referred to, an address to which writing has not been carried out is assured that its content has not been changed. As to such an address, it is not necessary to carry out prediction. Therefore, to specify such an address, a change flag (C-FLAG) indicating that writing is carried out is provided. When an address as an input element is newly stored in the RF/RB, the change flag (C-FLAG) corresponding to the address is reset. After the registration, a change flag (C-FLAG) is set when a store instruction with respect to the address is executed.

Also, a history mask (P-mask) indicating whether or not an address as an input element is a target of storing history. When an address as an input element is newly registered in the RF/RB, a history mask (P-Mask, history flag) corresponding to the address is reset. In a case where, at the time of execution of a load instruction, a constant flag (Const-FLAG) corresponding to the register that generated the address is set, a byte position which is the target of loading in the history mask (P-Mask) is set.

The aforesaid control of setting of a constant flag (Const-FLAG), change flag (C-FLAG), and history mask (P-Mask) is carried out by an RB registration processing section 2A of the instruction region storage section 2. This RB registration processing section 2A is composed of a small processor, and sets a constant flag (Const-FLAG), change flag (C-FLAG), and history mask (P-Mask) by conducting the aforesaid determinations.

Example of Instruction Region

As an example of an instruction region, the following will describe a case where the instruction region shown in FIG. 36(*a*) is executed, In the figure, PC indicate a PC value at the time of the start of the instruction region. That is, the address of the head of the instruction region is 1000. This instruction region has a looped structure, and is composed of 11 instructions. FIG. 36(*b*) briefly shows input addresses and input data registered in the RB and output addresses and output data, at the time of execution of the instruction region.

By a first-row instruction (hereinafter, for example, n-th-row instruction will be referred to as n-th instruction), an address constant A1 is set at a register R1. By a second instruction, the content (00010004) of an address A1 is loaded to a register Rx, by using the content of the register R1.

By a third instruction, an address constant A2 is set at a register R2. By a fourth instruction, the content (80000000) of an address A2 is loaded to a register Ry, by using the content of the register R2.

by a fifth instruction, the content (0000AAAA) of an address A3 (00010000) whose address is worked out by subtracting 4 from the content of the register Rx is loaded to a register Rz. By a sixth instruction, a value (00010008) which is worked out by adding 4 to the content of the register Rx is set at the register Rx.

By a seventh instruction, the content (00010008) of the register Rx is stored in the address A1, using the content of the register R1. By an eighth instruction, a value (40000000) which is worked out by shifting the content (80000000) of the register Ry to right by one bit is set at the register Ry.

By a ninth instruction, the content (40000000) of the register Ry is stored in an address A4, using the register Rx. By a tenth instruction, a value (4000AAAA) worked out by adding the content of the register Ry to the content of the register Rz is set at the register Rz.

By an eleventh instruction, the content (4000AAAA) of the register Rz is stored in the address A4, by using the register Rx. By a twelfth instruction, the process is branched to the leading address of the loop, i.e. 1000.

FIG. 36(*c*) shows an example of the second loop process subsequent to the twelfth instruction. FIG. 36(*d*) briefly shows input addresses and input data registered in the RB in this case, and output addresses and output data. FIG. 36(*e*) shows an example of the third loop process subsequent to the second loop process. FIG. 36(*f*) shows input addresses and input data registered in the RB in this case, and output addresses and output data.

As described above, in the first loop, the inputs are the value (00010004) of the address A1, the value (80000000) of the address A2, and the value (0000AAAA) of the address (00010000), meanwhile, the outputs are the value (00010008) of the register Rx, the value (40000000) of the register Ry, the value (4000AAAA) of the register Rz, the value (00010008) of the address A1, the value (40000000) of the address A2, and the value (4000AAAA) of the address (00010004).

In the second loop, the inputs are the value (00010008) of the address A1, the value (40000000) of the address A2, and the value (4000AAAA) of the address (00010004), meanwhile, the outputs are the value (0001000C) of the register Rx, the value (20000000) of the register Ry, the value (6000AAAA) of the register Rz, the value (0001000C) of the address A1, the value (20000000) of the address A2, and the value (6000AAAA) of the address (00010008).

In the processes above, one has to pay attention to the dependency relations of data between the first loop and second loop. The first dependency relationship lies between the seventh instruction of the first loop, which relates to the constant address A1, and the second instruction of the second loop. In this dependency relation, the value of the constant address A1 is constantly incremented by 4.

The second dependency relation lies between the ninth instruction of the first loop, which relates to the constant address A2, and the fourth instruction of the second loop. In this dependency relation, the value of the constant address A2 shifts to right by one bit, and hence the variation thereof is inconsistent.

The third dependency relation lies between the eleventh instruction of the first loop, which relates to the varying address A4, and the fifth instruction of the second loop. In this dependency relation, the address of the address A4 is constantly incremented by 4, while the value thereof is inconsistent.

To speed up such a loop structure by a parallel process between loops, it is necessary to dynamically grasp the data dependency relations, and effectively parallelize those not having dependency relations.

Example of Execution of Instruction Region According to Referential Example

Now, the following will describe a case where the instruction region shown in FIG. 36(a) is executed by the aforesaid RF and RB of the referential example. FIG. 37 shows an actual state of registration in the RB, in a case where the instruction region shown in FIG. 36(a) is executed.

By the first instruction, an address constant A1 is set at a register R1. Since this instruction sets a constant, a constant flag (Const-FLAG) corresponding to the register R1 is set.

By the second instruction, the content (00010004) of an address A1 is loaded to a register Rx. In this case, the address A1, mask (FFFFFFFF), and data (00010004) are registered, as inputs, in the first column on the Input side of the RB. A register number Rx, mask (FFFFFFFF), and data (00010004) are registered, as outputs, in the first column on the Output side of the RB. Since the value registered as the output of the register number Rx is rewritten in the following process, this value is different from the value shown in FIG. 37.

Since a constant flag (Const-FLAG) corresponding to the register R1 used as the address is set, a history mask (P-mask) corresponding to the address A1 is set. Since the target data is 4-byte data (00110000), the history mask (P-mask) corresponding to the address A1 is set at (FFFFFFFF) accordingly. As a constant is not set at the register Rx, a constant flag (Const-FLAG) corresponding to the register Rx is reset.

By the third instruction, an address constant A2 is set at the register R2. Since this instruction sets a constant, a corresponding constant flag (Const-FLAG) is set at the register R2.

By the fourth instruction, the content (80000000) of the address A2 is loaded to the register Ry, by using the content of the register R2. In this case, the address A2, mask (FFFFFFFF), and data (80000000) are registered, as inputs, in the second column on the Input side of the RB. The register number Ry, mask (FFFFFFFF), and data (80000000) are registered, as outputs, in the second column on the Output side of the RB. At this stage, a value registered as the output of the register number Ry is rewritten in the subsequent process. The value is therefore different from the value shown in FIG. 37.

Since a constant flag (Const-FLAG) corresponding to the register R2 used as an address is set, a history mask (P-mask) corresponding to the address A2 is set. Since the target data is 4-byte data (80000000), the history mask (P-mask) corresponding to the address A2 is set at (FFFFFFFF). As a constant is not set at the register Ry, a constant flag (Const-FLAG) corresponding to the register Ry is reset.

By the fifth instruction, the content of an address A3 (00010000) whose address is a value worked out by subtracting 4 from the content of the register Rx is loaded to a register Rz. In this case, the address A3, mask (FFFFFFFF), and data (0000AAAA) are registered, as inputs, in the third column on the Input side of the RB. The register number Rz, mask (FFFFFFFF), and data (00000AAAA) are registered, as outputs, in the third column on the Output side of the RB. By the way, since the value registered as an output of the register number Rz will be rewritten in the subsequent process, the value is different from the value shown in FIG. 37.

Also, because a constant flag (Const-FLAG) corresponding to the register Rx used as an address has been reset, a history mask (P-mask) corresponding to the address A3 is set at (00000000). Since a constant is not set in the register Rz, a constant flag (Const-FLAG) corresponding to the register Rz is reset.

By the sixth instruction, a register Rx is set at a value (00010008) worked out by adding 4 to the content of the register Rx. Since the register Rx has already been registered on the Output side of the RB, the register Rx is not registered on the Input side of the RB. A value corresponding to the register Rx registered on the Output side of the RB is updated to (00010008).

By the seventh instruction, the content (00010008) of the register Rx is stored in an address A1, using the content of the register R1. Because the register Rx has already been registered on the Output side of the RB, the register Rx is not registered on the Input side of the RB. The address A1, mask (FFFFFFFF), and data (00010008) are registered, as outputs, in the fourth column on the Output side of the RB. Because the address A1 has already been registered on the Input side of the RB, a change flag (C-FLAG) corresponding to the address A1 is set (indicated as "change" in the figure).

By the eighth instruction, a register Ry is set at a value (40000000) which is worked out by shifting the content (80000000) of the register Ry to the right by one bit. Because the register Ry has already been registered on the Output side of the RB, the register Ry is not registered on the Input side of the RB. A value corresponding to the register Ry registered on the Output side of the RB is updated to (40000000).

By the ninth instruction, the content (40000000) of the register Ry is stored in an address A2, using the register R2. Because the register Ry has already been registered on the Output side of the RB, the register Ry is not registered on the Input side of the RB. The address A2, mask (FFFFFFFF), and data (40000000) are registered, as outputs, in the fifth column on the Output side of the RB. Because the address A2 has already been registered on the Input side of the RB, a change flag (C-FLAG) corresponding to the address A2 is set (indicated as "change" in the figure).

By the tenth instruction, a value (4000AAAA) worked out by adding the content of the register Ry to the content of the register Rz is set in the register Rz. Because the registers Ry and Rz have already been registered on the Output side of the RB, these addresses are not registered on the Input side of the RB. A value corresponding to the register Rz registered on the Output side of the RB is updated to (4000AAAA).

by the eleventh instruction, the content (4000AAAA) of the register Rz is stored in an address A4, using the register Rx. Because the register Rx has already been set on the Output side of the RB, the register Rx is not registered on the Input side of the RB. The address A4, mask (FFFFFFFF), and data (4000AAAA) are registered, as outputs, in the sixth column on the Output side of the RB.

By the twelfth instruction, the process is branched to the leading address (1000) of the loop. At the time of the detection of the backward branch, the target of the branch is compared with the instruction region leading address (1000) at which the registration starts. If these addresses are matched, the registration of inputs and outputs in the instruction region is completed.

As a result of the above, a change flag (C-FLAG) is set, and mask positions where the history mask (P-Mask) is set are the addresses A1 and A2. Addresses, masks, and values corresponding to the mask positions are recorded in entries of the RB, as prediction targets and history information that keeps past input history for each instruction region. Although not appeared in the example above, registers registered in an input pattern of the RB are unconditionally recorded as prediction target and history.

FIG. 38(a) shows an example of history registered in the RB, in a case where the instruction region shown in FIG. 36(a) is repeatedly executed. As shown in FIG. 38(a), the RB stores, as a history mask (P-Mask), (FFFFFFFF) in the column of the address A1, and also stores, as a history Mask (P-Mask), (FFFFFFFF) in the column of the address A2. As the number of loops changes from 1 to 4, a value corresponding to the history mask (P-Mask) changes in each address. Indicated as "diff" between histories is a variation (difference) of a value of a corresponding input element. This diff is worked out by the prediction processing section 2B.

In the example shown in the figure, as to the columns of the address A1, diff are all 04 while the number of loops changes from 1 to 4. Therefore, the value corresponding to this address increments by 04 in each loop. In the meantime, as to the columns of the address A2, diff inconsistently changes while the number of loops changes from 1 to 4. It is therefore difficult to predict the address A2.

Because of the above, as to an address whose differences are consistent in the history, the prediction processing section 2B performs prediction with the assumption that the trend of differences continues thereafter. On the other hand, the prediction processing section 2B does not perform prediction as to an address whose differences are inconsistent or 0.

FIG. 38(b) shows input elements recorded in the RB as prediction entries, in a case where the prediction processing section 2B performs prediction as to a value of the address A1. In the figure, as to the addresses A2 and A7-A10, values are obtained by directly referring to the main memory 3, without working out prediction values.

As prediction values of input elements are worked out as above, the SSP 1B executes an instruction region based on the predicted input elements, so that output elements are calculated. These predicted output elements are recorded in the RB as predicted entries. Thereafter, the MSP 1A executes the instruction region. In a case where an input value identical with a predicted input element recorded in the RB as a predicted entry is inputted, a corresponding predicted output element is outputted so that reuse is realized.

Problem in Referential Example

Figure 39:
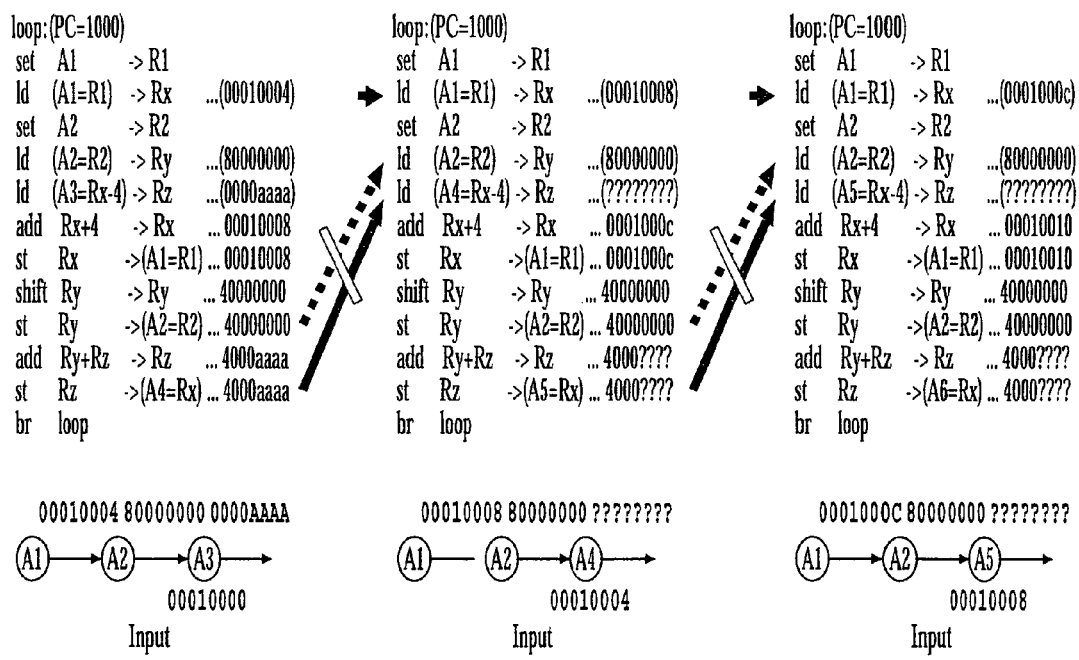
FIG. 39 shows a result of precomputations in the second and third loop processes, which are carried out based on a prediction described in a referential example.

The content of a monotonously-changing address (address A1 in the example above is precisely predicted, e.g. a loop control variable. However, in a case where an instruction region includes an array, an array value does not always monotonously changes even if a subscript of the array monotonously changes. In the example shown in FIG. 36(a), the value loaded from the address A1 is the subscript of the array. Because the main memory references (addresses A3-A10) using the subscript as an address changes its address, the prediction is very hard. In a case where no data dependency exists between loops, the effect of a parallel process is obtained by directly referring to a cache. However, in a case where data dependency exists between loops as in the program exemplified in FIG. 36(a), the effect of the prediction as above cannot be obtained. FIG. 39 shows a result of precomputation in the second and third loops, based on the prediction of the referential example. As shown in the figure, there are addresses whose value is not fixed and whose value is different from an actual value. In this manner, the prediction is ineffective.

(Prediction Mechanism)

Addresses related to the registration of an input/output pattern in the RB are categorized as below.

The first type of addresses is a constant address whose content does not change. Because the content of an address of this type does not change, it is unnecessary to compare the content thereof with a past value at the time of reuse. Therefore, the prediction of the content is unnecessary for such addresses.

The second type of addresses is a constant address in which a variation of the content is consistent. Because a variation of the content is consistent in an address of this type, the prediction can be performed. In the example above, the address A1 is the second type.

The third type of addresses is a constant address is a constant address in which a variation of the content is inconsistent. Because prediction is difficult for an address of such type, it is necessary to put off the writing. In the example above, the address A2 is the third type.

The fourth type of addresses is an address which changes but its content does not change. That is, no storing occurs in this address, and hence the content of the address does not change as a result. Since the content of an address of this type does not change, it is unnecessary to compare the content thereof with a past value at the time of reuse. Therefore, the prediction of the content is unnecessary for such addresses.

The fifth type of addresses is an address which changes and the content thereof also changes on account of the occurrence of storing. Prediction of such an address of this type is difficult because a variation of the content is inconsistent. On this account, it is necessary to put off the writing. In the example above, addresses A3-A10 are the fifth type.

According to the prediction mechanism of the present embodiment, the first and fourth types of addresses are excluded and dynamic classification is carried out for second, third, and fifth types of addresses, at the time of execution of an instruction region. As to the fifth type of addresses, data waiting is carried out between processors (MSP 1A and SSP 1B) which carry out precomputation. To realize this, the RB of the above-described referential example has an item termed store counter (S-Count). FIG. 40(a) shows an example of an input/output storage row in the RB. FIG. 40(b) shows an example of a history storage row.

First, in an input/output storage row where an input/output pattern at the time of execution of an instruction region by the MSP 1A or SSP 1B is stored, a store counter (S-Count) is provided in an address as an output element, i.e. in a Write address. By the way, the input/output storage row is provided for each of the MSP 1A and SSP 1B.

The store counter (S-Count) indicates how many times storing with respect to the address is carried out by the MSP 1A or SSP 1B. Each time storing with respect to the address is carried out by the MSP 1A or SSP 1B, the RB registration processing section 2A increases the store counter (S-Count) of the corresponding entry by 1.

In the history storage row where a history entry corresponding to each instruction region is stored, a store counter (S-Count) is provided in a Write address. When input/output registration of an instruction region to the input/output storage row is completed, the content registered in the input/output storage row is added to the history storage row corresponding to the instruction region. On this occasion, an Address, Mask, and store counter (S-Count) of each output element registered in the input/output storage row are registered on the Write side of the history storage row.

in the history storage row of the RB, a store counter (S-Count) is provided in an address as an input element, i.e. a Read address. Among input elements registered in the input/output storage row of the RB, a change flag (C-FLAG) is set, and an input element where a history mask (P-Mask) is set is added to the history storage row corresponding to the instruction region. On this occasion, the Address, history mask (P-mask), and Value registered in the input/output storage row are registered on the Read side of the history storage row. Moreover, among all addresses of input elements registered in the input/output storage row, an address identical with an address included in a Write address of the history storage row which stores an input/output pattern at the time of previous execution of the instruction region is added to the history storage row corresponding to the instruction region. On this occasion, the Address, history mask (P-Mask), and store counter (S-Count) of the input element registered in the input/output storage row are registered on the Read side of the history storage row. A value of the registered store counter (S-Count) is identical with a store counter (S-Count) value in the Write address of the history storage row which stores an input/output pattern at the time of previous execution of the instruction region.

(Method if Classification of Addresses)

The following will describe in what manner the aforesaid second, third, and fifth type of addresses are classified by the above-described RB. FIG. 41(*a*) shows an example of registration in the history storage row in a case where the instruction region shown in FIG. 36(*a*) is repeatedly executed. FIG. 41(*b*) shows an example of a predicted value storing region and a waiting-required address storage region, in a case where the prediction processing section 2B performs the below-described prediction based on the history shown in FIG. 41(*a*).

In a case where a history mask (P-Mask) is set in an input element registered in the history storage row corresponding to each instruction region, the prediction processing section 2B works out a variation of an Address and a variation of a Value. If the variation of the Address is consistent, the prediction processing section 2B stores, as a predicted address corresponding to the input element and in the predicted value storing region, an externally-inserted value which is predicted with the assumption that the variation will be consistent thereafter. On the other hand, in a case where the variation of the Address is inconsistent, the prediction processing section 2B stores, as a predicted address of the input element and in the predicted value storing region, the Address which emerged most recently.

In a case where the variation of the Value is consistent, the prediction processing section 2B sets, as a predicted Value corresponding to the input element, an externally-inserted value predicted with the assumption that the variation will be consistent thereafter. In the predicted value storing region of the RB, the corresponding Address, Mask, and Value are stored. As a result of the above, the prediction mechanism for the second type of addresses is realized. In the examples shown in FIGS. 41(*a*) and 41(*b*), the address A1 is arranged such that the variation of the Address is consistent at 0 and the variation of the Value is also consistent at 04. Based on this, the address A1 is registered, as the second type, in the predicted value storing region.

On the other hand, in a case where the variation of the Value is inconsistent, the prediction processing section 2B stores, in the waiting-required address storage region of the RB, the corresponding Address and Mask. Also, the prediction processing section 2B sets, in the store counter (S-Count) (waiting counter), a value worked out by subtracting 1 from a predicted distance and then multiplying the value as a result of the addition by a store counter (S-Count) value corresponding to the input element of the history storage row. The prediction distance indicates how many times the instruction region will be executed, with the assumption that the instruction region will be repeatedly executed thereafter. As the store counter (S-Count) is set as above in the waiting-required address storage region, it is possible to properly set the number of storing to wait. With this, the prediction mechanism for the third type of addresses is realized. In the examples shown in FIGS. 41(*a*) and 41(*b*), the address A2 is arranged such that the history mask (P-Mask) is set and the variation of the Value is inconsistent. based on this, the address A2 is registered in the waiting-required address storage region, as the third type.

In the examples above, the prediction processing section 2B sets, in the store counter (S-Count), a value worked out by subtracting 1 from the predicted distance and multiplying the result of the addition by the store counter (S-Count) value corresponding to the input element of the history storage row. Alternatively, the following process may be carried out: the prediction processing section (i) stores the corresponding Address and Mask in the predicted value storing region of the RB, (ii) stores, in the store counter (S-Count), the store counter (S-Count) value corresponding to the input element of the history storage row, and (iii) stores the information by which the SSP 1B where the precomputation starts is specified based on the previous predicted value whose predicted distance is shorter by 1. With this, it is possible to precisely set the number of stores to wait, by decreasing the store counter value only when an execution notification is supplied from the corresponding SSP 1B, among all execution notifications from the SSPs 1B.

In a case where a history mask (P-Mask) is not set in an input element registered in the history storage row corresponding to each instruction region, the prediction processing section 2B works out a variation of an Address and a variation of a Value, in the manner identical to the above. If the variation of the Address is consistent, the prediction processing section 2B sets, as a predicted Address corresponding to the input element, an externally-inserted value predicted with the assumption that the variation will be consistent thereafter. On the other hand, if the variation of the Address is inconsistent, the prediction processing section 2B stores, in the waiting-required address storage region and as a predicted Address of the input element, the Address which emerged most recently.

Because the variation of the Value is unlikely to be consistent, the prediction processing section 2B stores, in the waiting-required address storage region, the corresponding Address and Mask, and also stores, in the store counter (S-Count), a store counter (S-Count) value corresponding to the input element of the history storage row. In this case, since the address has been changed, it is unnecessary to take into the account the predicted distance, at the time of setting the store counter (S-Count). With this, the prediction mechanism for the fifth type of addresses is realized. In the examples shown in FIGS. 41(*a*) and 41(*b*), a history mask (P-Mask) is not set in the addresses A7-A10, and the variation of a Value is inconsistent. These addresses are therefore registered as the fifth type in the waiting-required address storage region.

(Precomputation by MSP/SSP)

The following will describe the precomputation by the MSP 1A/SSP 1B based on the predicted value storage row generated by the process performed by the prediction processing section 2B as above. The readout from the main memory immediately after the start of the precomputation by the SSP 1B is carried out as follows.

First, the Cache/Local 7B is referred to, and the following processes are performed.

First of all, the determination section 8B of the SSP 1B determines whether or not an address identical with the main memory address to be read out is registered on the Write side, in the input/output storage row corresponding to the SSP. If registered, the registered Value is read out as a Value of the main memory address to be read out.

If not registered on the Write side, the determination section 8B of the SSP 1B determines whether or not an address identical with the main memory address to be read out is registered in the Value on the Read side, in the input/output row corresponding to the SSP. If registered, the registered Value is read out as a Value of the main memory address to be read out.

If not registered on the Read side, the determination section 8B of the SSP 1B determines whether or not an address identical with the main memory address to be read out is registered in the predicted value storing region. If registered, the registered Value is read out as a Value of the main memory address to be read out. If not registered in the predicted value storing region, the determination section 8B of the SSP 1B determines whether or not an address identical with the main memory address to be read out is registered in the waiting-required address storage region. Provided that the address is registered, if the store counter (S-Count) value is not less than 0, the readout from the main memory is withheld until the store counter (S-Count) value becomes 0, and the Value is referred to after a valid value is set at the Value. In any one of these references, a value regarding the address is read out from the Cache/Local 7B if there is no main memory address to be read out.

The writing into the main memory after the start of the precomputation by the MSP 1A/SSP 1B is carried out as follows.

In a case where the MSP 1A or SSP 1B executes a storing instruction, the communication section 9A or (B notifies the remaining SSPs 1B or MSP 1A of the execution of the storing instruction. If, in each SSP 1B, an address identical with the notified address is registered in the waiting-required address storage region, the store counter (S-Count) of the address is reduced by 1 and the writing value is stored in the Value. When, however, the store counter (S-Count) is already 0, nothing is carried out.

In the manner as above, the result of the precomputation by the SSP 1B is stored in the precomputation result storage row of the RB.

Example of Execution of Instruction Region

Referring to FIG. 42, the following will describe an example where precomputation based on a predicted value is carried out after the generation of the predicted value as above. In this example, assume that the predicted value is generated based on the result of loop which is performed four times. The example also assume that two SSPs 1B are used. These SSPs 1B are termed SSP#1 and SSP#2, respectively.

First of all, the MSP 1A starts to execute the fifth loop, and simultaneously the SSP#1 and SSP#2 also starts the execution after receiving prediction values of the sixth loop and seventh loop, respectively. The SSP#1 stores, in the predicted value storing region, the address A1 and value (00010018), while stores, in the waiting-required address storage region, (0001) as the address A2 and store counter (S-Count) value and (0001) as the address A8 and the store counter (S-Count address). In a similar manner, the SSP#2 stores the address A1 and value (0001001C) in the predicted value storing region for the SSP, and also stores (0002) as the address A2 and store counter (S-Count) value and (0001) as the address A9 and store counter (S-Count) value.

By the second instruction, the SSP#1 loads the content of the address A1 to the register Rx, by using a register R1. On this occasion, a value (00010018) of the address A1 is obtained from the predicted value storing region for the SSP, based on the aforesaid main memory reading procedure. Also, by the fourth instruction, the content of the address A2 is loaded to the register Ry, using a register R2. On this occasion, based on the aforesaid main memory reading procedure, it is recognized that the store counter (S-Count) value of the address A2 is (0001) according to the waiting-required address storage region, and the waiting is carried out.

By the second instruction, the SSP#2 loads the content of the address A1 to a register Rx, using the register R1. On this occasion, based on the aforesaid main memory reading procedure, a value (0001001C) of the address A1 is obtained from the predicted value storing region for the SSP. By the fourth instruction, the content of the address A2 is loaded to the register Ry, using the register R2. On this occasion, based on the aforesaid main memory reading procedure, it is recognized that the store counter (S-Count) value of the address A2 is (0001) according to the waiting-required address storage region, and the waiting is carried out.

Thereafter, the MSP 1A executes the ninth instruction, so that the address A2 and stored value (04000000) are notified to the SSP#1 and SSP#2. In the SSP#1, the store counter (S-Count) value of the address A2 is reduced by 1 so as to be 0 in the waiting-required address storage region, and the stored value (04000000) is stored in the Value. On this account, the waiting finishes and the execution of the fourth instruction is completed. IN the SSP#2, the store counter (S-Count) value of the address A2 is reduced by 1 so as to be 1 in the waiting-required address storage region, and the stored value (04000000) is stored in the Value. However, the waiting continues.

By the fifth instruction, the SSP#1 loads the content of the address A8 to the register Rx, using the register Rx. On this occasion, based on the aforesaid main memory reading procedure, it is recognized that the store counter (S-Count) value of the address A8 is (0001) according to the waiting-required address storage region, and the waiting is carried out.

Thereafter, the MSP 1A executes the eleventh instruction, so that the address A8 and stored value (7C00AAAA) are notified to the SSP#1 and SSP#2. In the SSP#1, the store counter (S-Count) value of the address A8 is reduced by 1 so as to be 0 in the waiting-required address storage region, and the stored value (7C00AAAA) is stored in the Value. With this, the waiting finishes and the execution of the fifth instruction is completed. In the SSP#2, since there is no corresponding address in the waiting-required address storage region, nothing is carried out and the waiting continues.

Thereafter, the SSP#1 executes the ninth instruction, so that the notification section 9B notifies all of the SSPs 1B (SSP#2) of the address A2 and stored value (02000000). In the SSP#2, the store counter (S-Count) value of the address A2 is reduced by 1 so as to be 0, and the stored value (02000000) is stored in the Value. With this, the waiting finishes and the execution of the fourth instruction is completed.

Moreover, the SSP#1 executes the eleventh instruction, so that the notification section 9B notifies all SSPs 1B (SSP#2) of the address A9 and stored value (7E00AAAA). In the SSP#2, the store counter (S-Count) value of the address A9 is reduced by 1 so as to be 0 in the waiting-required address storage region, and the stored value (7E00AAAA) is stored in the Value. With this, the waiting finishes and the execution of they fifth instruction is completed.

Second Example of Rf/Rb

Figure 43:
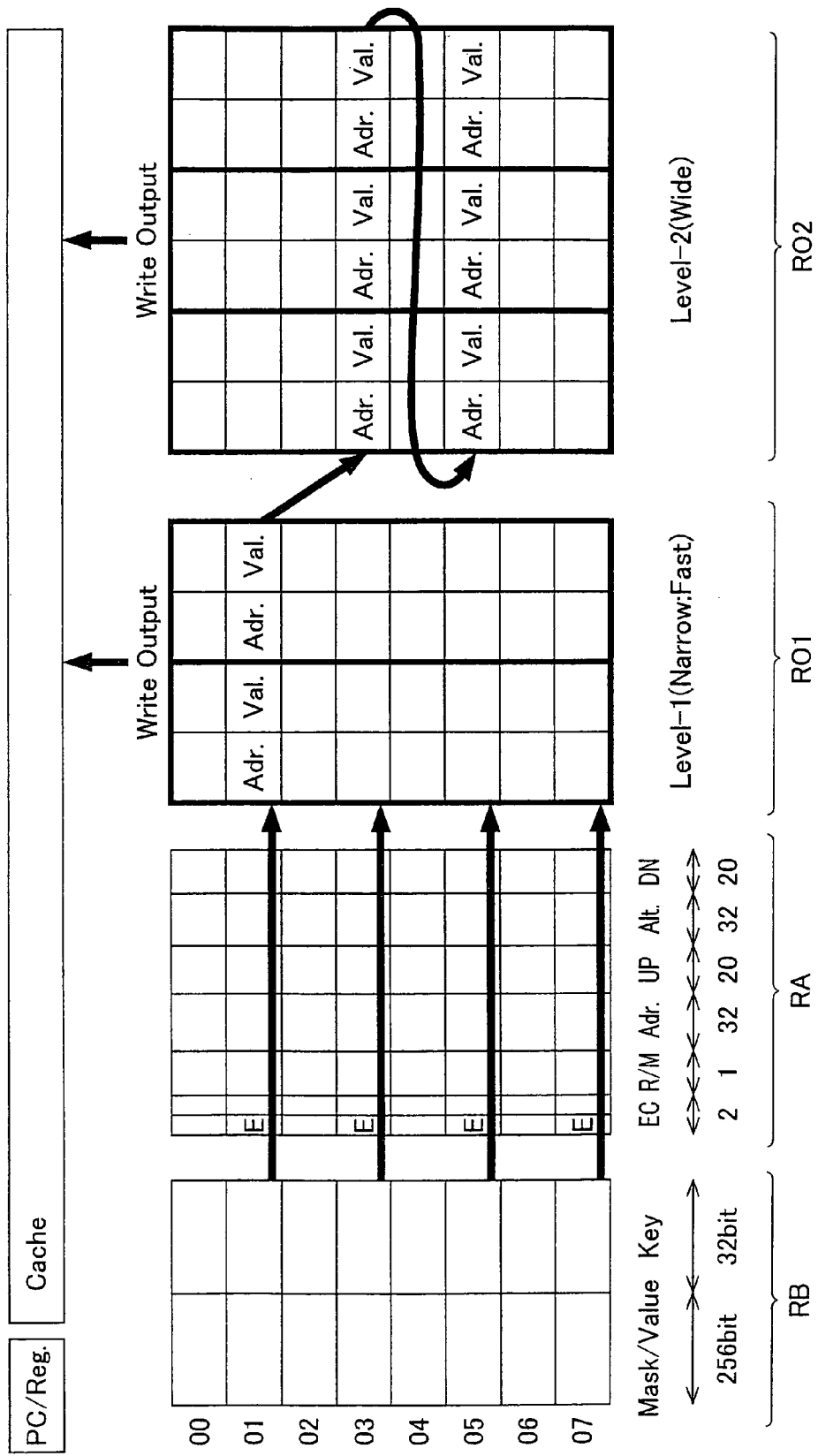
FIG. 43 outlines a second example of the instruction region storage section.

Referring to FIG. 43, the following will describe the second example of the instruction region storage section 2. As shown in the figure, the instruction region storage section 2 includes an RB, an RA, an RO1 (second output pattern storage means), and an RO2 (first output pattern storage means).

The RB has: a Value (value storage area) that stores a register value or main memory input value which is the target of comparison; and a Key (key storage area) that stores a key number. The RB has a plurality of lines each of which is a combination of a Key and a Value.

The RA has: an ending flag E which indicates that there is no register number or main memory address to be compared next; a comparison-needed flag which indicates that the content of a register number or main memory address to be compared next is updated; an R/M which indicates that whether the target of next comparison is a register or a main memory; an Adr. (search item designation area) which indicates a register number or main memory address to be compared next; an UP (parent node storage area) which indicates the line number which has just been referred to; an Alt. (comparison-needed item designation area) which indicates a register number or main memory address which should be subjected to comparison in preference to a register number or main memory address to be compared next; and a DN (comparison-needed key designation area) which indicates a key required for a preferential comparison. These components are provided on the respective lines of the RB.

Each of the RO1 and RO2 stores an output value supplied to the main memory and/or register, in a case where reuse is judged to be feasible according to a search results of the RB and RA. The RO1 stores output values and addresses to be outputted, which correspond to the respective lines of the RA. The RO2 stores output values and addresses to be outputted, which cannot be stored in the RO1, in a case where the RO1 cannot single-handedly store output values. If it is necessary to read out an output value also from the RO2, the corresponding line of the RO1 has a pointer indicating an output value in the RO2 is stored. Using this pointer, the output value is read out from the RO2. Each of the RB and RA is made up of a CAM and a RAM.

Associative Search in Second Example

The following will describe associative search in the second example. In the arrangement shown in FIG. 34, a crosswise row as each entry in the RB includes all items of input values to be subjected to equal comparison. That is, all input patterns are registered in the RB, as respective rows.

On the contrary, in the second example, an item of an input value to be subjected to equal comparison is divided into short units, these units are grasped as nodes, and an input pattern as a tree structure is registered in the RA and RB which are address management table. To carry out reuse, matched nodes are serially selected so that the feasibility of reuse is determined at the end. In other words, parts which are shared between input patterns are merged into one and associated with one row of the RA and RB.

This makes it possible to eliminate redundancy and improve the efficiency of the use of memory constituting the instruction region storage section 2. Also, because an input patter has a tree structure, it is unnecessary to associate one input pattern with an entry which is one row of the RB. Therefore, it is possible to change the number of items of input values to be subjected to equal comparison.

Because the RA and RB register an input pattern in a tree structure, multiple matches are not carried out in equal comparison. That is, the instruction region storage section 2 can be realized by an associative search memory with a single-match mechanism. Such an associative search memory only with a single-match mechanism is basically commercially available, but an associative search memory which can analogously perform both multiple matches and a single match is generally not commercially available. Therefore, since the instruction region storage section 2 of the second example can be realized by a commercially-available associative search memory, it is possible to realize the data processing device of the present embodiment, with a short period and low costs.

Figure 44:
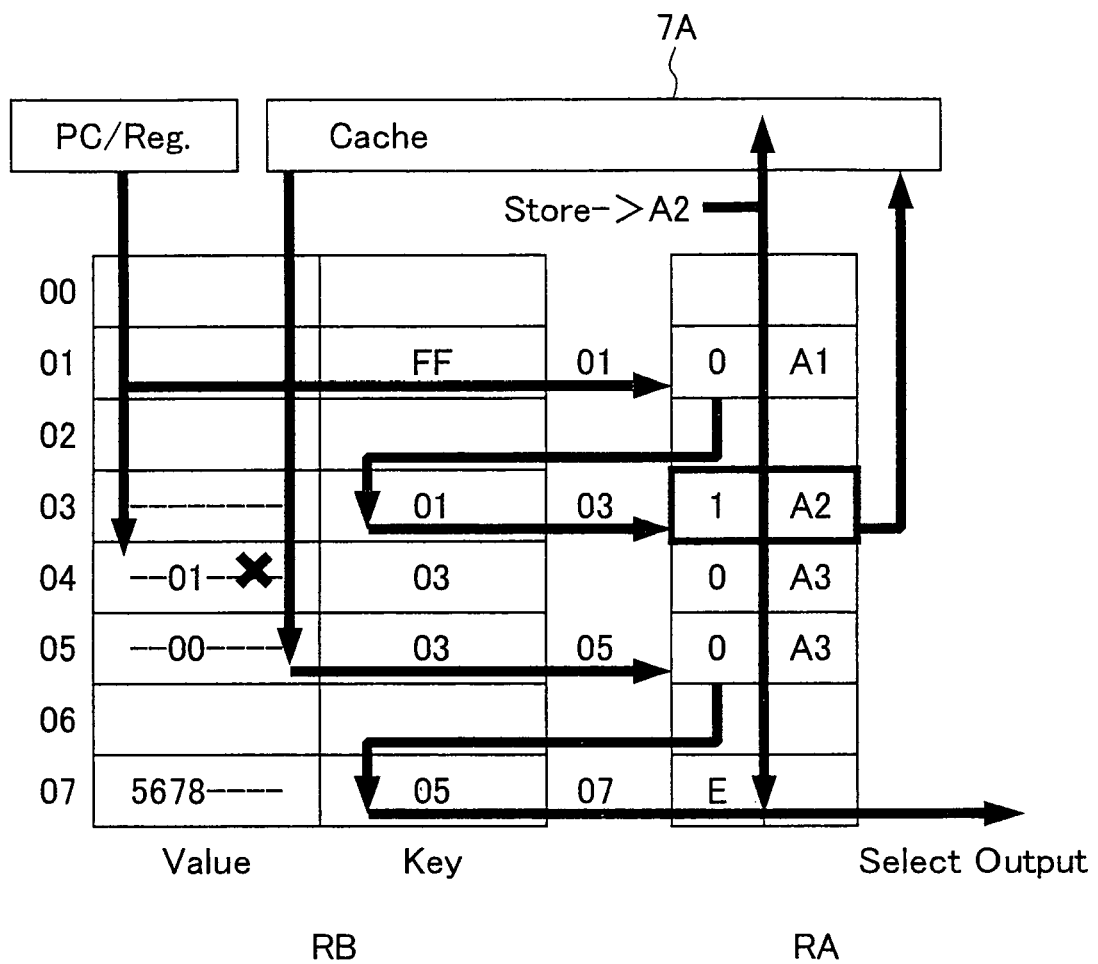
FIG. 44 shows a specific example of associative search in the instruction region storage section of FIG. 43.

Referring to FIG. 44, the following will describe a specific example of associative search carried out by the instruction region storage section 2. When the execution of an instruction region is detected, a program counter (PC) and the content (Reg.) of a register are inputted to the RB. In the RB, associative search is carried out so that those inputted values are compared with an instruction region leading address and a register value which are registered in the column of the Value of the RB, and only one row (line) having matched values is selected as a candidate (matched line). In the example, the line "01" in the RB is selected as a matched line.

Subsequently, the address "01" of the selected matched line in the RB is supplied, as encoding result, to the RA, and a line in the RA, which corresponds to the key 01, is referred to. In the line corresponding to the key 01 in the RA, the comparison-needed flag is "0" and the main memory address to be subjected to comparison is A1. This indicates that it is unnecessary to subject the main memory address A1 to equal comparison.

Then, using the key 01, search is performed with respect to the row of the Key in the RB. In the example, the line "03" in the RB is selected as a matched line. The key 03 is supplied to the RA, as an encoding result, and the line corresponding to the key 03 in the RA is referred to. In the line corresponding to the key 03 in the RA, the comparison-needed flag is "1" and the main memory address to be subjected to comparison is A2. This indicates that it is necessary to subject the main memory address A2 to equal comparison. The value of the main memory address A2 in the main memory 3 is read out via the Cache 7A, and the RB is searched for the line whose Value is read out from the main memory 3 and whose Key is "03". In the example shown in FIG. 44, the lines "04" and "05" have respective keys that are "03". Among these lines, the line "05" is selected as a matched line because the value read out from the main memory 3 is "00" and a key 05 is supplied to the RA, as an encoding result.

In a case where the process above is repeated and an ending flag E, which indicates that there is no register number or main memory address to be compared next in the RA, is detected, it is determined that all input patterns are matched, and the instruction region is reusable. Then a "Select Output" signal is outputted from the line where the ending flag E is detected, and output values corresponding to that line, which are stored in the RO1 and RO2, are outputted to the register 6A and the main memory 3.

As described above, the associative search in the second example has the following characteristics. First, a matched line which indicates the matching of contents is only one line in the RB. On this account, one result of encoding is supplied at the time of transfer of the search operation to the next column. Therefore, only one group of (n) signal lines connecting the RB with the RA is required as an encoding result of an address is sent. On the contrary, in the example shown in FIG. 1, the RB allows multiple matches and hence signal lines connecting the columns of the RB must be provided for the respective lines (i.e. 2N lines are required). In this manner, in the second example, the number of signal lines in the associative search memory constituting the instruction region storage section 2 is drastically reduced.

Also, because only a single match is allowed during the search, the order of comparison of items is limited to the order of references in the tree structure. That is, a register value and a memory content must be compared with each other in a mixed manner and in accordance with the order of references.

An input pattern is arranged such that items are linked with each other as Keys to be referred to, and is registered, in the RB and RA, in the form of a tree structure. In each of the items of the input pattern, an ending flag indicates the end of the item. It is therefore possible to change the number of items in an input pattern, and hence the number of items of an input pattern can be flexibly determined in accordance with the state of an instruction region to be registered in a reuse table. Furthermore, since unused items does not wastefully occupy the memory area, the efficiency of the use of the memory area is improved.

In addition to the above, since an input pattern is registered in the form of a tree structure, a plurality of input patterns can share one line, in a case where contents of items are overlapped. This also makes it possible to improve the efficiency in the use of the memory capacity.

In the arrangement above, the memory constituting each of the RA and RB is vertically long in terms of the structure. Provided that a capacity of the memory is 2M byte, the memory is 8 words in width and 65536 entries in length.

Alternative Example of Associative Search

In the example above, the items UP, Alt., and DN are not used in the RA shown in FIG. 43. That is, it is unnecessary to provide these items in the RA in the example above. In the meanwhile, further speedup is achieved by using the items UP, Alt., and DN. Incidentally, this alternative example of the associative search is identical with the example described in Embodiment 1 (second example where an input pattern is registered in the form of a tree structure), and hence the description of the alternative example is not given. It is noted that the RA of the present embodiment corresponds to the RF in Embodiment 1.

(Storage Means for Output Values)

Means that stores output values outputted as reuse after the confirmation of the matching of input patterns is also identical with the means in Embodiment 1 (described in the example of storage means for output values), and hence the description thereof is not given.

(Registration to Instruction Region Storage Section)

In a case where it is determined that reuse is not feasible at the time of execution of an instruction region, inputs/outputs by the instruction region are registered in the RA, RB, RO1, and RO2. The operation to perform this registration is also identical with that described in Embodiment 1 (registration to the instruction region storage section), and hence the description thereof is not given.

Prediction Mechanism in Second Example

Figure 45:
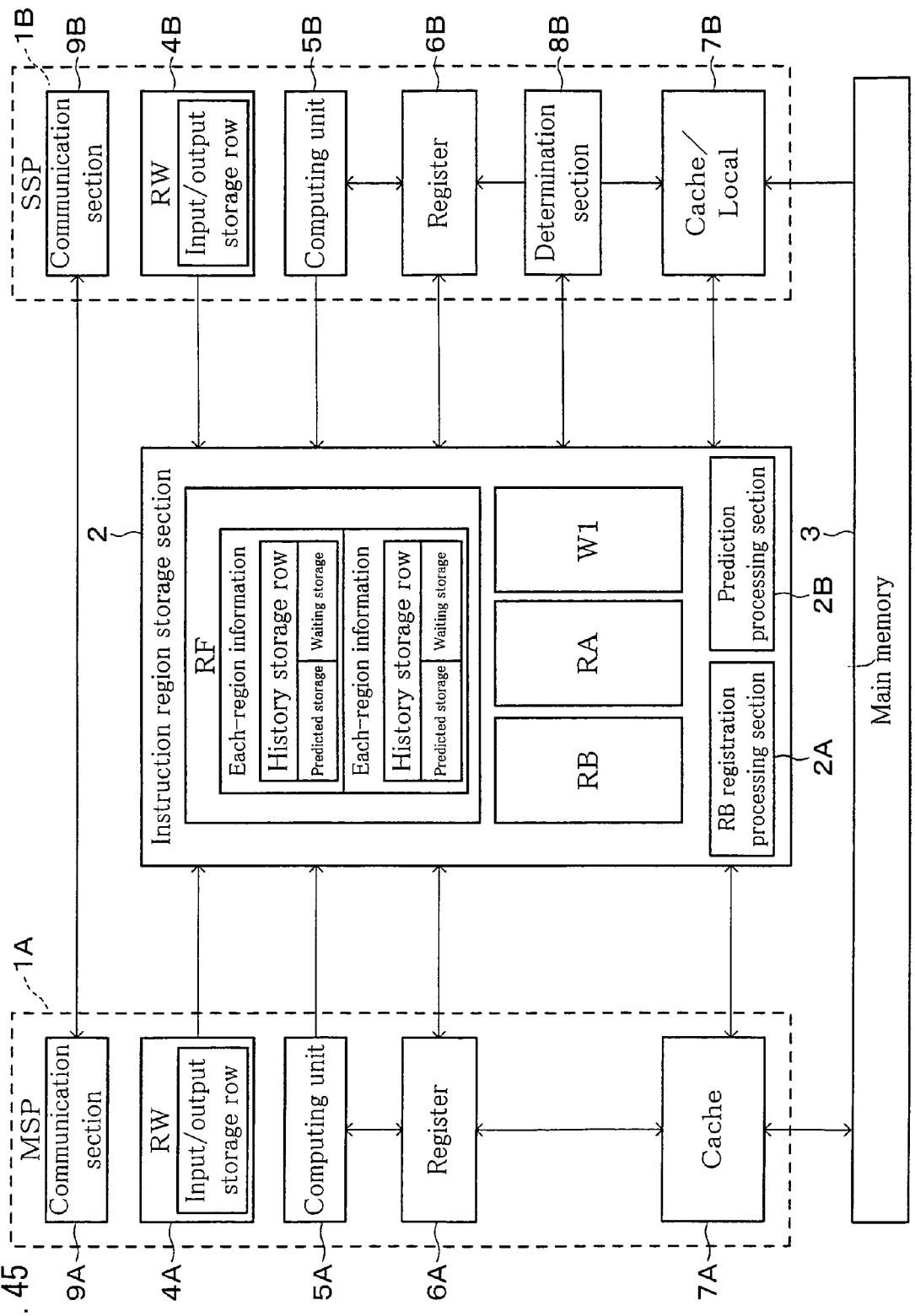
FIG. 45 outlines a data processing device in a case where the second example is adopted.
Figure 47:
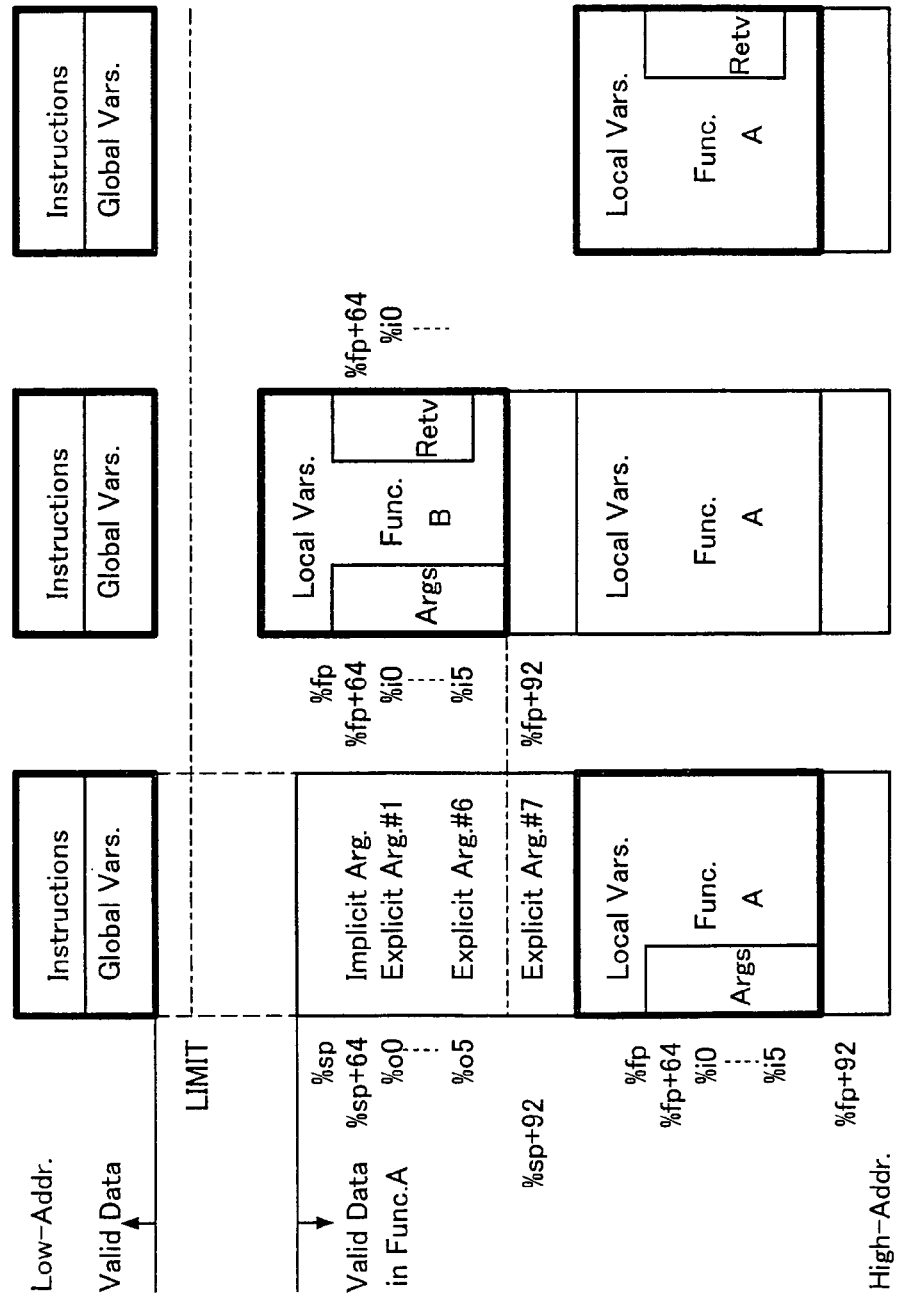
FIG. 47 outlines arguments and frames in a memory map, in case where a Function-A calls a Function-B.
Figure 48:
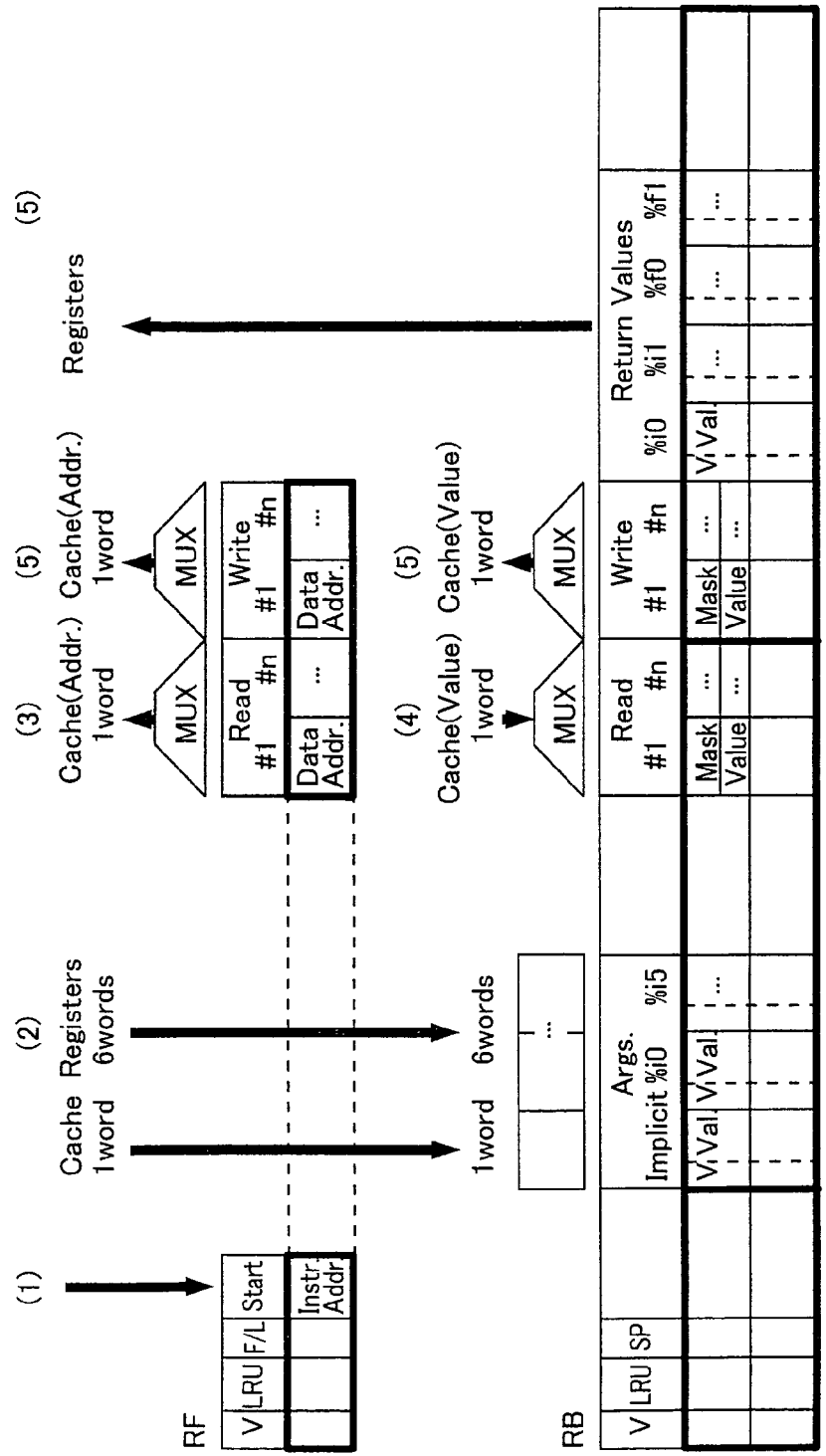
FIG. 48 shows a conventional reuse table for reusing one function.
Figure 50:
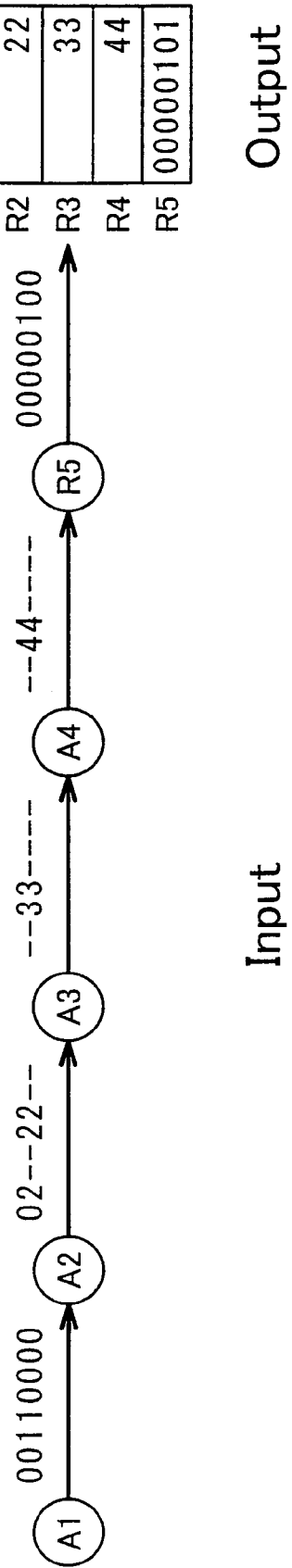
FIG. 50 briefly shows input addresses and input data which are registered in the RB and output addresses and output data, in a case where the instruction region shown in FIG. 49 is executed.

FIG. 45 outlines the data processing device adopting the second example. This data processing device is identical with the device shown in FIG. 35, except the following points: an input/output storage row is provided in each of the RW4A and RW4B; in the instruction region storage section 2, a history storage row (history storage area) as each-region information, a predicted value storing region, waiting-required address storage region, and a prediction result storage row are provided in the RF; and the RB, RA, and W1 as described in the second example are provided. The W1 corresponds to the aforesaid RO1 and RO2. The components other than the above are identical with those in the arrangement in FIG. 35.

In the second example, the input/output storage row where an input/output pattern at the time of execution of an instruction region is temporarily stored is the RW4A or RW4B. In the first example, an input/output pattern at the time of execution of an instruction region is directly registered in the RB. Therefore the RW4A and RW4B are realized by a pointer to each row of the RB. On the other hand, each of the RA and RB have a tree structure in the second example. The RW4A and RW4B cannot therefore directly point the row of the RB. That is, in the second example, the RW4A and RW4B do not function as pointers to each row of the RB but virtually function as memories temporarily storing an input/output pattern at the time of execution of an instruction region.

Although not illustrated in FIG. 43, the RF and RB shown in FIG. 34 are also provided as an RF in the second example, as a temporal storage memory area where a history entry and a predicted entry of an input pattern at the time of repetitive execution of a predetermined instruction region are stored. In this case, however, a row of an entry in the RB is made up of several rows including a history storage row storing a history entry, a predicted value storing region, and a waiting-required address storage region.

In response to the execution of an instruction region, input elements of the instruction region are serially stored in the RW4A and RW4B. Once all input elements are completed and output elements are determined as a result of calculation, the input/output pattern is stored in the history storage row, and also stored in the above-described tree-structured input/output pattern storage mechanism.

In a case where a predetermined instruction region is repeatedly executed, histories are serially stored in the history storage row. Once an enough number of histories are stored, the prediction processing section 2B performs prediction as above. The result of the execution by the SSP 1B based on the prediction is stored in the aforesaid tree-structured input/output pattern storage mechanism.

Example of Application of Present Invention

Provided that a program execution environment where a global variable area is distinguished from a stack area on account of "LIMIT" or the like is available, means for determining whether a variable on a stack frame is a local variable of an upper/lower function. In particular, in a case where registers to store arguments are in short and hence an argument is stored in a stack, a called function cannot distinguish between these two.

In a SPARC processor of the present embodiment, the top 6 words of an argument are stored in a general register. In the SPARC processor, the reuse of functions/loops is realized by making use of the facts that (i) a function using an argument exceeding 6 words does not frequently appear and (ii) reuse is not feasible when an argument is overflowed into a stack. Being similar to the SPARC processor, many types of RISC processors each of which includes not less than 32 general registers can also realize the reuse of functions/loops, by means of similar decisions.

INDUSTRIAL APPLICABILITY

As described above, the data processing device of the present invention can be adopted to a SPARC processor. Along with the SPARC processor, the data processing device of the present invention can be adopted to many types of RISC processors each of which includes not less than 32 general registers. Moreover, the data processing device can be adopted to game consoles, mobile phones, and home information appliances, which include the aforesaid processors.

The invention claimed is:

1. A data processing apparatus for speeding-up execution of program instructions received from a main memory, comprising:
 a main memory which stores program instructions and data;
 a first instruction stream processor comprising a computing unit configured to perform computations based on one or more instructions obtained from an instruction region in main memory containing program instructions;
 a register by which the first instruction stream processor writes and reads instruction data to/from the main memory, and
 an input/output group generator, operatively functioning as an instruction sequence reuse window, that generates input/output (I/O) group data based on execution of a sequence of program instructions from the instruction region, said I/O group data having an input pattern comprising one or more instruction sequence input elements and an associated output pattern comprising one or more instruction sequence output elements; and
 said data processing apparatus further comprising an instruction region storage section comprising content addressable memory (CAM) and random access memory (RAM) memory portions, operatively functioning as data reuse table, for storing I/O group data used for reusing certain sequences of instructions, wherein said instruction region storage section further includes an I/O group storage portion used to store the I/O group data, and wherein, at a time of executing one or more instructions read out from the instruction region in main memory, and upon identifying a matching pattern of instruction sequence input data found the instruction region with an input pattern of I/O group data stored in the I/O group storage portion, the first stream processor performs a reuse operation that outputs the associated output pattern to the register and/or the main memory, and wherein
 the input/output group generator also generates dependency relations information and includes a dependency relations storage memory section for storing dependency relations information, the dependency relations storage memory section comprising a two-dimensional (2D) matrix-arranged memory in which instruction sequence input elements are associated to particular columns of the memory and corresponding instruction sequence output elements are associated to particular rows of the memory, and each storage element within the 2D matrix-arranged memory contains dependency relations information indicative of whether a particular instruction sequence output element corresponding to a particular row of the memory is derived from or has some dependency relationship to a particular instruction sequence input element corresponding to a particular column of the memory, and wherein
 the input/output group generator further includes an I/O group data setter which, based on information stored in the dependency relations storage memory, sets I/O group data that is made up of an output pattern that includes at least one of said instruction sequence output elements and an input pattern that includes at least one of said instruction sequence input elements.

2. The data processing device as defined in claim 1, wherein if a first group of instruction sequence input elements, from which a first instruction sequence output element is derived, is included entirely within a second group of instruction sequence input elements, from which a second instruction sequence output element different from the first instruction sequence output element is derived, the I/O group data setter: (i) sets the second group of instruction sequence input elements as the input pattern and (ii) sets the first group of instruction sequence input elements and the second group of instruction sequence input elements as the output pattern.

3. The data processing device as defined in claim 1, wherein if there is no shared instruction sequence input element between a first group of instruction sequence input elements, from which a first instruction sequence output element is derived, and a second group of instruction sequence input elements, from which a second instruction sequence output element different from the first instruction sequence output element is derived, the I/O group data setter: (i) sets a first I/O group data in which the first group of instruction sequence input elements is the input pattern and the first instruction sequence output element is the output pattern and (ii) sets a second I/O group data in which the second group of instruction sequence input elements is the input pattern and the second instruction sequence output element is the output pattern.

4. The data processing device as defined in claim 1, wherein after a readout operation from the register and/or from an instruction region in the main memory is performed and upon said first instruction stream processor performing execution of one or more instructions obtained from the register or the instruction region, the input/output group generator further performs operations of:
 (1) when an address of the register and/or the main memory from which the readout operation was performed is registered in the dependency relations storage memory section as an instruction sequence output element, creating a temporary provisional dependency relationship information storage matrix comprising rows and columns of memory elements within the dependency relations storage memory section, wherein a particular row is associated to that particular instruction sequence output element corresponding to the registered address;
 (2) when an address of the register and/or the main memory from which the readout operation was performed is registered in the dependency relations storage memory section as an instruction sequence input element rather than an instruction sequence output element, creating a temporary provisional dependency relationship information storage matrix comprising rows and columns of memory elements within the dependency relations storage memory section, wherein a particular column of memory elements is associated to that particular instruction sequence input element corresponding to the registered address, and wherein a particular memory element in a column associated with the instruction sequence input element is set to a logical "1", and remaining memory elements in a same column are set to a logical "0"; and (3) when an address of the register or the main memory from which the readout operation was performed is registered in the dependency relations storage section as neither an instruction sequence output element nor an instruction sequence input element, (i) registering the address and its value in the dependency relations storage section as instruction sequence input elements, and (ii) creating a temporary provisional dependency relationship information storage matrix comprising rows and columns of memory elements within the dependency relations storage memory section, wherein a particular column of memory elements is associated to that particular instruction sequence registered as input elements and a particular memory element in said column is set to a logical "1", and remaining memory elements in that same column are set to a logical "0"; and under a condition where a writing operation is performed to the register and/or the main memory, the I/O group data generator performs further operations of:

(4) when an address of the register and/or the main memory to which the writing operation is performed is registered as an instruction sequence output element, (iii) updating an instruction sequence output value corresponding to the registered instruction sequence output element to a value written by the writing operation, (iv) replacing a value stored in a row element of the temporary provisional dependency relationship information storage matrix within the dependency relations storage section, wherein said row element being replaced corresponds to a row associated to the registered instruction sequence output element, with a result of a logical OR-ing of all provisional matrices temporarily stored at that time, and then (v) initializing the temporarily-stored provisional matrices; and (5) when an address of the register and/or the main memory to which the writing operation is performed is not registered as an instruction sequence output element, (vi) registering the address and its value as an instruction sequence output element in the dependency relations storage memory section, (vii) replacing a value stored in a row element of the temporary provisional dependency relationship information storage matrix within the dependency relations storage section, wherein said row element being replaced corresponds to a row associated to that instruction sequence output element, with a result of a logical OR-ing of all provisional matrices temporarily stored at that time, and then (viii) initializing the temporarily-stored provisional matrices.

5. The data processing device as defined in claim 1, wherein,
the I/O group data pattern setter includes a logical operation computation section which performs a logical "AND" operation of the row elements in the 2D matrix-arranged memory, and
(i) extracts a group of row elements for which a logical AND operation of an inversion of a first row element and a second row element are each a logical "0", and (ii) among the extracted group of the row elements, excludes, as a candidate for an input/output group, row elements other than a row element that includes a largest number of the input elements.

6. The data processing device as defined in claim 1, wherein,
the I/O group data pattern setter includes a logical operation computation section which performs a logical "AND" operation of the row elements in the 2D matrix-arranged memory, and
sets, as an input/output group, a row element whose logical "AND" operation with any other row elements are all logical "0".

7. The data processing device as defined in claim 1, further comprising a second instruction stream processor having a second computing unit configured to perform computations on instructions from an instruction region in main memory,
wherein with respect to instructions in the instruction region processed by the first computing unit, the second computing unit subjects instructions from the instruction region to a computation based on a predicted input value, and registers a result of the computation in the instruction region storage section.

8. The data processing device as defined in claim 1, wherein,
the I/O group data pattern setter further comprises:
an output-side group storage section which stores information of an input/output group to which each of the output elements belongs;
an input-side group storage section which stores information of an input/output group to which each of the input elements belongs;
a temporal storage section which stores an indication of a changed dependency relation between an output element and an input element whenever there is a change in information stored in the dependency relations storage section when I/O group data is generated; and
a group temporal storage section which stores information of changed I/O group data when there is a change in information stored in the dependency relations storage memory section when the input/output group is generated.

9. The data processing device as defined in claim 8, wherein
the I/O group data pattern setter further includes a group management section that stores information of the I/O group data which has previously been allocated to an output element and/or an input element when the input/output group is generated.

10. The data processing device as defined in claim 9, wherein
the temporal storage section stores results of a logical OR-ing of memory elements of a plurality of rows in the dependency relations storage section, and
the group temporal storage section stores: (i) the result of a logical OR-ing of memory elements of a plurality of rows in the output side group storage section and/or (ii) the result of a logical OR-ing of memory elements corresponding to a plurality of input elements in the input side group storage section.

11. The data processing device as defined in claim 8, wherein
the I/O group data pattern setter further includes a conditional branch storage section that stores information regarding an input element on which the conditional branch instruction depends whenever a conditional branch instruction is detected when the I/O group data is generated.

12. The data processing device as defined in claim 10, wherein, under a condition where a readout operation from the register and/or the main memory is carried out while the first stream processor performs a calculation of the input region, the input/output group generator further performs operations of:

(1) when an address of the register and/or the main memory from which the readout operation was performed has been registered as an output element in the dependency relations storage memory section, temporarily storing, in the temporal storage section, a logical OR of (i) a row element of the dependency relations storage memory section, wherein said row element corresponds to the output element, and (ii) elements in the temporal storage section, and storing, in the group temporal storage section, a logical. OR of (iii) a row element of the output side group storage section, wherein said row element corresponds to the output element and (iv) elements in the group temporal storage section;

(2) when an address of the register and/or the main memory from which the readout operation was performed is registered as an input element rather than an output element in the dependency relations storage memory section, storing in the temporal storage section information in which a memory element corresponding to a column of the dependency relations storage section, wherein said column corresponds to the input element and is set to a logical "1" and remaining memory elements are set at a logical "0", and storing in the group temporal storage section a logical "OR" of: (v) elements, from the input-side group storage section that correspond to the input element and (vi) the elements in the group temporal storage section; and (3) when an address of the register and/or the main memory from which the readout operation was performed is not registered in the dependency relations storage memory section as either an output element or an input element, registering as input elements, the address and its value in the dependency relations storage section, and temporarily storing a provisional matrix in which a memory element corresponding to a column, of the dependency relations storage section, which corresponds to the input element is set at a logical "1" while remaining memory elements are set to a logical "0", and under a condition where writing is carried out to the register and/or the main memory, the input/output group generator performs further operations of:

(4) when an address of the register and/or the main memory to which the writing performed is registered as an output element, updating an output value corresponding to the registered output element to the written value, replacing a row element of the dependency relations storage memory section wherein said row element corresponds to the registered output element, with the information temporarily stored in the temporal storage section at the time, and (viii) updating the information in the output side group storage section, which information corresponds to the output element, and (ix) updating the information in the input side group storage section, which information corresponds to the input elements on which the output element depends, based on the information stored in the group temporal storage section; and (5) when an address of the register and/or the main memory to which the writing is carried out is not registered as an output element, registering the address and its value as output element in the dependency relations storage memory section, and replacing a row element of the dependency relations storage section, wherein said row element corresponds to the output element, with the information temporarily stored in the temporal storage section at that time, and (x) updating the information in the output-side group storage section, wherein said information corresponds to the output element, and (xi) updating the information in the input side group storage section, wherein said information corresponds to the input elements on which the output element depends, based on the information stored in the group temporal storage section.

13. The data processing device as defined in claim 1, wherein the instruction region storage section includes an instruction sequence input pattern storage section which stores instruction sequence input patterns as a tree structure in which items which should be subjected to equal comparison are regarded as nodes.

14. The data processing device as defined in claim 13, wherein the input pattern storage section is configured to organize and store the tree structure in such a manner that a value of an item in the input pattern, which item is subjected to equal comparison, is stored in association with an item which is to be next subjected to a comparison.

15. The data processing device as defined in claim 14, wherein the input pattern storage section further includes associative search performing circuitry and an additional information storage section, wherein the associative search performing circuitry utilizes one or more search target lines that include a value storage portion in which a value of an item to be subjected to equal comparison is placed, and a key storage portion in which a key for identifying each item is placed; and the additional information storage section includes a search item designation area in which an item to be next subjected to an associative search is stored in accordance with a search target line.

* * * * *